(12) United States Patent
Igaki et al.

(10) Patent No.: US 8,830,067 B2
(45) Date of Patent: Sep. 9, 2014

(54) ILLUMINATION DEVICE

(75) Inventors: Masaru Igaki, Kyoto (JP); Hideharu Osawa, Kyoto (JP); Takuya Tsuchikawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 510 days.

(21) Appl. No.: 13/187,593

(22) Filed: Jul. 21, 2011

(65) Prior Publication Data
US 2012/0019165 A1    Jan. 26, 2012

(30) Foreign Application Priority Data

| Jul. 22, 2010 | (JP) | 2010-164969 |
| Aug. 24, 2010 | (JP) | 2010-187077 |
| Apr. 27, 2011 | (JP) | 2011-099117 |

(51) Int. Cl.
G08B 23/00    (2006.01)

(52) U.S. Cl.
USPC ............... 340/573.1; 340/686.6; 340/693.11; 340/309.16

(58) Field of Classification Search
CPC ......... G08B 13/18; G08B 13/19; H05B 37/02
USPC ........... 340/309.16, 541, 545.3, 573.1, 686.1, 340/686.6, 693.5, 693.9, 693.11; 315/149, 315/152, 153
See application file for complete search history.

(56) References Cited

U.S. PATENT DOCUMENTS

| 8,004,420 | B2* | 8/2011 | Hoeben et al. | 340/815.4 |
| 2006/0044800 | A1* | 3/2006 | Reime | 362/276 |
| 2008/0134102 | A1 | 6/2008 | Movold et al. | |
| 2011/0248194 | A1* | 10/2011 | Svajda et al. | 250/552 |
| 2012/0206051 | A1* | 8/2012 | Nieuwlands | 315/153 |

FOREIGN PATENT DOCUMENTS

| CN | 101558367 A | 10/2009 |
| JP | 3060478 | 4/2000 |
| JP | 2010-140754 | 6/2010 |

OTHER PUBLICATIONS

Chinese Office Action issued on Jul. 2, 2014 in corresponding Chinese Application No. 201110201992.0 (with partial English-language translation).

* cited by examiner

Primary Examiner — Thuy Vinh Tran

(74) Attorney, Agent, or Firm — Fish & Richardson P.C.

(57) ABSTRACT

The illumination device disclosed in the present specification has a light source, a touchless sensor for detecting proximity and movement of an object without contact, and a control unit for controlling the driving of the light source on the basis of an output of the touchless sensor.

17 Claims, 67 Drawing Sheets

FIG.2
(a) CASE IN WHICH THE ADDRESS OF THE DATA REGISTER 20 IS SPECIFIED
(b) CASE IN WHICH THE ADDRESS OF THE DATA REGISTER 20 IS SPECIFIED FOR WRITING OF DATA
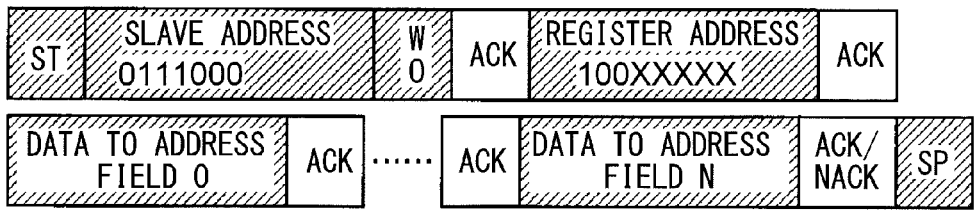
(c) CASE IN WHICH THE ADDRESS OF THE DATA REGISTER 20 IS SPECIFIED FOR READING OF DATA
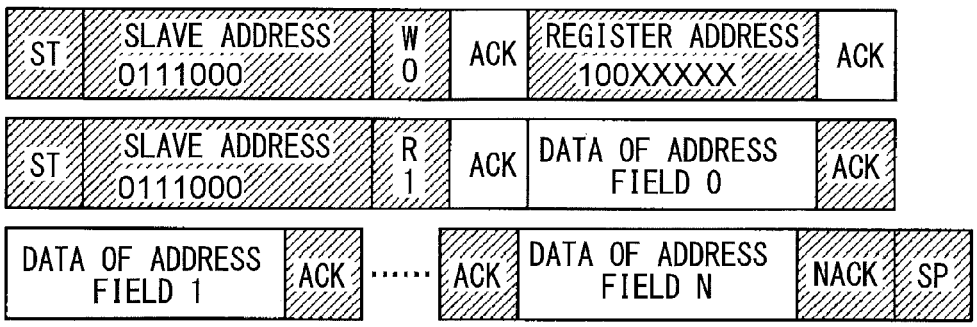
(d) CASE IN WHICH DATA ARE READ FROM THE DATA REGISTER 20
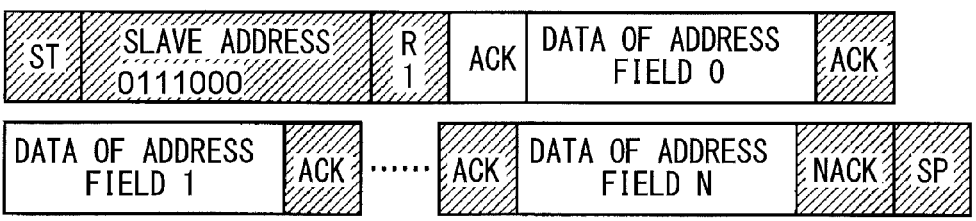

FIG.3

| ADDRESS | TYPE | REGISTER NAME | REGISTER FUNCTION |
|---|---|---|---|
| 80h | RW | ALS_CONTROL | ALS OPERATION MODE CONTROL AND SW RESET |
| 81h | RW | PS_CONTROL | PS OPERATION MODE CONTROL |
| 82h | RW | I_LED | SELECTION OF ACTIVATED LED, AND SETTING CURRENTS OF LEDS 31, 32 |
| 83h | RW | I_LED33 | SETTING CURRENT OF LED 33 |
| 84h | RW | ALS_PS_MEAS | FORCED MODE TRIGGER |
| 85h | RW | PS_MEAS_RATE | PS MEASUREMENT RATE IN STANDALONE MODE |
| 86h | RW | ALS_MEAS_RATE | ALS MEASUREMENT RATE IN STANDALONE MODE |
| 8Ah | R | PART_ID | PART NUMBER AND REVISION ID |
| 8Bh | R | MANUFACT_ID | MANUFACTURER ID |
| 8Ch | R | ALS_DATA_0 | LOW-ORDER BYTE OF ALS DATA |
| 8Dh | R | ALS_DATA_1 | HIGH-ORDER BYTE OF ALS DATA |
| 8Eh | R | ALS_PS_STATUS | MEASUREMENT DATA AND INTERRUPT STATE |
| 8Fh | R | PS_DATA_LED31 | PS DATA FROM LED 31 |
| 90h | R | PS_DATA_LED32 | PS DATA FROM LED 32 |
| 91h | R | PS_DATA_LED33 | PS DATA FROM LED 33 |
| 92h | RW | INTERRUPT | INTERRUPT SETTING |
| 93h | RW | PS_TH_LED31 | PS INTERRUPT THRESHOLD VALUE USED FOR LED 31 |
| 94h | RW | PS_TH_LED32 | PS INTERRUPT THRESHOLD VALUE USED FOR LED 32 |
| 95h | RW | PS_TH_LED33 | PS INTERRUPT THRESHOLD VALUE USED FOR LED 33 |
| 96h | RW | ALS_TH_UP_0 | LOW-ORDER BYTE OF ALS UPPER THRESHOLD VALUE |
| 97h | RW | ALS_TH_UP_1 | HIGH-ORDER BYTE OF ALS UPPER THRESHOLD VALUE |
| 98h | RW | ALS_TH_LOW_0 | LOW-ORDER BYTE OF ALS LOWER THRESHOLD VALUE |
| 99h | RW | ALS_TH_LOW_1 | HIGH-ORDER BYTE OF ALS LOWER THRESHOLD VALUE |

FIG.4

REGISTER ALS_CONTROL(80h)

(a)

| 7 | 6 | 5 | 4 | 3 | 2 | 1 | 0 |
|---|---|---|---|---|---|---|---|
| RES | RES | RES | RES | RES | SW RESET | ALS MODE | |

INITIAL VALUE 00h (b)

| FIELD | BIT | TYPE | DESCRIPTION |
|---|---|---|---|
| RES | 7:3 | RW | WRITE 0000 |
| SW RESET | 2 | RW | 0: INITIAL RESET NOT INITIATED<br>1: INITIAL RESET INITIATED |
| ALS MODE | 1:0 | RW | 0X: STANDBY MODE<br>10: FORCED MODE<br>11: STANDALONE MODE |

FIG.5

REGISTER PS_CONTROL(81h)

(a)

| 7 | 6 | 5 | 4 | 3 | 2 | 1 | 0 |
|---|---|---|---|---|---|---|---|
| X | X | X | X | X | X | PS MODE ||

INITIAL VALUE 00h (b)

| FIELD | BIT | TYPE | DESCRIPTION |
|---|---|---|---|
| NA | 7:2 | – | IGNORED |
| PS MODE | 1:0 | RW | 0X: STANDBY MODE<br>10: FORCED MODE<br>11: STANDALONE MODE |

FIG.6

REGISTER I_LED (82h)

(a)

| 7 | 6 | 5 | 4 | 3 | 2 | 1 | 0 |
|---|---|---|---|---|---|---|---|
| PS ACTIVATION | | LED 2 CURRENT | | | LED 1 CURRENT | | |

INITIAL VALUE 1Bh (b)

| FIELD | BIT | TYPE | DESCRIPTION |
|---|---|---|---|
| PS ACTIVATION | 7:6 | RW | 00: ACTIVATE LED 31<br>01: ACTIVATE LEDS 31, 32<br>10: ACTIVATE LEDS 31, 33<br>11: ACTIVATE LEDS 31 THROUGH 33 |
| LED 32 CURRENT | 5:3 | RW | 000: 5mA<br>001: 10mA<br>010: 20mA<br>011: 50mA<br>100: 100mA<br>101: 150mA<br>11X: 200mA |
| LED 31 CURRENT | 2:0 | RW | |

FIG.7

REGISTER I_LED33 (83h)

(a)
| 7 | 6 | 5 | 4 | 3 | 2 | 1 | 0 |
|---|---|---|---|---|---|---|---|
| X | X | X | X | X | \multicolumn{3}{c}{LED 33 CURRENT} |

INITIAL VALUE 03h (b)
| FIELD | BIT | TYPE | DESCRIPTION |
|---|---|---|---|
| NA | 7:3 | – | IGNORED |
| LED 33 CURRENT | 2:0 | RW | 000:5mA<br>001:10mA<br>010:20mA<br>011:50mA<br>100:100mA<br>101:150mA<br>11X:200mA |

FIG.8

REGISTER ALS_PS_MEAS (84h)

(a)

| 7 | 6 | 5 | 4 | 3 | 2 | 1 | 0 |
|---|---|---|---|---|---|---|---|
| X | X | X | X | X | X | ALS TRIGGER | PS TRIGGER |

INITIAL VALUE 00h (b)

| FIELD | BIT | TYPE | DESCRIPTION |
|---|---|---|---|
| NA | 7:2 | - | IGNORED |
| ALS TRIGGER | 1 | RW | 0: NEW ALS MEASUREMENT NOT INITIATED<br>1: NEW ALS MEASUREMENT INITIATED |
| PS TRIGGER | 0 | RW | 0: NEW PS MEASUREMENT NOT INITIATED<br>1: NEW PS MEASUREMENT INITIATED |

FIG.9

REGISTER PS_MEAS_RATE (85h)

(a)

| 7 | 6 | 5 | 4 | 3 | 2 | 1 | 0 |
|---|---|---|---|---|---|---|---|
| X | X | X | X | PS MEASUREMENT RATE ||||

INITIAL VALUE 05h (b)

| FIELD | BIT | TYPE | DESCRIPTION |
|---|---|---|---|
| NA | 7:4 | - | IGNORED |
| PS MEASUREMENT RATE | 3:0 | RW | 0000:10ms<br>0001:20ms<br>0010:30ms<br>0011:50ms<br>0100:70ms<br>0101:100ms<br>0110:200ms<br>0111:500ms<br>1000:1000ms<br>1001:2000ms<br>101X:2000ms<br>11XX:2000ms |

FIG.10

REGISTER ALS_PS_STATUS (8Eh)

(a)
| 7 | 6 | 5 | 4 | 3 | 2 | 1 | 0 |
|---|---|---|---|---|---|---|---|
| ALS INT STATE | ALS DATA STATE | LED 33 INT STATE | LED 33 DATA STATE | LED 32 INT STATE | LED 32 DATA STATE | LED 31 INT STATE | LED 31 DATA STATE |

INITIAL VALUE 00h (b)
| FIELD | BIT | TYPE | DESCRIPTION |
|---|---|---|---|
| ALS INT STATE | 7 | R | 0: DEACTIVATE SIGNAL INT<br>1: ACTIVATE SIGNAL INT |
| ALS DATA STATE | 6 | R | 0: OLD DATA (DATA ALREADY READ)<br>1: NEW DATA (DATA NOT YET READ) |
| LED 33 INT STATE | 5 | R | 0: DEACTIVATE SIGNAL INT<br>1: ACTIVATE SIGNAL INT |
| LED 33 DATA STATE | 4 | R | 0: OLD DATA (DATA ALREADY READ)<br>1: NEW DATA (DATA NOT YET READ) |
| LED 32 INT STATE | 3 | R | 0: DEACTIVATE SIGNAL INT<br>1: ACTIVATE SIGNAL INT |
| LED 32 DATA STATE | 2 | R | 0: OLD DATA (DATA ALREADY READ)<br>1: NEW DATA (DATA NOT YET READ) |
| LED 31 INT STATE | 1 | R | 0: DEACTIVATE SIGNAL INT<br>1: ACTIVATE SIGNAL INT |
| LED 31 DATA STATE | 0 | R | 0: OLD DATA (DATA ALREADY READ)<br>1: NEW DATA (DATA NOT YET READ) |

FIG.12

REGISTER INTERRUPT (92h)

(a)

| 7 | 6 | 5 | 4 | 3 | 2 | 1 | 0 |
|---|---|---|---|---|---|---|---|
| X | INTERRUPT SOURCE | | X | OUTPUT MODE | INT POLARITY | INTERRUPT MODE | |

INITIAL VALUE 08h (b)

| FIELD | BIT | TYPE | DESCRIPTION |
|---|---|---|---|
| NA | 7 | - | IGNORED |
| INTERRUPT SOURCE | 6:5 | R | 00: INTERRUPT TRIGGERED BY ALS<br>01: INTERRUPT TRIGGERED BY LED 31<br>10: INTERRUPT TRIGGERED BY LED 32<br>11: INTERRUPT TRIGGERED BY LED 33 |
| NA | 4 | - | IGNORED |
| OUTPUT MODE | 3 | RW | 0: INT PIN LATCHED UNTIL REGISTER INTERRUPT IS READ<br>1: INT PIN UPDATED AFTER EACH MEASUREMENT |
| INT POLARITY | 2 | RW | 0: INT PIN SET TO LOGICAL 0 AT ACTIVATION OF SIGNAL INT<br>1: INT PIN SET TO LOGICAL 1 AT ACTIVATION OF SIGNAL INT |
| INTERRUPT MODE | 1:0 | RW | 00: INT PIN DEACTIVATED (HIGH IMPEDANCE)<br>01: PS MEASUREMENT CAN BE TRIGGERED<br>10: ALS MEASUREMENT CAN BE TRIGGERED<br>11: PS AND ALS MEASUREMENT CAN BE TRIGGERED |

FIG.13

REGISTER PS_TH_LED (93h, 94h, 95h)

(a)
| 7 | 6 | 5 | 4 | 3 | 2 | 1 | 0 |
|---|---|---|---|---|---|---|---|
| LED THRESHOLD VALUE ||||||||

INITIAL VALUE FFh (b)
| REGISTER | ADDRESS | BIT | TYPE | DESCRIPTION |
|---|---|---|---|---|
| THRESHOLD VALUE OF LED 31 | 93h | 7:0 | RW | THRESHOLD VALUES FOR EACH LED |
| THRESHOLD VALUE OF LED 32 | 94h | 7:0 | RW | |
| THRESHOLD VALUE OF LED 33 | 95h | 7:0 | RW | |

FIG.14

REGISTER PS_DATA_LED31 (8Fh)

| 7 | 6 | 5 | 4 | 3 | 2 | 1 | 0 |
|---|---|---|---|---|---|---|---|
| 1 | 0 | 0 | 0 | 0 | 1 | 0 | 1 |

FIG.22
(a) DETECTION IN TRANSVERSE DIRECTION
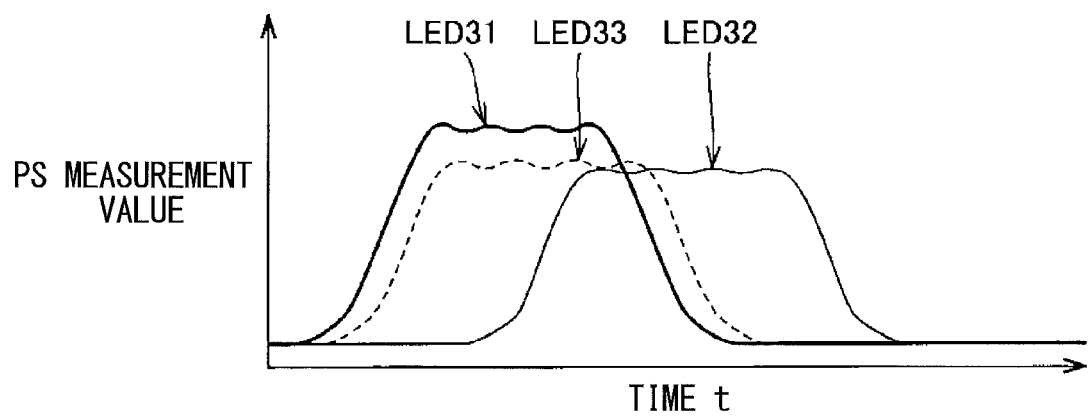
(b) DETECTION IN LONGITUDINAL DIRECTION
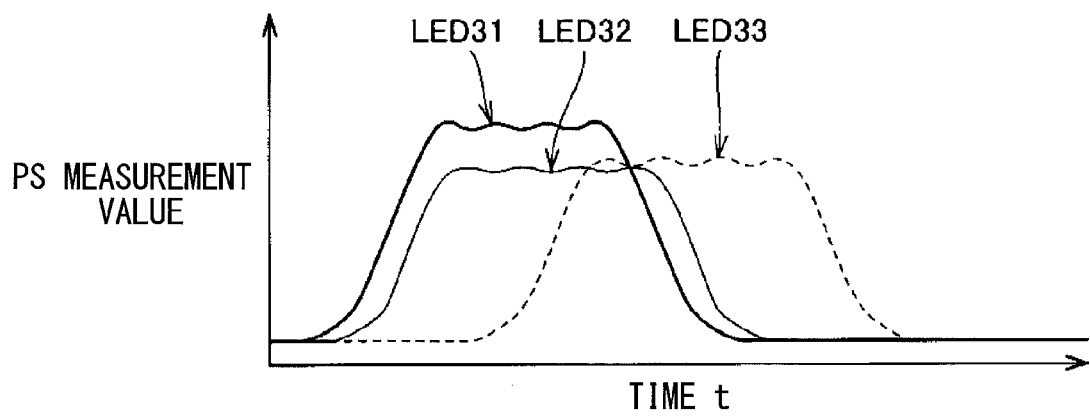

FIG.24C

| SAMPLE NO. | RAW DATA (PS_DATA_LEDx) | | | AVERAGED DATA (PS_AVR_LEDx) | | |
|---|---|---|---|---|---|---|
| | LED31 | LED32 | LED33 | LED31 | LED32 | LED33 |
| 1 | a1 | b1 | c1 | — | — | — |
| 2 | a2 | b2 | c2 | — | — | — |
| 3 | a3 | b3 | c3 | $\overline{a3}$ | $\overline{b3}$ | $\overline{c3}$ |
| 4 | a4 | b4 | c4 | $\overline{a4}$ | $\overline{b4}$ | $\overline{c4}$ |
| 5 | a5 | b5 | c5 | $\overline{a5}$ | $\overline{b5}$ | $\overline{c5}$ |
| ⋮ | ⋮ | ⋮ | ⋮ | ⋮ | ⋮ | ⋮ |
| m | am | bm | cm | $\overline{am}$ | $\overline{bm}$ | $\overline{cm}$ |

$$\overline{a_3} = \frac{a_1+a_2+a_3}{3}, \overline{b_3} = \frac{b_1+b_2+b_3}{3}, \overline{c_3} = \frac{c_1+c_2+c_3}{3}$$

$$\overline{a_4} = \frac{a_2+a_3+a_4}{3}, \overline{b_4} = \frac{b_2+b_3+b_4}{3}, \overline{c_4} = \frac{c_2+c_3+c_4}{3}$$

$$\overline{a_5} = \frac{a_3+a_4+a_5}{3}, \overline{b_5} = \frac{b_3+b_4+b_5}{3}, \overline{c_5} = \frac{c_3+c_4+c_5}{3}$$

$$\overline{a_m} = \frac{\sum_{n=m-(L-1)}^{m} a_n}{L}, \overline{b_m} = \frac{\sum_{n=m-(L-1)}^{m} b_n}{L}, \overline{c_m} = \frac{\sum_{n=m-(L-1)}^{m} c_n}{L}$$

FIG.26
<MOTION (LEFT-RIGHT)>   <SCROLLING (LEFT-RIGHT)>   <PAGE SWITCHING (FORWARD/BACK)>
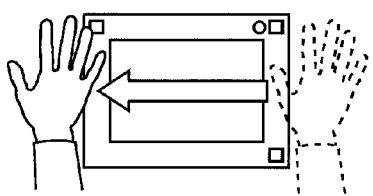
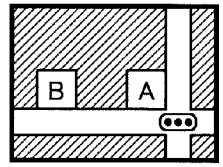
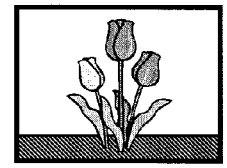
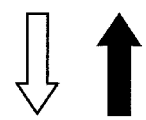
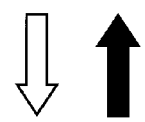
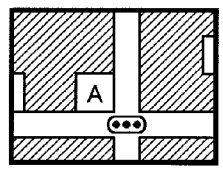
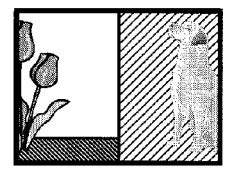
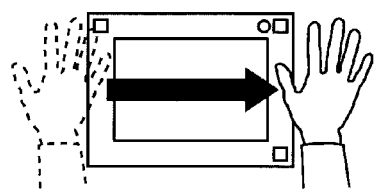
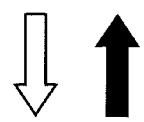
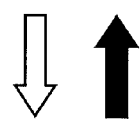
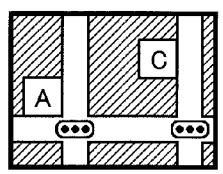
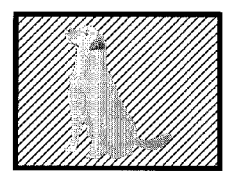

FIG.27
<MOTION (UP-DOWN)>    <SCROLLING (UP-DOWN)>    <PAGE SWITCHING (FORWARD/BACK)>
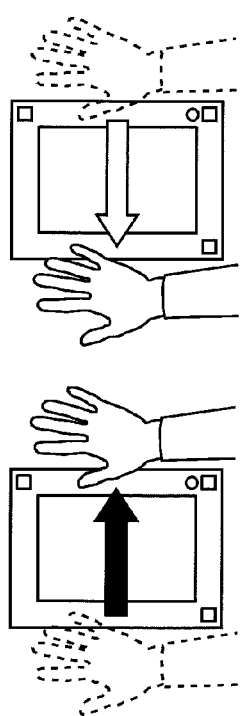
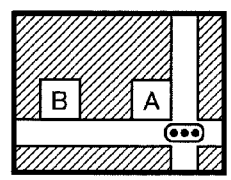
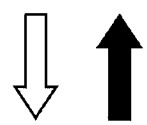
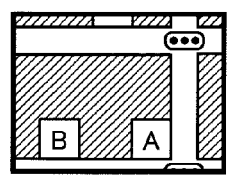
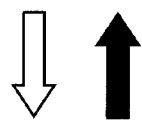
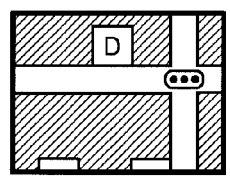
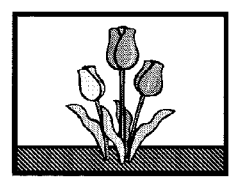
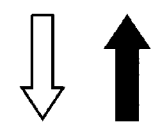
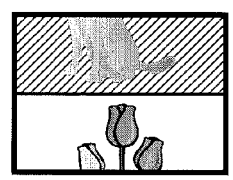
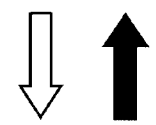
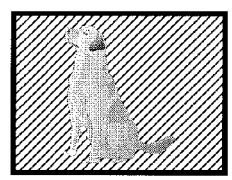

FIG.30A

| PS_DATA_LEDx | | Z |
|---|---|---|
| (255) d | (1111 1111) b | x800 |
| \| | \| | |
| (240) d | (1111 0000) b | |
| (239) d | (1110 1111) b | x400 |
| \| | \| | |
| (224) d | (1110 0000) b | |
| (223) d | (1101 1111) b | x300 |
| \| | \| | |
| (208) d | (1101 0000) b | |
| (207) d | (1100 1111) b | x200 |
| \| | \| | |
| (192) d | (1100 0000) b | |
| (191) d | (1011 1111) b | x150 |
| \| | \| | |
| (176) d | (1011 0000) b | |
| (175) d | (1010 1111) b | x100 |
| \| | \| | |
| (160) d | (1010 0000) b | |
| (159) d | (1001 1111) b | x75 |
| \| | \| | |
| (144) d | (1001 0000) b | |
| (143) d | (1000 1111) b | x50 |
| \| | \| | |
| (128) d | (1000 0000) b | |

FIG.30B

| TIME | PS_DATA_LEDx | MAGNIFICATION Z |
|---|---|---|
| 0 | 80 | 70% |
| 10 | 82 | 76% |
| 20 | 91 | 103% |
| 30 | 99 | 127% |
| 40 | 107 | 151% |
| 50 | 118 | 184% |
| 60 | 109 | 157% |
| ⋮ | ⋮ | ⋮ |

※Z=(DEFAULT MAGNIFICATION)+{(PS_DATA_LEDx)-(ZOOM REFERENCE VALUE)}
　　　　　　　　　　　　　　　　　　　　　×COEFFICIENT k

DEFAULT MAGNIFICATION: 100%
ZOOM REFERENCE VALUE: 90
COEFFICIENT k: 3

FIG.31
<MOTION (DISTANCE)>     <ZOOM (IN/OUT)>
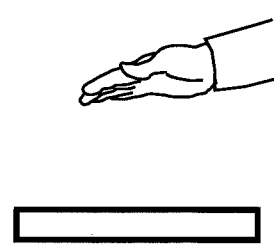
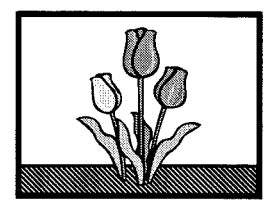
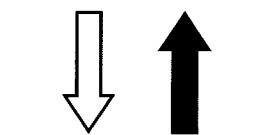
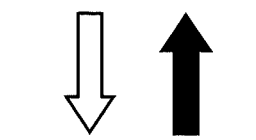
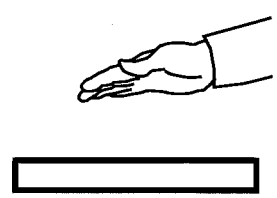
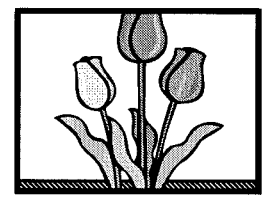
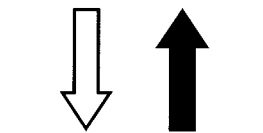
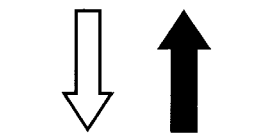
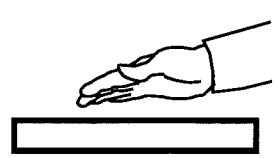
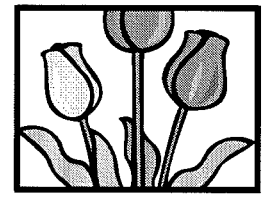

114  115

FIG.54
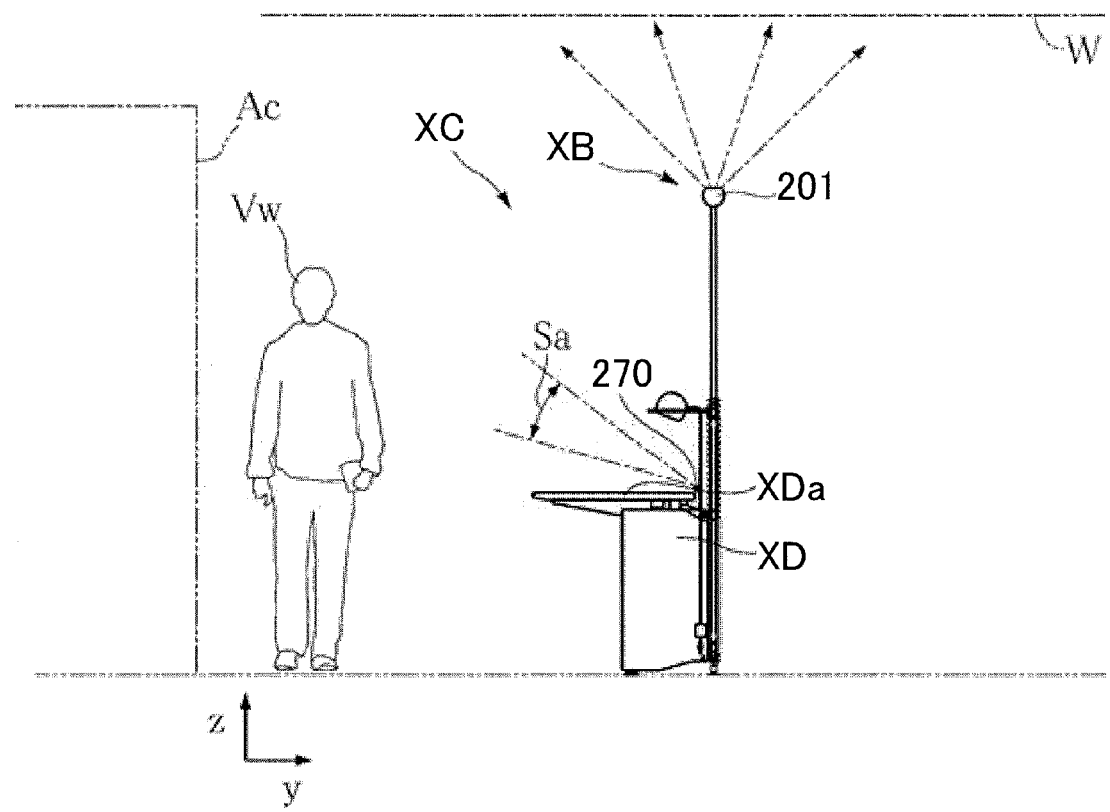
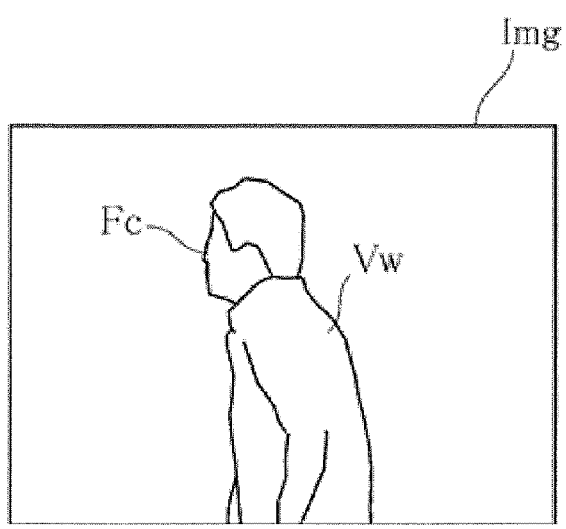

FIG.55
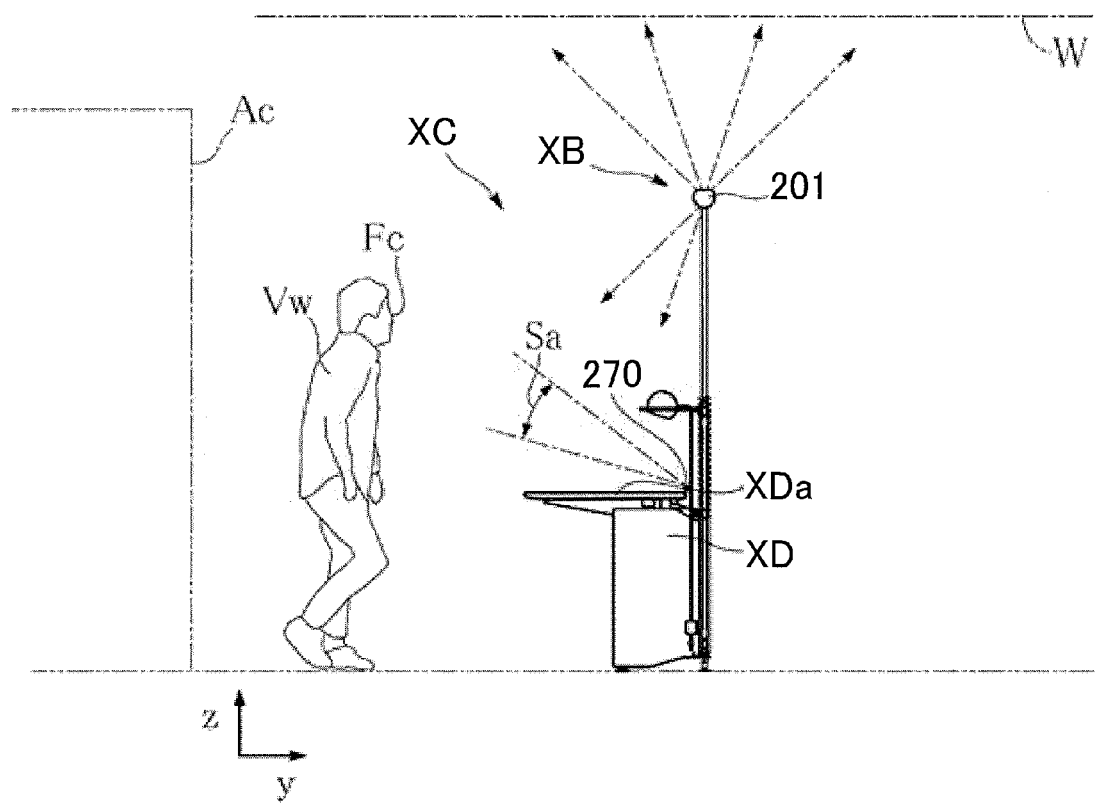
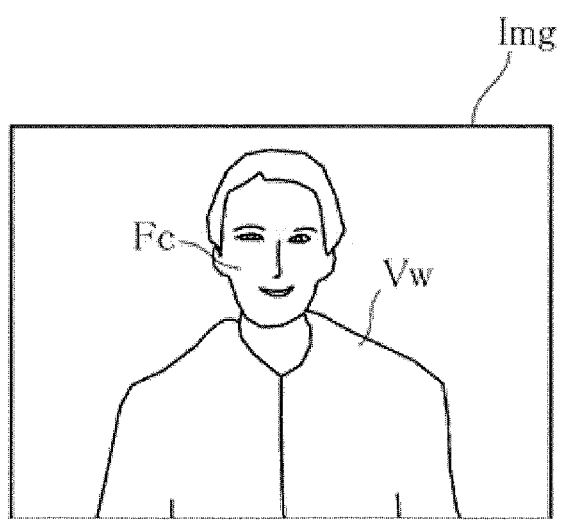

FIG.56
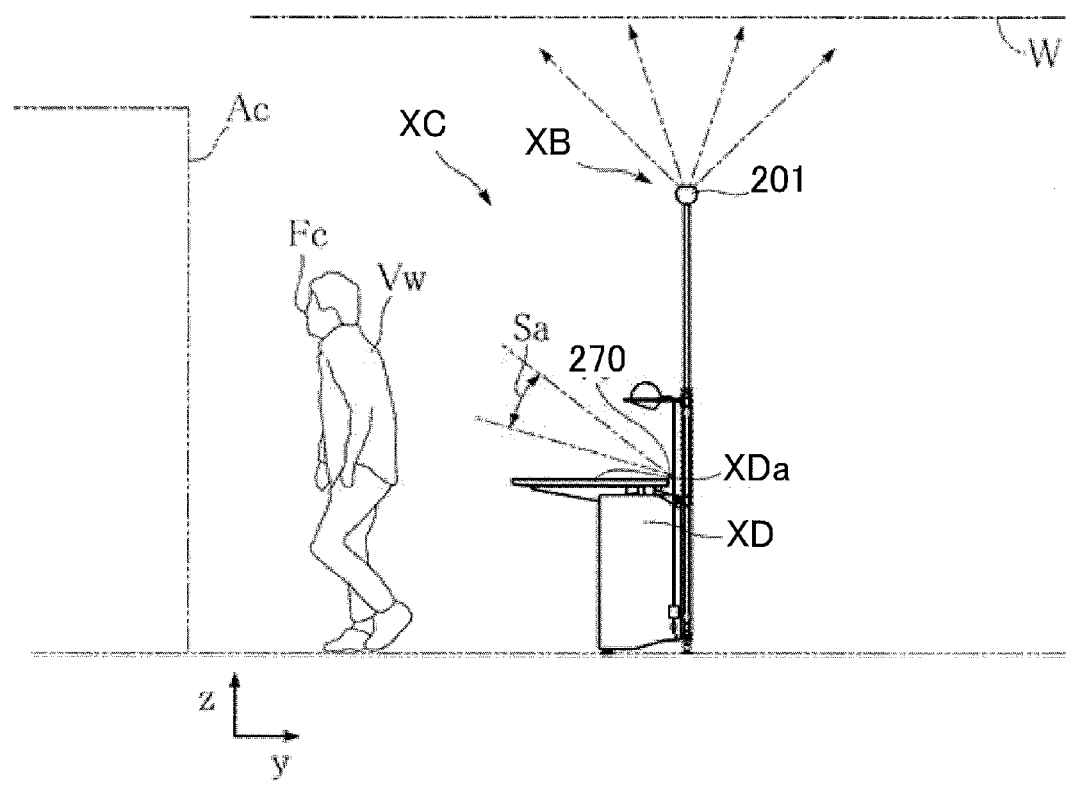
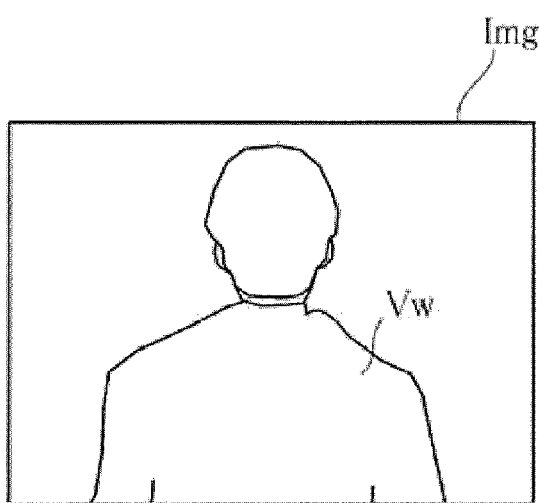

FIG.57
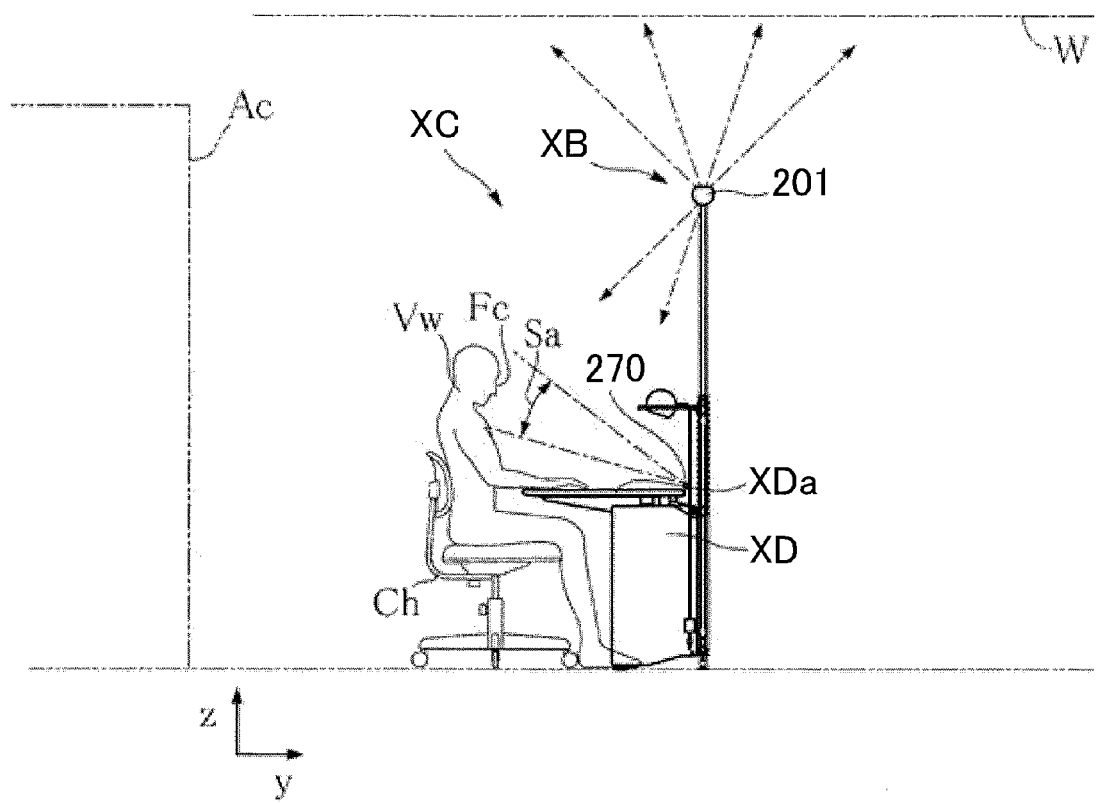
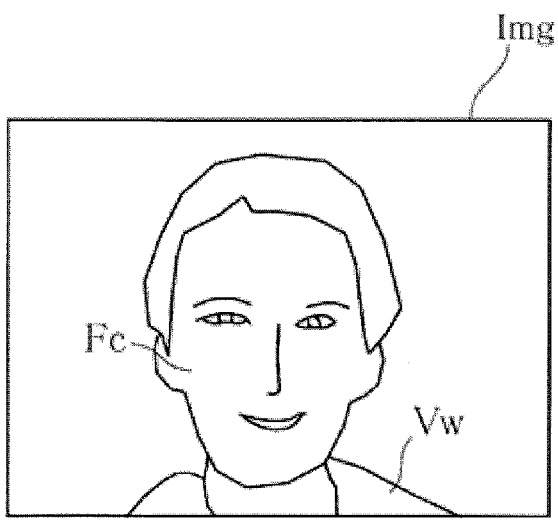

FIG.58
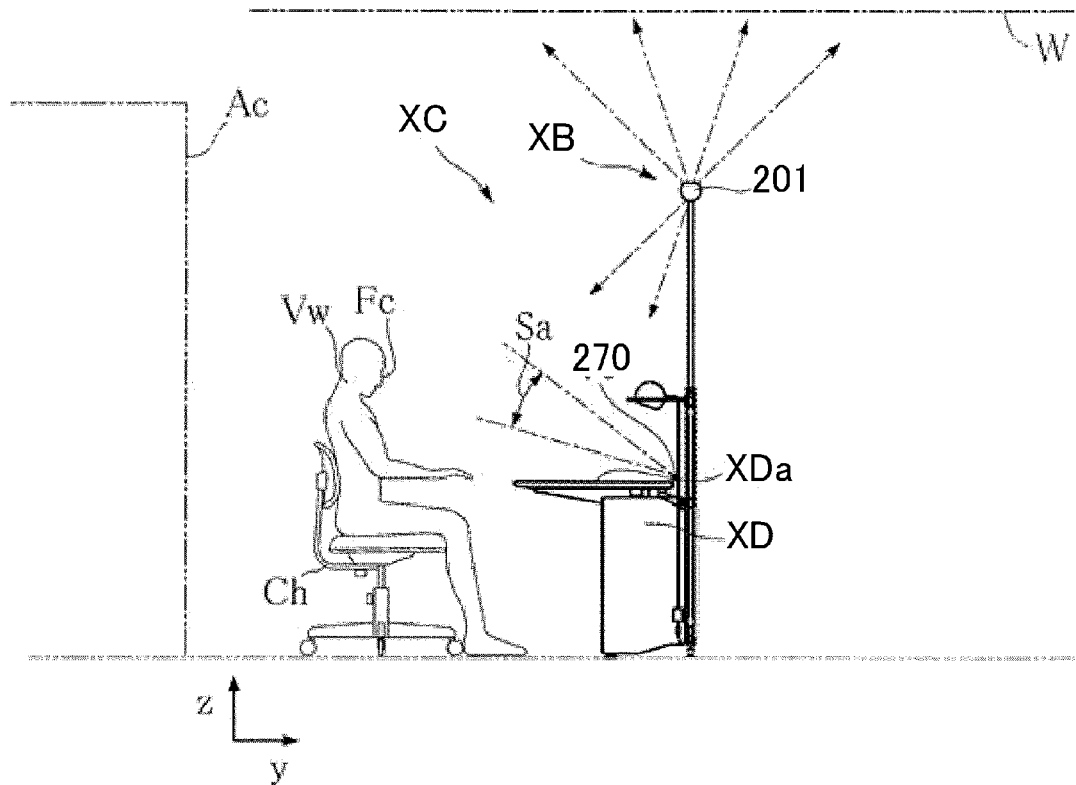
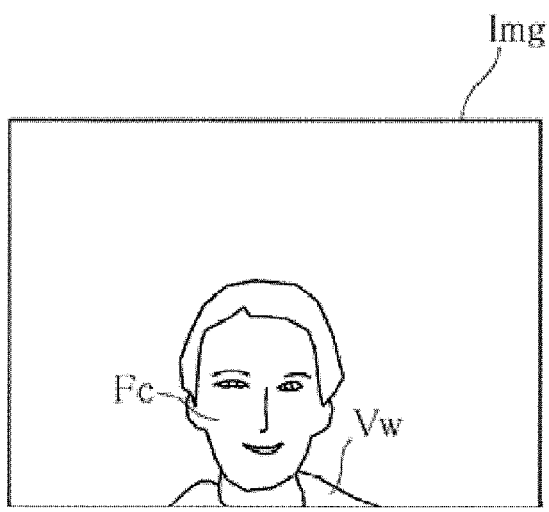

FIG.59
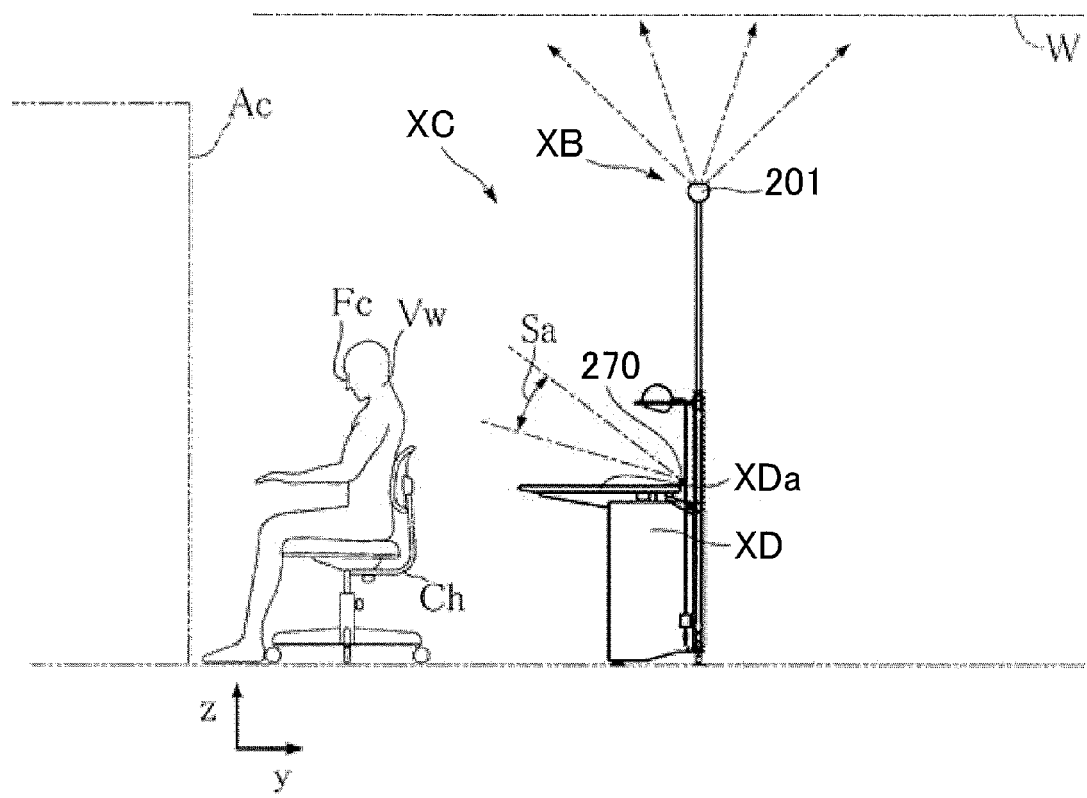
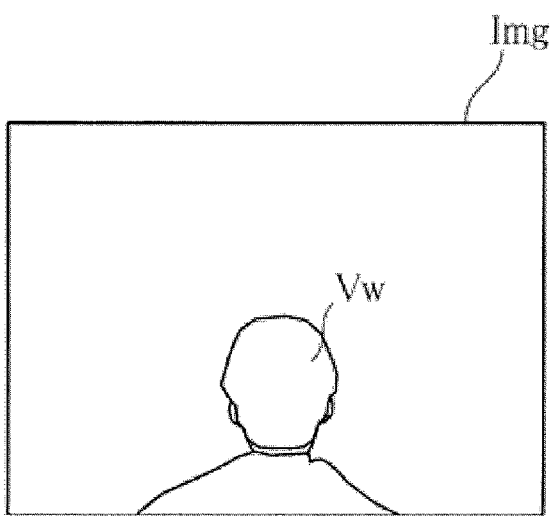

FIG.61
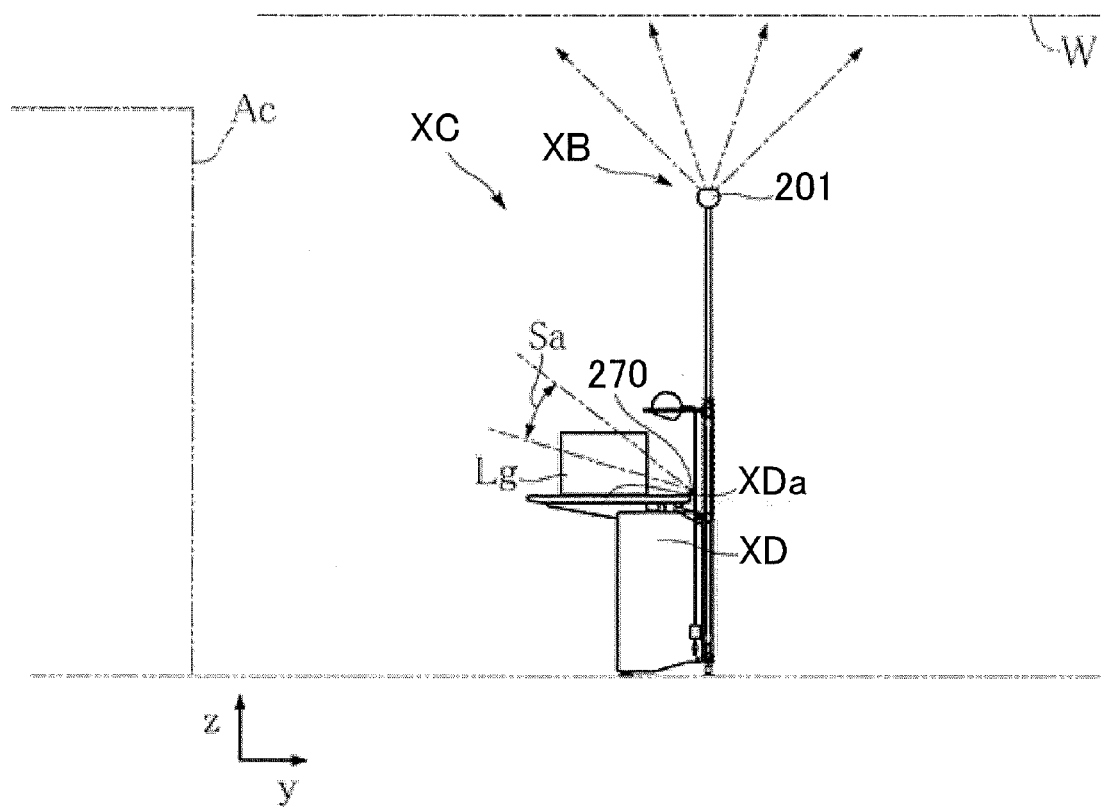
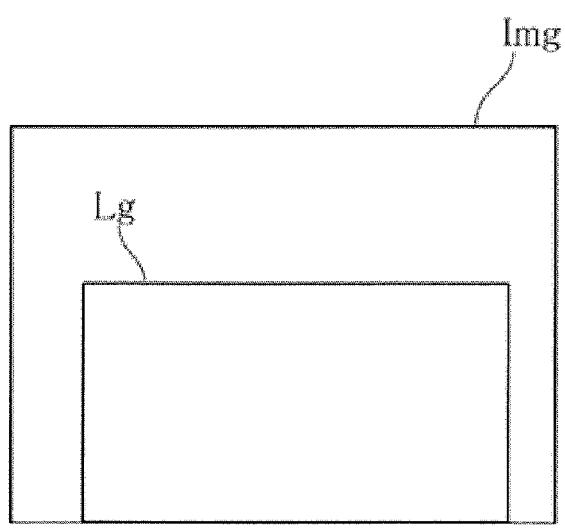

ILLUMINATION DEVICE

CROSS-REFERENCE TO RELATED APPLICATIONS

This application is based on the following Japanese applications, the contents of which are hereby incorporated by reference.
(1) Japanese Patent Application No. 2010-164969 (Filing date: Jul. 22, 2010)
(2) Japanese Patent Application No. 2010-187077 (Filing date: Aug. 24, 2010)
(3) Japanese Patent Application No. 2011-099117 (Filing date: Apr. 27, 2011)

BACKGROUND OF THE INVENTION

1. Field of the Invention

Of the various technical features disclosed in the present specification, a first technical feature relates to an illumination device provided with a dimmer function or a toning function, for example.

Of the various technical features disclosed in the present specification, a second technical feature relates to an LED illumination system for illuminating a reading table in a library, for example.

2. Description of Related Art

<First Background Technique and Problems Thereof>

Illumination devices (task lights, kitchen illumination, and the like) that use an LED (Light Emitting Diode) as a light source have recently been put into use.

The specification of Japanese Patent No. 3060478 can be cited as an example of a relevant conventional technique.

For example, although the housing of a task light which uses an LED can be molded extremely thin in comparison with a task light which uses an incandescent lamp or a fluorescent lamp, the small thickness of the housing makes it difficult to provide controlling elements (a power supply switch, a dimmer knob, and other components) to the housing.

The kitchen illumination used in a wet area, for example, often must also be operated by wet or dirty hands, and safety or sanitary problems therefore arise.

<Second Background Technique and Problems Thereof>

FIG. 63 shows an example of a conventional illumination system (see Japanese Laid-open Patent Publication No. 2010-140754, for example). The illumination system XX shown in FIG. 63 is provided with a plurality of illumination devices 291 and a camera unit 292. The plurality of illumination devices 291 is attached to a wall surface or other part of a library, for example, and illuminates a location where a reader Vw walks. The camera unit 292 is attached to a ceiling W, and captures an image of the walking reader Vw below. The image of the camera unit 292 is subjected to image processing by an image processing control means not shown in the drawing. As a result, a nearby illumination device 291 is lit in a case in which a determination is made that the reader Vw is included in the image. In a case in which a determination is made that the reader Vw is not included in the image, the illumination device 291 is turned off. The steps or the like of a reader Vw who is walking inside a library can thereby be appropriately illuminated.

For example, inside a library, a plurality of reading tables is provided for allowing readers Vw to read books. The reading tables must be illuminated at a brightness that is suitable to allow a reader Vw to read a book. Electrical power is wasted by illuminating a reading table at which there is no reader Vw seated. It is difficult for the illumination system XX to appropriately illuminate each reading table according to the state of a reader Vw.

SUMMARY OF THE INVENTION

<First Technical Feature>

In view of the abovementioned problems discovered by the present applicants, an object of the first technical feature of the various technical features disclosed in the present specification is to provide an illumination device capable of touchless operation.

In order to achieve the objects described above, the illumination device according to a first technical feature comprises a light source; a touchless sensor for detecting proximity and movement of an object without contact; and a control unit for controlling the driving of the light source on the basis of an output of the touchless sensor (configuration 1-1).

In the illumination device according to configuration 1-1, a configuration (configuration 1-2) may be adopted in which the control unit performs on/off control of the light source when the object is stationary for a predetermined time while in proximity to the touchless sensor.

In the illumination device according to configuration 1-1 or 1-2, a configuration (configuration 1-3) may be adopted in which the control unit performs dimmer control or toning control of the light source in accordance with a predetermined direction when the object is moved in the predetermined direction while in proximity to the touchless sensor.

In the illumination device according to configuration 1-3, a configuration (configuration 1-4) may be adopted in which the control unit increases the intensity of the light source when the object is moved in a first direction; decreases the intensity of the light source when the object is moved in a second direction; increases the color temperature of the light source when the object is moved in a third direction; and decreases the color temperature of the light source when the object is moved in a fourth direction.

In the illumination device according to configuration 1-4, a configuration (configuration 1-5) may be adopted in which the first direction and the second direction are mutually opposite directions; the third direction and the fourth direction are mutually opposite directions; and the first direction and the second direction, and the third direction and the fourth direction are mutually orthogonal.

The illumination device according to any of configurations 1-1 through 1-5 may be configured (configuration 1-6) so as to have a housing to which the light source and the touchless sensor are provided; and an arm attached to the housing.

In the illumination device according to configuration 1-6, a configuration (configuration 1-7) may be adopted in which the touchless sensor is installed in the vicinity of an arm attachment part to which the arm is attached.

In the illumination device according to any of configurations 1-1 through 1-5, a configuration (configuration 1-8) may be adopted in which the light source is attached to a ceiling, and the touchless sensor is attached to a wall surface.

In the illumination device according to any of configurations 1-1 through 1-8, a configuration (configuration 1-9) may be adopted in which the light source has at least one LED.

In the illumination device according to configuration 1-9, a configuration (configuration (1-10) may be adopted in which the LED comprises a plurality of LED elements having different emission colors; and the control unit controls driving of the LED elements individually for each color.

In the illumination device according to any of configurations 1-1 through 1-10, a configuration (configuration 1-11)

may be adopted in which the touchless sensor comprises a plurality of light emitters from which light is emitted in sequence, the light emitters being provided in mutually different positions; a single light receiver for detecting each reflected light incident in sequence, the reflected light having been emitted in sequence from the plurality of light emitters and reflected by the object; and a reflected light intensity information generator for generating a plurality of reflected light intensity information indicating the intensity of each reflected light detected by the light receiver; wherein the control unit receives the plurality of reflected light intensity information generated by the reflected light intensity information generator and determines the proximity and movement of the object.

In the illumination device according to configuration 1-11, a configuration (configuration 1-12) may be adopted in which the control unit computes a phase difference of an intensity variation between each reflected light and determines the movement of the object on the basis of the computed result.

In the illumination device according to configuration 1-12, a configuration (configuration 1-13) may be adopted in which the plurality of reflected light intensity information includes first reflected light intensity information for indicating the intensity of a first reflected light that reaches the light receiver from a first light emitter via the object; second reflected light intensity information for indicating the intensity of a second reflected light that reaches the light receiver from a second light emitter via the object; and third reflected light intensity information for indicating the intensity of a third reflected light that reaches the light receiver from a third light emitter via the object; and the control unit acquires the absolute values of each of at least two phase differences among the phase difference of an intensity variation between the first reflected light and the second reflected light, the phase difference of an intensity variation between the first reflected light and the third reflected light, and the phase difference of an intensity variation between the second reflected light and the third reflected light, and determines the movement axis of the object on the basis of a size relationship between the acquired absolute values.

In the illumination device according to configuration 1-13, a configuration (configuration 1-14) may be adopted in which the control unit determines the movement direction of the object on the movement axis on the basis of the positive or negative sign of the phase difference whose absolute value is determined to be the larger among two phase differences whose absolute values are compared.

In the illumination device according to any of configurations 1-11 through 1-14, a configuration (configuration 1-15) may be adopted in which each of the plurality of light emitters is an infrared LED for emitting infrared light.

In the illumination device according to any of configurations 1-11 through 1-15, a configuration (configuration 1-16) may be adopted in which the plurality of light emitters is provided at vertex positions of a regular polygon; and the light receiver is provided at the center of gravity of the regular polygon.

In the illumination device according to configuration 1-16, a configuration (configuration 1-17) may be adopted in which the regular polygon is an equilateral triangle.

Through the first technical feature described above, an illumination device capable of touchless operation can be provided.

<Second Technical Feature>

A second technical feature of the various technical features disclosed in the present specification was developed in view of the foregoing problems, and an object thereof is to provide an LED illumination system capable of promoting low power consumption while appropriately lighting when required, such as when a reader is reading.

In order to achieve the abovementioned objects, the LED illumination system according to the second technical feature comprises (configuration 2-1) an LED illumination device provided with a plurality of LED chips; imaging means for capturing an image of a specific imaging region; and face recognition control means which has a face recognition function for recognizing whether a face in a specific state is included in an image of the imaging means, and a dimmer function for increasing the intensity of the LED illumination device when a transition occurs from a state in which the face in a specific state is not included in the image to a state in which the face in a specific state is included in the image, and reducing the intensity of the LED illumination device when a transition occurs from a state in which the face in a specific state is included in the image to a state in which the face in a specific state is not included in the image.

In the LED illumination system according to configuration 2-1, a configuration (configuration 2-2) may be adopted in which the specific state is a state in which the face is directly facing the imaging means.

In the LED illumination system according to configuration 2-2, a configuration (configuration 2-3) may be adopted in which the LED illumination device illuminates the tabletop of a desk.

In the LED illumination system according to configuration 2-3, a configuration (configuration 2-4) may be adopted in which the imaging means is provided at an inner part of the tabletop.

In the LED illumination system according to configuration 2-4, a configuration (configuration 2-5) may be adopted in which the specific imaging region is a region directed at an upward angle in front of the tabletop from the imaging means.

In the LED illumination system according to any of configurations 2-1 through 2-5, a configuration (configuration 2-6) may be adopted in which the LED illumination system comprises one or more LED units each provided with a plurality of LED modules having the LED chips.

In the LED illumination system according to configuration 2-6, a configuration (configuration 2-7) may be adopted in which the LED unit comprises a substrate on which the plurality of LED modules is mounted, the substrate extending in a first direction; and a support member whose U-shaped cross-section extends in the first direction, the substrate being attached to a bottom external surface of the support member.

The LED illumination system according to configuration 2-7 may be configured (configuration 2-8) so as to further comprise a power supply unit for supplying electrical power to the plurality of LED modules, wherein the power supply unit is accommodated in the support member.

The LED illumination system according to any of configurations 2-6 through 2-8 may be configured (configuration 2-9) so as to comprise a plurality of the LED unit, wherein any of the plurality of LED units illuminates a tabletop of a desk, and the intensity thereof is controlled by the face recognition control means.

In the LED illumination system according to configuration 2-9, a configuration (configuration 2-10) may be adopted in which any of the plurality of LED units illuminates a ceiling, and the intensity thereof is not controlled by the face recognition control means.

The LED illumination system according to configuration 2-10 may be configured (configuration 2-11) so as to further comprise a support cover for supporting the plurality of LED units, the support cover extending in the first direction.

Through the second technical feature described above, a determination is made that brightness is required at the time that the user of the LED illumination system shows a face in the specific state in the specific imaging region, and the LED illumination device can be appropriately lit. On the other hand, a determination is made that brightness is not required in a case in which the face in the specific state of the user does not appear in the specific imaging region, and illumination can be appropriately turned off. It is therefore possible to promote low power consumption while appropriately turning on and turning off the illumination.

<Other Technical Features>

By combining the abovementioned first technical feature and second technical feature, for example, an illumination device can be realized which has a light source, a touchless sensor for detecting proximity and movement of an object without contact, an image-capturing unit for capturing an image of a specific imaging region, and a control unit for controlling the driving of the light source on the basis both of movement detection using the touchless sensor and face detection using the image-capturing unit.

Other configurations and advantages relating to the first and second technical features described above, and other technical features, will become apparent from the detailed description given below with reference to the accompanying drawings.

BRIEF DESCRIPTION OF THE DRAWINGS

FIG. 2 is a view showing the scheme of communication between the MCU and the data register shown in FIG. 1;

FIG. 3 is a view showing the configuration of the data register shown in FIG. 1;

FIG. 4 is a view showing the configuration of the register ALS_CONTROL shown in FIG. 3;

FIG. 5 is a view showing the configuration of the register PS_CONTROL shown in FIG. 3;

FIG. 6 is a view showing the configuration of the register I_LED shown in FIG. 3;

FIG. 7 is a view showing the configuration of the register I_LED33 shown in FIG. 3;

FIG. 8 is a view showing the configuration of the register ALS_PS_MEAS shown in FIG. 3;

FIG. 9 is a view showing the configuration of the register PS_MEAS_RATE shown in FIG. 3;

FIG. 10 is a view showing the configuration of the register ALS_PS_STATUS shown in FIG. 3;

FIG. 12 is a view showing the configuration of the register INTERRUPT shown in FIG. 3;

FIG. 13 is a view showing the configuration of the register PS_TH_LED shown in FIG. 3;

FIG. 14 is a view showing an example of the data stored in the register PS_DATE_LED31 shown in FIG. 3;

FIG. 22 is a time chart showing the hand gesture detection function of the mobile telephone device shown in FIG. 19;

FIG. 24C is a table showing the content of the data averaging processing;

FIG. 26 is a schematic view showing an example of the display processing for left-right motion;

FIG. 27 is a schematic view showing an example of the display processing for up-down motion;

FIG. 30A is a view showing an example of the conversion table referenced in step S303;

FIG. 30B is a table showing another method for step S303;

FIG. 31 is a schematic view showing an example of the display processing for distance motion;

FIG. 54 is a side view and image thereof, showing a state in which a reader is walking in the LED illumination system shown in FIG. 1;

FIG. 55 is a side view and image thereof, showing a state in which a reader is standing so as to face the reading table in the LED illumination system shown in FIG. 1;

FIG. 56 is a side view and image thereof, showing a state in which a reader is standing so as to face away from the reading table in the LED illumination system shown in FIG. 1;

FIG. 57 is a side view and image thereof, showing a state in which a reader is seated so as to face the reading table in the LED illumination system shown in FIG. 1;

FIG. 58 is a side view and image thereof, showing a state in which a reader is seated at a distance from the reading table in the LED illumination system shown in FIG. 1;

FIG. 59 is a side view and image thereof, showing a state in which a reader is seated so as to face away from the reading table in the LED illumination system shown in FIG. 1;

FIG. 61 is a side view and image thereof, showing a state in which a parcel is placed on the tabletop of the reading table in the LED illumination system shown in FIG. 1;

DETAILED DESCRIPTION OF PREFERRED EMBODIMENTS

<Configuration and Operation of the Semiconductor Device>

Figure 1:
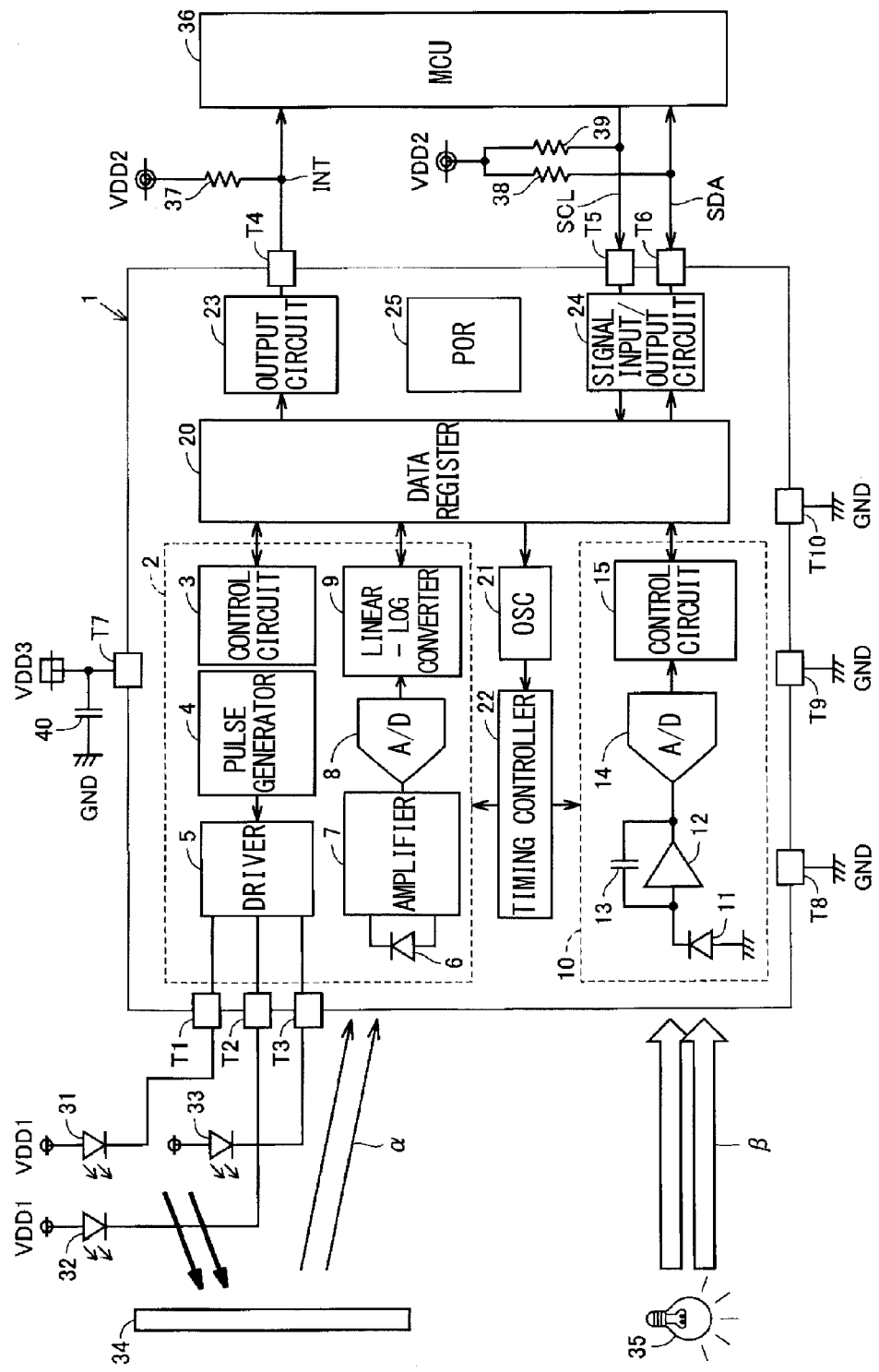
FIG. 1 is a block diagram showing the configuration of a semiconductor device.

FIG. 1 is a block diagram showing the configuration of a semiconductor device. The semiconductor device 1 according to the present configuration example is provided with a proximity sensor 2, an illuminance sensor 10, a data register 20, an oscillator (OSC) 21, a timing controller 22, a signal output circuit 23, a signal input/output circuit 24, drive terminals T1 through T3, a signal output terminal T4, a clock input terminal T5, a serial data input/output terminal T6, a power supply terminal T7, ground terminals T8, T9, and a test terminal T10, as shown in FIG. 1.

The cathodes of infrared LEDs (Light Emitting Diode) 31 through 33 are connected to the drive terminals T1 through T3, respectively. The anodes of the infrared LEDs 31 through 33 each receive a power supply voltage VDD1. The proximity sensor 2 includes a control circuit 3, a pulse generator 4, a driver 5, an infrared light sensor 6, an amplifier 7, an A/D converter 8, and a linear-log converter 9. The control circuit 3 controls the proximity sensor 2 as a whole in accordance with a control signal stored in the data register 20.

The pulse generator 4 generates a pulse signal for driving the infrared LEDs 31 through 33. The driver 5 maintains each of the drive terminals T1 through T3 in a high-impedance state and grounds the drive terminal of any of the drive terminals T1 through T3 in response to the pulse signal generated by the pulse generator 4. It is possible to select whether to use any one, two, or three infrared LEDs of the infrared LEDs 31 through 33 through the use of the signal stored in the data register 20. The current value that flows to each selected infrared LED and the cycle length whereby each selected infrared LED emits light can be set by the signal stored in the data register 20 (see FIGS. 3, 6, 7, and 9).

When the drive terminal of any of the drive terminals T1 through T3 is grounded by the driver 5, current flows to the infrared LED that corresponds to the drive terminal, and infrared light is emitted from the corresponding infrared LED. The infrared light α emitted from the infrared LED is reflected by a reflecting object 34, and is incident on the infrared light sensor 6. Infrared light from the sun is also incident on the infrared light sensor 6. The infrared light sensor 6 is composed of a photodiode having a peak wavelength of 850 nm, for example. The infrared light sensor 6 generates a photocurrent whose level corresponds to the light intensity of the incident infrared light α. The photocurrent includes a pulse component based on the infrared light α from the infrared LEDs 31 through 33, and a direct-current component based on the infrared light from the sun.

The amplifier 7 amplifies only the pulse component of the photocurrent generated by the infrared light sensor 6, and outputs an analog voltage whose level corresponds to the light intensity of the infrared light α incident on the infrared light sensor 6. The A/D converter 8 converts the analog voltage outputted from the amplifier 7 into a digital signal. The level of the analog voltage and the numerical value of the digital signal are in a linear relationship. The linear-log converter 9 calculates a logarithm of the numerical value of the digital signal generated by the A/D converter 8 and stores an 8-bit digital signal that indicates the calculated logarithm in the data register 20 (see FIGS. 3 and 11).

The illuminance sensor 10 is provided with a visible-light sensor 11, an amplifier 12, a capacitor 13, an A/D converter 14, and a control circuit 15. Visible light β generated by a visible-light source 35 on the periphery of the semiconductor device 1 is incident on the visible-light sensor 11. The visible-light source 35 is a fluorescent lamp, an incandescent bulb, the sun, or another light source. The visible-light sensor 11 is composed of a photodiode having a peak wavelength of 550 nm, for example. The visible-light sensor 11 generates a photocurrent whose level corresponds to the light intensity of the incident visible light β.

The amplifier 12 and the capacitor 13 convert the photocurrent into an analog voltage. The A/D converter 14 converts the analog voltage to a 16-bit digital signal and presents the digital signal to the control circuit 15. The control circuit 15 controls the illuminance sensor 10 as a whole in accordance with the control signal stored in the data register 20, and stores the digital signal generated by the A/D converter 14 in the data register 20 (see FIGS. 3 and 4).

The oscillator 21 generates a clock signal in accordance with the control signal stored in the data register 20. The timing controller 22 controls the operational timing of each of the proximity sensor 2 and the illuminance sensor 10 in synchronization with the clock signal from the oscillator 21.

The signal output terminal T4 is connected to an MCU (Micro Control Unit) 36 via a signal line, and is connected to a power supply voltage VDD2 line via a resistor element 37. In accordance with an interrupt signal INT stored in the data register 20, the output circuit 23 presents the interrupt signal INT to the MCU 36 by placing the signal output terminal T4 in a grounded state or a floating state. The interrupt signal INT is activated in a case in which the intensity of the infrared light α incident on the infrared light sensor 6 exceeds a predetermined threshold value, or in a case in which the intensity of the visible light β incident on the visible-light sensor 11 exceeds a predetermined range. The case in which the interrupt signal INT is activated can be set by a signal stored in the data register 20 (see FIGS. 3, 10, 12, and 13).

The clock input terminal T5 is connected to the MCU 36 via a signal line, and is connected to the power supply voltage VDD2 line via a resistor element 39. The a serial data input/output terminal T6 is connected to the MCU 36 via a signal line, and is connected to the power supply voltage VDD2 line via a resistor element 38. The MCU 36 presents a clock signal SCL to the data register 20 via the signal input/output circuit 24 by placing the clock input terminal T5 in a grounded state or a floating state. The MCU 36 also presents a serial data signal SDA to the data register 20 via the signal input/output circuit 24 by placing the a serial data input/output terminal T6 in a grounded state or a floating state.

The data register 20 operates in synchronization with the clock signal SCL presented from the MCU 36, and stores the serial data signal SDA presented from the MCU 36 at a selected address. The data register 20 operates in synchronization with the clock signal SCL presented from the MCU 36, reads stored data from the selected address, and presents the read data as the serial data signal SDA to the MCU 36 via the signal input/output circuit 24 and the serial data input/output terminal T6.

The output circuit 23 transmits the interrupt signal INT, which is outputted from the data register 20, to the MCU 36 via the signal output terminal T4. The output circuit 23 places the signal output terminal T4 in a high-impedance state in a case in which the interrupt signal INT outputted from the data register 20 is "H"-level, and places the signal output terminal T4 at an "L"-level in a case in which the interrupt signal INT outputted from the data register 20 is "L"-level.

The signal input/output circuit 24 transmits to the data register 20 the clock signal SCL which is presented from the MCU 36 via the clock input terminal T5, and transmits to the data register 20 the serial data signal SDA which is presented from the MCU 36 via the serial data input/output terminal T6.

The signal input/output circuit 24 also transmits the serial data signal outputted from the data register 20 to the MCU 36 via the serial data input/output terminal T6. The signal input/output circuit 24 places the serial data input/output terminal T6 in a high-impedance state in a case in which the data signal outputted from the data register 20 is "H"-level, and the signal input/output circuit 24 places the serial data input/output terminal T6 at an "L"-level in a case in which the data signal outputted from the data register 20 is "L"-level. A power-on reset (POR) circuit 25 resets the data in the data register 20 in accordance with the introduction of a power supply voltage VDD3.

The power supply voltage VDD3 for driving the semiconductor device 1 is applied to the power supply terminal T7. One electrode of a capacitor 40 for stabilizing the power supply voltage VDD3 is connected to the power supply terminal T7. The other electrode of the capacitor 40 is grounded. The ground terminal T8 is a terminal for draining the current of the LEDs 31 through 33, and is grounded. The ground terminal T9 is a terminal for presenting a ground voltage GND to internal circuits 2 through 15 and 20 through 25 of the semiconductor device 1. The test terminal T10 is placed at "H"-level when in test mode, and is grounded as shown in FIG. 1 during normal operation.

FIGS. 2A through 2D are views showing the method of communication between the MCU 36 and the data register 20. In this communication method, data can be read and written from a master to a plurality of slaves. The MCU 36 is the master in this case, and the data register 20 is a slave. The slave is selected by a 7-bit slave address (0111000 in the drawing). A read/write flag is usually added to the 7-bit slave address. The serial clock signal SCL is outputted from the master. The slave performs input/output of the serial data signal SDA in synchronization with the serial clock signal SCL from the master. In other words, the slave takes in the serial data signal SDA in synchronization with the serial clock signal SCL, and conversely, outputs the serial data signal SDA in synchronization with the serial clock signal SCL.

Communication of information begins with a start condition ST from the master side and ends with a stop condition SP. The start condition ST is set when the serial data signal SDA changes from "H"-level to "L"-level in a case in which the serial clock signal SCL is "H"-level. The stop condition SP is set when the serial data signal SDA changes from "L"-level to "H"-level in a case in which the serial clock signal SCL is "H"-level.

A data bit is established while the serial clock signal SCL is "H"-level. The level of the serial data signal SDA is kept constant during the time in which the serial clock signal SCL is "H"-level, and is changed during the time in which the serial clock signal SCL is "L"-level. The data are in units of 1 byte (8 bits), and are transferred in sequence from the high-order bit. The receiving side returns a signal ACK (a 1-bit 0) to the transmitting side for each byte. A signal NACK (a 1-bit 1) can also be returned after reception of 1 byte. The signal NACK is used in a case in which the master indicates the end of data transfer to a slave during data transfer from the slave to the master.

A sequence of communication is always initiated by a start condition ST from the master. The byte immediately following the start condition ST is composed of a 7-bit slave address and a 1-bit read/write flag. The value 0 is set in the read/write flag in the case of transfer from the master to the slave, and the value 1 is set in the read/write flag in the case of transfer from the slave to the master. The slave that receives the slave address returns a signal ACK to the master, and communication between the master and the slave is thereby established.

In a case in which the address of the data register 20 as a slave is specified, the MCU 36 as the master sets the start condition ST, transmits the 7-bit slave address, sets the read/write flag to 0, and subsequently transmits a 1-byte register address (100XXXXX in the drawing) in response to a signal ACK from the slave, and transmits the stop condition SP in response to a signal ACK from the slave, as shown in FIG. 2A. In the drawing, X is 0 or 1.

In a case in which the address of the data register 20 as the slave is specified for writing of data, the MCU 36 as the master sets the start condition ST, transmits the 7-bit slave address, sets the read/write flag to 0, and subsequently transmits the 1-byte register address (100XXXXX in the drawing) in response to a signal ACK from the slave, and continues to transmit data in 1-byte units in response to a signal ACK from the slave, as shown in FIG. 2B. The slave returns a signal ACK for each byte of data received. Once transmission of data is ended, the master sets the start condition ST and ends communication.

In a case in which the address of the data register 20 as the slave is specified for reading of data, the MCU 36 as the master sets the start condition ST, transmits the 7-bit slave address, sets the read/write flag to 0, and subsequently transmits the 1-byte register address (100XXXXX in the drawing) in response to a signal ACK from the slave, as shown in FIG. 2C.

In response to a signal ACK from the slave, the master again sets the start condition ST, transmits the 7-bit slave address, and sets the read/write flag to 1. The slave transmits data in 1-byte units to the master after returning a signal ACK. The master returns a signal ACK for each byte of data received. When the last data are received, the master returns a signal NACK and subsequently sets the start condition ST and ends communication.

In a case in which data are read without specifying the address of the data register 20 as the slave, the MCU 36 as the master sets the start condition ST, transmits the 7-bit slave address, and sets the read/write flag to 1, as shown in FIG. 2D. The slave transmits data in 1-byte units to the master after returning a signal ACK. The master returns a signal ACK for each byte of data received. When the last data are received, the master returns a signal NACK and subsequently sets the start condition ST and ends communication.

FIG. 3 is a view showing the configuration of the data register 20. In FIG. 3, addresses 80h through 86h, and 92h through 99h of the data register 20 are used for reading and writing (RW) of information, and addresses 8Ah through 91h are used for reading (R) of information. The addresses 80h through 86h, 92h through 99h, and 8Ah through 91h each constitute a register. The addresses are indicated by base 16 (h) values.

Information relating to ALS (Ambient Light Sensor: illuminance sensor) operation mode control and SW (software) reset is stored in a register ALS_CONTROL at address 80h. Information relating to PS (Proximity Sensor: proximity sensor) operation mode control is stored in a register PS_CONTROL at address 81h. Information relating to selecting the LED that is to be activated and setting the currents of the LEDs 31, 32 is stored in a register I_LED at address 82h. Information relating to setting the current of the LED 33 is stored in a register I_LED33 at address 83h.

Information relating to a forced mode trigger is stored in a register ALS_PS_MEAS at address 84h. Information relating to the PS measurement rate in a standalone mode is stored in a register PS_MEAS_RATE at address 85h. Information relating to the ALS measurement rate in the standalone mode is stored in a register ALS_MEAS_RATE at address 86h. A part number and revision ID (Identification data: identification information), i.e., an ID of the proximity sensor 2, are stored in a register PART_ID at address 8Ah. An ID of the manufacturer of the semiconductor device 1 is stored in a register MANUFACT_ID at address 8Bh.

The low-order byte of the measurement result of the illuminance sensor 10 is stored in a register ALS_DATA_0 at address 8Ch. The high-order byte of the measurement result of the illuminance sensor 10 is stored in a register ALS_DATA_1 at address 8Dh. Information relating to the measurement data and the interrupt state is stored in a register ALS_PS_STATUS at address 8Eh.

Proximity data (measurement data of infrared light from the LED 31) from the LED 31 are stored in a register PS_DATA_LED31 at address 8Fh. Proximity data (measurement data of infrared light from the LED 32) from the LED 32 are stored in a register PS_DATA_LED32 at address 90h. Proximity data (measurement data of infrared light from the LED 33) from the LED 33 are stored in a register PS_DATA_LED33 at address 91h.

Information relating to setting the interrupt is stored in a register INTERRUPT at address 92h. A PS interrupt threshold value for the LED 31 is stored in a register PS_TH_LED31 at address 93h. A PS interrupt threshold value for the LED 32 is stored in a register PS_TH_LED32 at address 94h. A PS interrupt threshold value for the LED 33 is stored in a register PS_TH_LED33 at address 95h.

The low-order byte of an ALS upper threshold value is stored in a register ALS_TH_UP_0 at address 96h. The high-order byte of the ALS upper threshold value is stored in a register ALS_TH_UP_1 at address 97h. The low-order byte of the ALS lower threshold value is stored in a register ALS_TH_LOW_0 at address 98h. The high-order byte of the ALS lower threshold value is stored in a register ALS_TH_LOW_1 at address 99h.

The main registers of the plurality of registers shown in FIG. 3 will next be described in further detail. As shown in FIG. 4 (a) and (b), the addresses ADD7 through ADD3 as the high-order five bits of the register ALS_CONTROL at address 80h are used as reserved (RES) fields, the address ADD2 as the next one bit is used as a SW reset field, and the low-order two bits ADD1, ADD0 are used as ALS mode fields. The value 0 is written to each of the addresses ADD7 through ADD3. The value 0 is written to the address ADD2 in a case in which initial reset is not initiated, and the value 1 is written to the address ADD2 in a case in which initial reset is initiated. The value 00 or 01 is written to the addresses ADD1, ADD0 in a case in which a standby mode is set, the value 10 is written in a case in which the forced mode is set, and the value 11 is written in a case in which the standalone mode is set.

As shown in FIG. 5 (a) and (b), the addresses ADD7 through ADD2 as the high-order six bits of the register PS_CONTROL at address 81h are used as NA fields, and the low-order two bits ADD1, ADD0 are used as PS mode fields. The addresses ADD7 through ADD4 are each ignored. The value 00 or 01 is written to the addresses ADD1, ADD0 in a case in which a standby mode is set, the value 10 is written in a case in which the forced mode is set, and the value 11 is written in a case in which the standalone mode is set.

As shown in FIG. 6 (a) and (b), the addresses ADD7, ADD6 as the high-order two bits of the register I_LED at address 82h are used as activation fields, the next three bits ADD5 through ADD3 are used as current fields for the LED 32, and the low-order three bits ADD2 through ADD0 are used as current fields for the LED 31. In a case in which the LED 31 is activated and the LEDs 32, 33 are deactivated, 00 is written to the high-order addresses ADD7, ADD6. In a case in which the LEDs 31, 32 are activated and the LED 33 is deactivated, 01 is written to the high-order addresses ADD7, ADD6. In a case in which the LEDs 31, 33 are activated and the LED 32 is deactivated, 10 is written to the high-order addresses ADD7, ADD6. In a case in which all the LEDs 31 through 33 are activated, 11 is written to the high-order addresses ADD7, ADD6.

Any of 000 through 111 is written to the intermediate addresses ADD5 through ADD3. The values 000 through 101 are written in a case in which the current value of the LED 32 is set to 5, 10, 20, 50, 100, or 150 mA, respectively. Any one of 110 and 111 is written in a case in which the current value of the LED 32 is set to 200 mA. Consequently, in the semiconductor device 1, the current value of the LED 32 can be set to the desired value among the values 5, 10, 20, 50, 100, 150, and 200 mA.

Any of 000 through 111 is written to the low-order addresses ADD2 through ADD0. The values 000 through 101 are written in a case in which the current value of the LED 31 is set to 5, 10, 20, 50, 100, or 150 mA, respectively. Any one of 110 and 111 is written in a case in which the current value of the LED 31 is set to 200 mA. Consequently, in the semiconductor device 1, the current value of the LED 31 can be set to the desired value among the values 5, 10, 20, 50, 100, 150, and 200 mA.

As shown in FIG. 7 (*a*) and (*b*), the addresses ADD7 through ADD3 as the high-order five bits of the register I_LED33 at address 83*h* are used as NA (No Assign) fields, and the low-order three bits ADD2 through ADD0 are used as current fields for the LED 33. The addresses ADD7 through ADD3 are each ignored. Any of 000 through 111 is written to the addresses ADD2 through ADD0. The values 000 through 101 are written in a case in which the current value of the LED 33 is set to 5, 10, 20, 50, 100, or 150 mA, respectively. Any one of 110 and 111 is written in a case in which the current value of the LED 33 is set to 200 mA. Consequently, in the semiconductor device 1, the current value of the LED 33 can be set to the desired value among the values 5, 10, 20, 50, 100, 150, and 200 mA.

As shown in FIG. 8 (*a*) and (*b*), the addresses ADD7 through ADD2 as the high-order six bits of the register ALS_PS_MEAS at address 84*h* are used as NA fields, the address ADD1 of the next one bit is used as an ALS trigger field, and the low-order one bit ADD0 is used as a PS trigger field. The addresses ADD7 through ADD2 are ignored. The value 0 is written to the address ADD1 in a case in which new ALS measurement is not initiated, and the value 1 is written in a case in which new ALS measurement is initiated. The value 0 is written to the address ADD0 in a case in which new PS measurement is not initiated, and the value 1 is written in a case in which new PS measurement is initiated.

As shown in FIG. 9 (*a*) and (*b*), the addresses ADD7 through ADD4 as the high-order four bits of the register PS_MEAS_RATE at address 85*h* are used as NA fields, and the low-order four bits ADD3 through ADD0 are used as PS measurement rate fields. The addresses ADD7 through ADD4 are each ignored. Any of 0000 through 1111 is written to the low-order addresses ADD3 through ADD0. The values 0000 through 1001 are written in a case in which the PS measurement rate is set to 10, 20, 30, 50, 70, 100, 200, 500, 1000, or 2000 msec, respectively. The PS measurement rate can be set to 2000 msec even when any of the values 1010 through 1111 is written. Consequently, in the semiconductor device 1, the PS measurement rate can be set to the desired value among the values of 10 to 2000 msec.

As shown in FIG. 10 (*a*) and (*b*), the addresses ADD7 through ADD0 of the register ALS_PS_STATUS at address 8E*h* are used as an INT state field of the ALS, a data state field of the ALS, an INT state field of the LED 33, a data state field of the LED 33, an INT state field of the LED 32, a data state field of the LED 32, an INT state field of the LED 31, and a data state field of the LED 31, respectively.

The value 0 is written to the address ADD7 in a case in which the signal INT is deactivated in ALS measurement, and the value 1 is written in a case in which the signal INT is activated. The value 0 is written to the address ADD6 in a case in which the data in ALS measurement are old data that have already been read, and the value 1 is written in a case in which the data are new data that have not yet been read.

The value 0 is written to the address ADD5 in a case in which the signal INT is deactivated in PS measurement of the LED 33, and the value 1 is written in a case in which the signal INT is activated. The value 4 is written to the address ADD0 in a case in which the data in PS measurement of the LED 33 are old data that have already been read, and the value 1 is written in a case in which the data are new data that have not yet been read.

The value 0 is written to the address ADD3 in a case in which the signal INT is deactivated in PS measurement of the LED 32, and the value 1 is written in a case in which the signal INT is activated. The value 2 is written to the address ADD0 in a case in which the data in PS measurement of the LED 32 are old data that have already been read, and the value 1 is written in a case in which the data are new data that have not yet been read.

The value 0 is written to the address ADD1 in a case in which the signal INT is deactivated in PS measurement of the LED 31, and the value 1 is written in a case in which the signal INT is activated. The value 0 is written to the address ADD0 in a case in which the data in PS measurement of the LED 31 are old data that have already been read, and the value 1 is written in a case in which the data are new data that have not yet been read.

Figure 11:
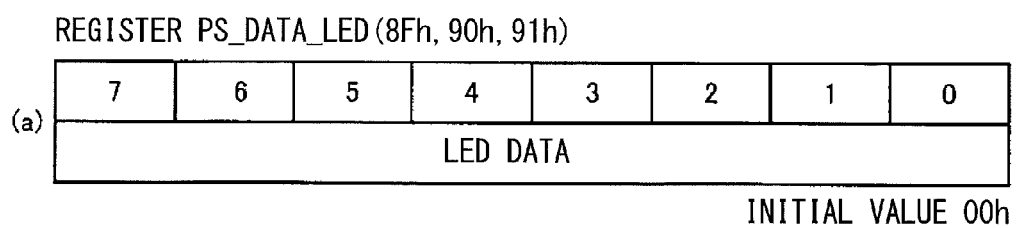
FIG. 11 is a view showing the configuration of the register PS_DATE_LED shown in FIG. 3.

As shown in FIG. 11 (*a*) and (*b*), the addresses ADD7 through ADD0 of the register PS_DATA_LED31 at address 8F*h* are used as data fields of the LED 31. The PS measurement data of the LED 31 are stored at the addresses ADD7 through ADD0.

The addresses ADD7 through ADD0 of the register PS_DATA_LED32 at address 90*h* are used as data fields of the LED 32. The PS measurement data of the LED 32 are stored at the addresses ADD7 through ADD0.

The addresses ADD7 through ADD0 of the register PS_DATA_LED33 at address 91*h* are used as data fields of the LED 33. The PS measurement data of the LED 33 are stored at the addresses ADD7 through ADD0.

As shown in FIG. 12 (*a*) and (*b*), the addresses ADD7, ADD4 of the register INTERRUPT at address 92*h* are both used as NA fields, and the addresses ADD6, ADD5 are used as interrupt source fields. The address ADD3 is used as an output mode field, the address ADD2 is used as an INT polarity field, and the addresses ADD1, ADD0 are used as interrupt mode fields. The addresses ADD7, ADD4 are ignored.

The value 00 is written to the addresses ADD6, ADD5 in a case in which an interrupt is triggered by the ALS, the value 01 is written in a case in which an interrupt is triggered by the LED 31, the value 10 is written in a case in which an interrupt is triggered by the LED 32, and the value 11 is written in a case in which an interrupt is triggered by the LED 33.

The value 0 is written to the address ADD3 in a case in which the level of an INT pin (signal output terminal T4) is latched until the register INTERRUPT is read, and the value 0 is written in a case in which the level of the INT pin is updated after each measurement. The value 0 is written to the address ADD2 in a case in which the INT pin is set to a logical 0 ("L" level) at the time of activation of the signal INT, and the value 1 is written in a case in which the INT pin is set to a logical 1 ("H" level) at the time of activation of the signal INT.

The value 00 is written to the addresses ADD1, ADD0 in a case in which the INT pin is placed in a deactivated state (high-impedance state), the value 01 is written in a case in which PS measurement can be triggered, the value 10 is written in a case in which ALS measurement can be triggered, and the value 11 is written in a case in which PS and ALS measurement can be triggered.

As shown in FIG. 13 (*a*) and (*b*), the addresses ADD7 through ADD0 of the register PS_TH_LED31 at address 93*h* are used as threshold value fields for the LED 31. Threshold values used for the LED 31 are stored at the addresses ADD7 through ADD0.

The addresses ADD7 through ADD0 of the register PS_TH_LED32 at address 94*h* are used as threshold value fields for the LED 32. Threshold values used for the LED 32 are stored at the addresses ADD7 through ADD0.

The addresses ADD7 through ADD0 of the register PS_TH_LED33 at address 95h are used as threshold value fields for the LED 33. Threshold values used for the LED 33 are stored at the addresses ADD7 through ADD0.

As shown in FIG. 14, the addresses ADD7 through ADD0 of the register PS_DATA_LED31 at address 8Fh are used as PS data fields for the LED 31. The PS data of the LED 31 are stored at the addresses ADD7 through ADD0. For example, in a case in which 10000101 is written to the addresses ADD7 through ADD0, the light intensity is expressed by 10 A. However, A=(27+22+20)×0.097=133×0.097. Consequently, the light intensity is 10 A≈417 (μW/cm2).

Figure 15:
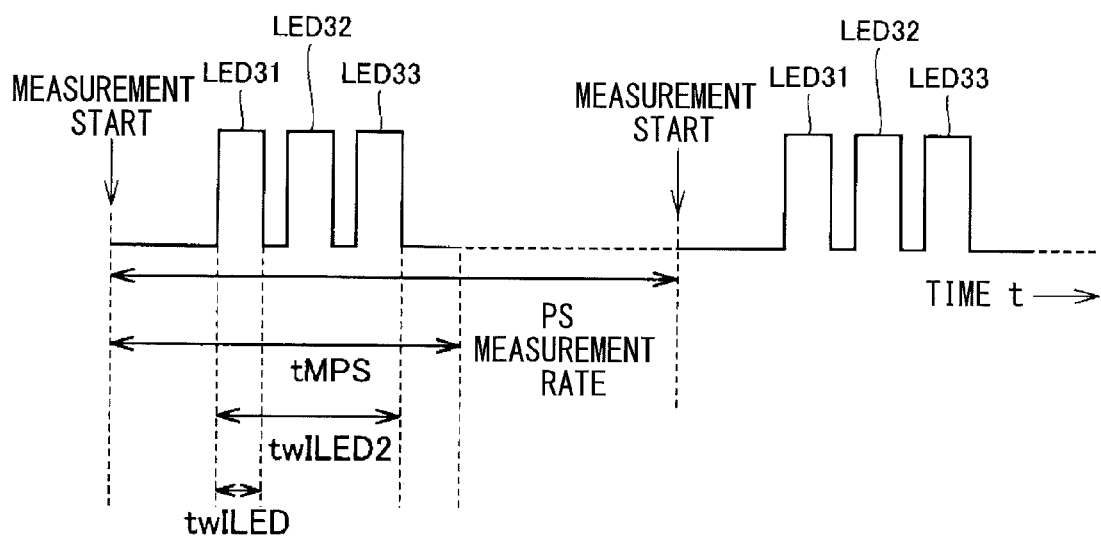
FIG. 15 is a time chart showing the PS measurement method of the semiconductor device shown in FIG. 1.

FIG. 15 is a time chart showing the measurement sequence of the proximity sensor 2. FIG. 15 shows a case in which all of the infrared LEDs 31 through 33 are activated. The infrared LEDs 31 through 33 are lit in sequence a predetermined period at a time within a single measurement period. The duration of the LED current pulse (time of one lighting for each infrared LED) is indicated as twILED, and is 300 μsec, for example. The cumulative duration of the LED current pulses (time from the start of lighting of the LED 31 to stopping the lighting of the LED 33) is indicated as twILED2, and is 1 msec, for example. The measurement time of the proximity sensor is indicated as tMPS, and is 10 msec, for example. The measurement result is generated within this period tMPS. The PS measurement rate (measurement cycle) is used only in the standalone mode, and is determined by the register PS_MEAS_RATE (85h) shown in FIG. 9.

The first PS measurement is triggered when a measurement command is written by the master to the register PS_CONTROL (81h) shown in FIG. 5. The combination of the infrared LEDs 31 through 33 is set by the register I_LED (82h) shown in FIG. 6 and the register I_LED33 (83h) shown in FIG. 7. In a case in which only the infrared LED 32 is deactivated, there is no unoccupied time between the pulse of the LED 31 and the pulse of the LED 33.

In the forced mode, PS measurement is performed only once. A PS trigger bit (ADD0 of 84h) is overwritten from 1 to 0 after PS measurement is completed. PS measurement is restarted when the value 1 is written to the PS trigger bit by the master. In the standalone mode, PS measurement is continued until the master specifies another mode. A measurement interval is determined by the register PS_MEAS_RATE (85h) shown in FIG. 9.

Figure 16:
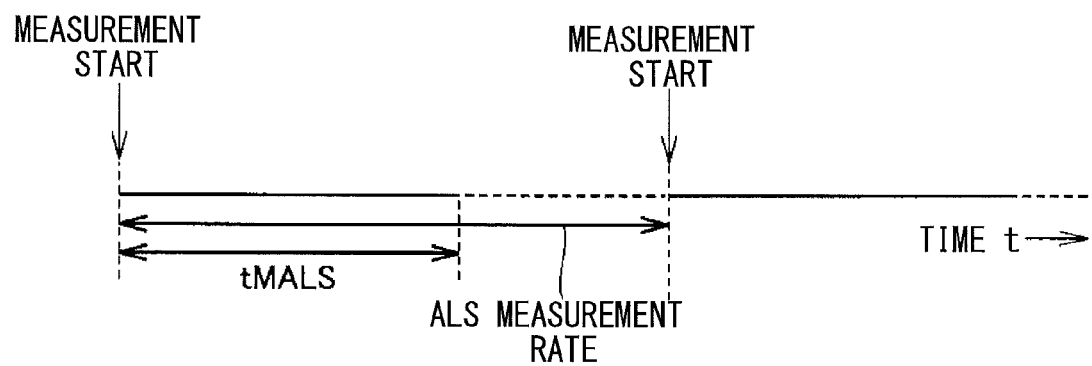
FIG. 16 is a time chart showing the ALS measurement method of the semiconductor device shown in FIG. 1.

FIG. 16 is a time chart showing the measurement sequence of the illuminance sensor 10. In FIG. 16, the measurement time of the illuminance sensor is indicated as tMALS, and is 10 msec, for example. The measurement result is generated during the period of tMALS. The ALS measurement rate (measurement cycle) is used only in the standalone mode, and is determined by the register ALS_MEAS_RATE (86h) shown in FIG. 3. The first ALS measurement is triggered when a measurement command is written by the master to the register ALS_CONTROL (80h) shown in FIG. 4.

In the forced mode, ALS measurement is performed only once. An ALS trigger bit (ADD1 of 80h) is overwritten from 1 to 0 after ALS measurement is completed. ALS measurement is restarted when the value 1 is written to the ALS trigger bit by the master. In the standalone mode, ALS measurement is continued until the master specifies another mode. A measurement interval is determined by the register ALS_MEAS_RATE (86h) shown in FIG. 3.

Figure 17:
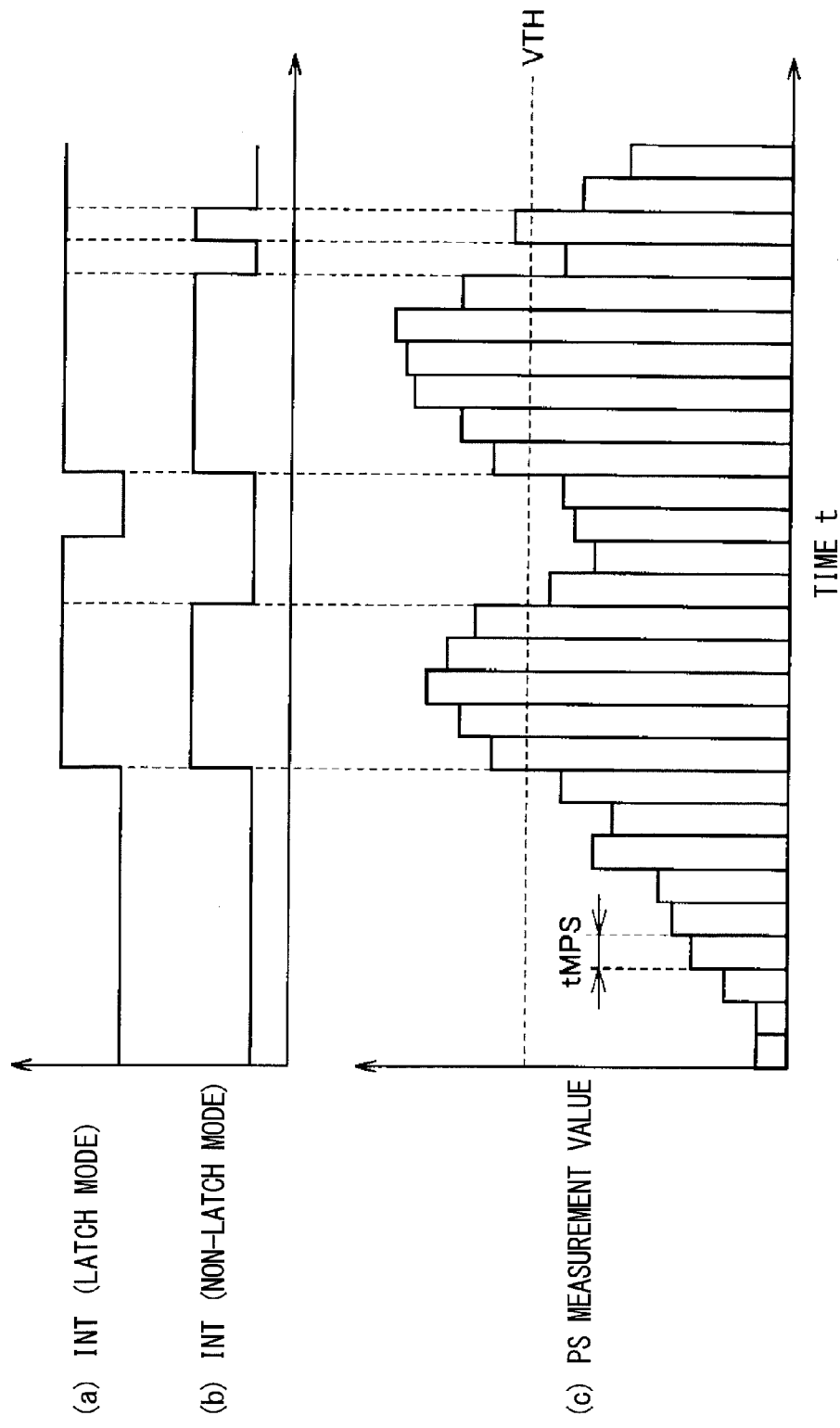
FIG. 17 is a time chart showing the interrupt function of the semiconductor device shown in FIG. 1.

FIG. 17 (a) through (c) are time charts showing the interrupt state. In particular, FIG. 17 (a) shows the interrupt signal INT during latch mode, FIG. 17 (b) shows the interrupt signal INT during non-latch mode, and FIG. 17 (c) shows the PS measurement value (PS measurement data). As for the interrupt source, as shown in FIG. 12 (a) and (b), ALS measurement and any one of the three LEDs 31 through 33 can be selected as the interrupt source. The LED 31, for example, is assumed to be selected herein as the interrupt source.

As shown in FIG. 15, the PS measurement value is updated at each single measurement period tMPS. The threshold values VTH for the LEDs 31 through 33 are stored in the register PS_TH_LED (93h, 94h, 95h) shown in FIG. 13. When the PS measurement value for the LED 31 exceeds the threshold value VTH, the interrupt signal INT transitions from a deactivation level ("L" level in the drawing) to an activation level ("H" level in the drawing).

The output modes of the interrupt signal INT include a latch mode and a non-latch mode, as shown in FIG. 12 (a) and (b). In the latch mode, the level of the interrupt signal INT is latched until the master reads the register INTERRUPT, as shown in FIG. 17 (a). In the non-latch mode, the level of the interrupt signal INT is updated after each PS measurement, as shown in FIG. 17 (b). The same applies in a case in which the LED 32 or the LED 33 is selected as the interrupt source.

In a case in which ALS measurement is selected as the interrupt source, the ALS measurement value is updated at each single measurement period tMALS, as shown in FIG. 16. The upper threshold value VTHU for ALS measurement is stored in the register ALS_TH_UP (96h, 97h) shown in FIG. 3. The lower threshold value VTHL for ALS measurement is stored in the register ALS_TH_LOW (98h, 99h) shown in FIG. 3. In cases in which the ALS measurement value is between the lower threshold value VTHL and the upper threshold value VTHU, the interrupt signal INT is placed at the deactivation level (e.g., the "L" level). In cases in which the ALS measurement value is lower than the lower threshold value VTHL, and in cases in which the ALS measurement value is higher than the upper threshold value VTHU, the interrupt signal INT is placed at the activation level (e.g., the "H" level).

Figure 18:
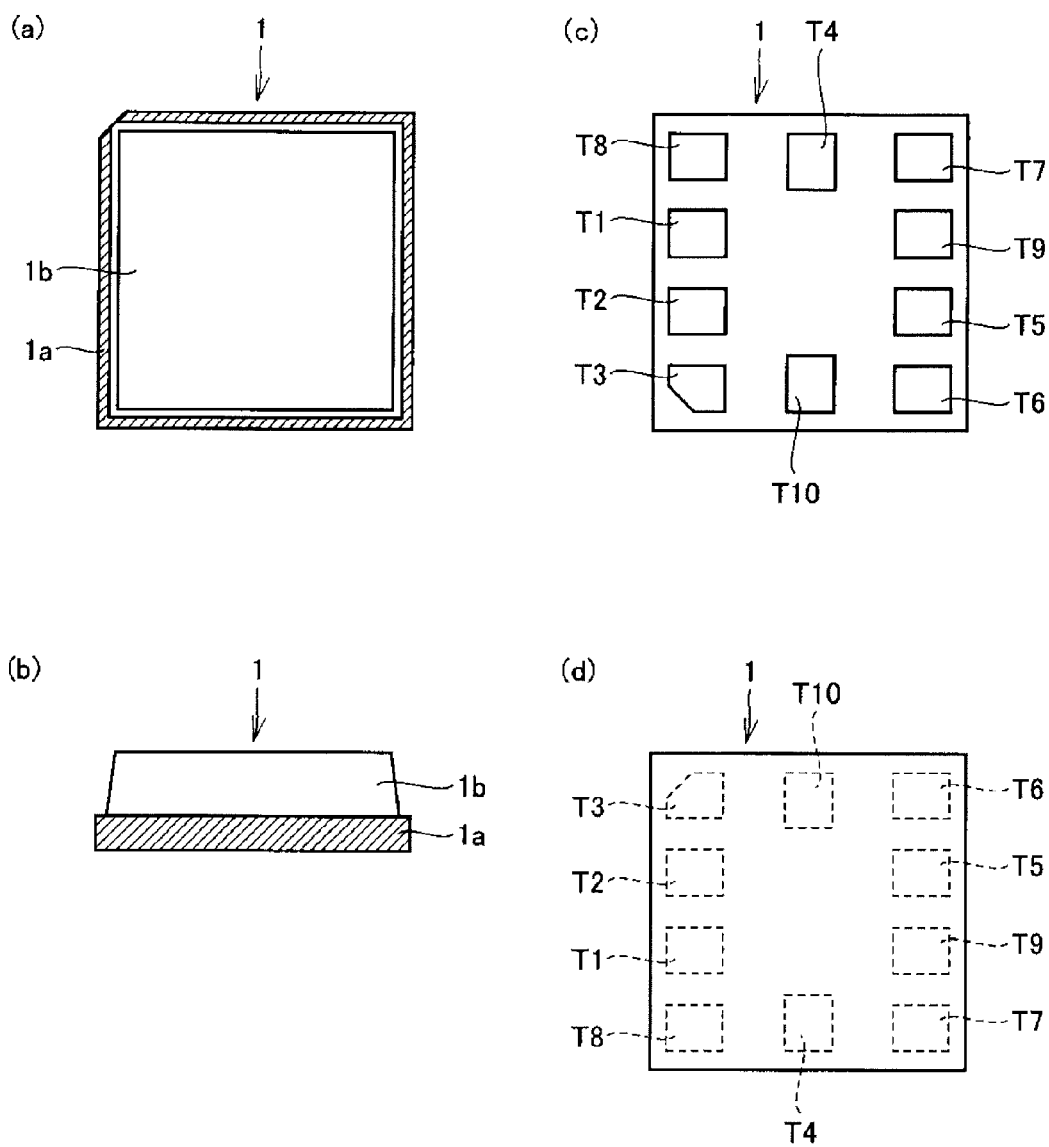
FIG. 18 is a view showing the outer appearance of the semiconductor device shown in FIG. 1.

FIG. 18 (a) through (d) are views showing the outer appearance of the semiconductor device 1. In particular, FIG. 18 (a) is a top view showing the semiconductor device 18, FIG. 18 (b) is a front view of the same, FIG. 18 (c) is a bottom view of the same, and FIG. 18 (d) is a view showing the arrangement of the terminals T1 through T10 as viewed from above the semiconductor device 1. In FIG. 18 (a) through (d), the semiconductor device 1 includes a printed wiring board 1a. The printed wiring board 1a is formed in a square shape having a side length of 2.8 mm, for example.

The circuits 2 through 15 and 20 through 25 shown in FIG. 1 are mounted on the surface of the printed wiring board 1a. The surface of the printed wiring board 1a is sealed by a transparent resin 1b. The height of the semiconductor device 1 is 0.9 mm, for example. The terminals T1 through T10 are provided on the back of the printed wiring board 1a. The terminals T1 through T10 are arranged in a predetermined sequence along the four sides of the printed wiring board 1a.

<Application to a Mobile Telephone>

Figure 19:
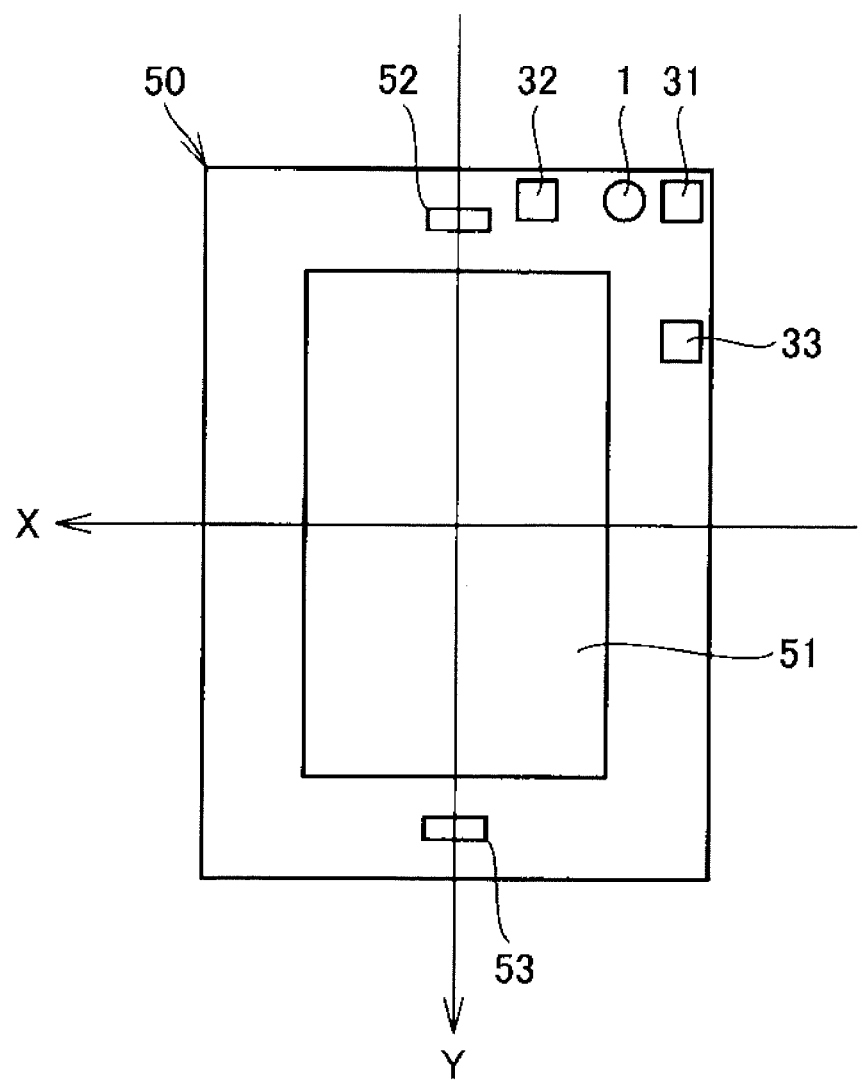
FIG. 19 is a view showing an example of the usage method of the semiconductor device shown in FIG. 1.

FIG. 19 is a view showing an example of the usage method of the semiconductor device 1. In FIG. 19, the semiconductor device 1 is mounted in a mobile telephone device 50 together with three infrared LEDs 31 through 33. The mobile telephone device 50 is formed in an elongated rectangular shape. A touch panel (display device with touch panel function) 51 is provided at the center part of the mobile telephone device 50, and a speaker 52 and a microphone 53 are provided above and below the touch panel 51, respectively. The infrared LED 31 is disposed at the upper right corner of the surface of the mobile telephone device 50, the infrared LED 32 is disposed at a position a predetermined distance in the X direction (left direction) of the drawing from the infrared LED 31, and the infrared LED 33 is disposed at a position a predetermined distance in the Y direction (downward direction) in the drawing from the infrared LED 31. The semiconductor device 1 is disposed adjacent to the infrared LED 31 in the X direction.

Figure 20:
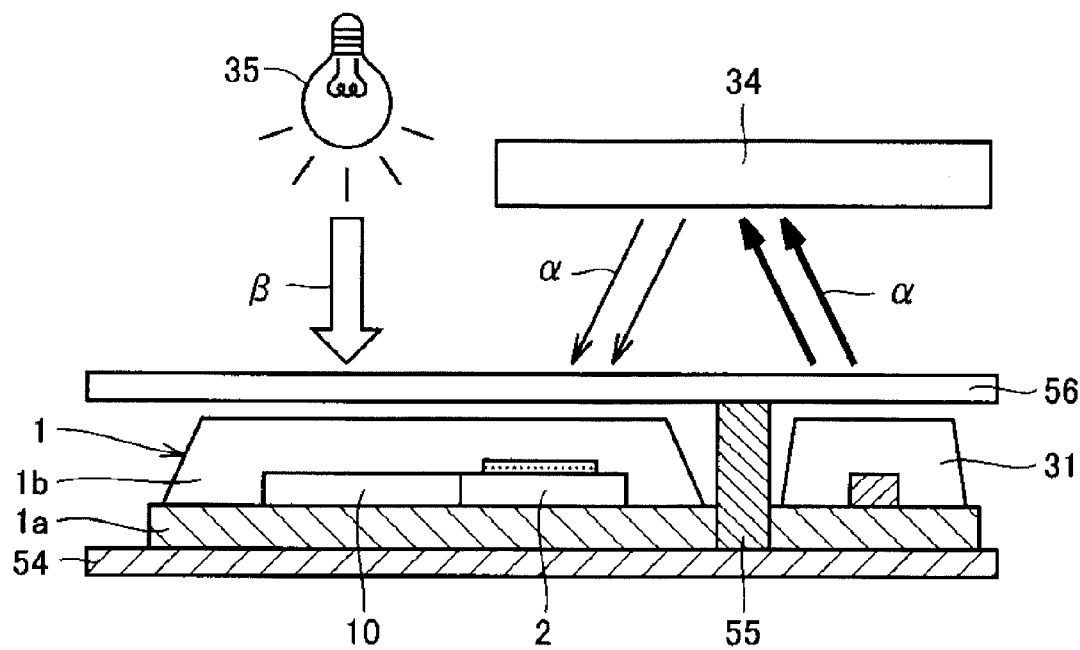
FIG. 20 is a view showing the arrangement of the infrared LEDs and the semiconductor device shown in FIG. 19.

FIG. 20 is a view showing the semiconductor device 1 and the infrared LED 31 mounted on the mobile telephone device 50. In FIG. 20, the semiconductor device 1 and the infrared LED 31 are disposed adjacent to the surface of a printed wiring board 54. The proximity sensor 2 and the illuminance sensor 10 are mounted on the printed wiring board 1a of the semiconductor device 1, and the surface of the printed wiring board 1a is sealed by the transparent resin 1b. A transparent plate 56 is disposed on the printed wiring board 54 via a spacer 55 which has light-blocking properties, and the semiconductor device 1 and the infrared LED 31 are protected by the transparent plate 56.

The infrared light α emitted from the infrared LED 31 is reflected by the reflecting object 34, and is incident on the proximity sensor 2. The proximity sensor 2 stores PS measurement data whose level corresponds to the intensity of the incident infrared light α in the data register 20. The reflecting object 34 is an ear or hand of the user of the mobile telephone device 50, for example. The visible light β emitted from the visible-light source 35 is incident on the illuminance sensor 10. The illuminance sensor 10 stores ALS measurement data indicating the illuminance of the incident visible light β in the data register 20.

Figure 21:
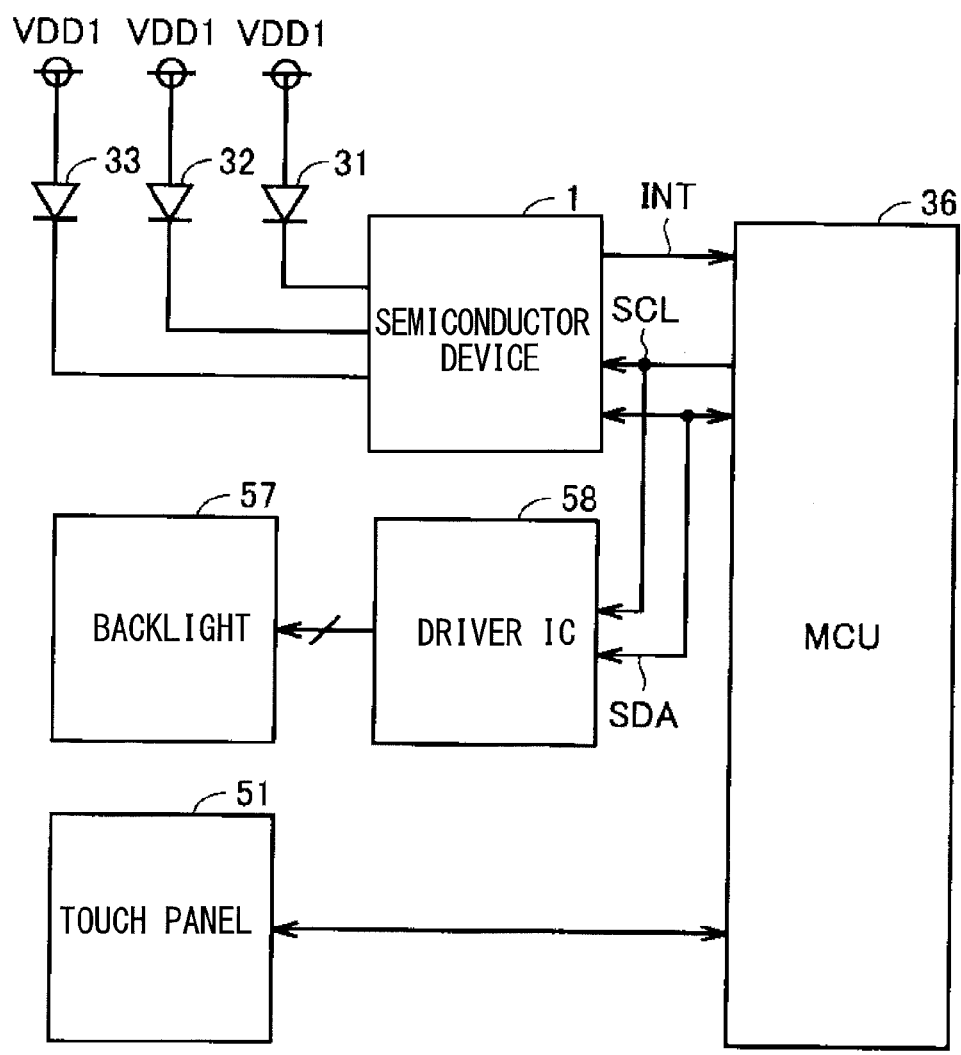
FIG. 21 is a circuit block diagram showing the relevant parts of the mobile telephone device shown in FIG. 19.

The MCU 36, a backlight 57, and a driver IC 58 are provided in the mobile telephone device 50, as shown in FIG. 21. The backlight 57 presents transmitted light to the touch panel 51. The driver IC 58 drives the backlight 57 in accordance with a control signal from the MCU 36. The MCU 36 controls the mobile telephone device 50 as a whole in accordance with a signal from the touch panel 51. The MCU 36 also controls the driver IC 58 and the touch panel 51 in accordance with a data signal from the semiconductor device 1.

In other words, the MCU 36 detects the illuminance of the place in which the mobile telephone device 50 is being used, through the use of the data signal (ALS measurement data) from the semiconductor device 1, and controls the brightness of the backlight 57 in accordance with the detected illuminance. The image displayed by the touch panel 51 can thereby be clearly displayed. Power consumption can also be reduced.

The MCU 36 stops the functioning of the touch panel 51 in a case in which the MCU 36 detects from the data signal (PS measurement data) from the semiconductor device 1 that the touch panel 51 of the mobile telephone device 50 is against the ear of the user of the mobile telephone device 50. It is thereby possible to prevent malfunctioning when the ear of the user of the mobile telephone device 50 is touching the touch panel 51.

The MCU 36 also detects a hand gesture of the user of the mobile telephone device 50 on the basis of the PS measurement value which indicates the reflected light intensity of the infrared LEDs 31 through 33, and scrolls the image displayed on the touch panel 51 in accordance with the detection result. In other words, in a case in which the user of the mobile telephone device 50 moves his or her hand in the X direction in FIG. 19 on the surface of the mobile telephone device 50, the infrared LED's 31, 33 are first covered by the hand, and the infrared LED 32 is then covered by the hand In this case, the reflected light intensity of the infrared LED's 31, 33 first increases, and the reflected light intensity of the infrared LED 32 then increases, as shown in FIG. 22 (*a*). In a case in which the reflected light intensities of the infrared LEDs 31 through 33 change in such a manner as shown in FIG. 22 (*a*), the MCU 36 determines that the user's hand has moved in the transverse direction, and the MCU 36 scrolls the image of the touch panel 51 in the transverse direction, for example.

In a case in which the user of the mobile telephone device 50 moves his or her hand in the Y direction in FIG. 19 on the surface of the mobile telephone device 50, the infrared LEDs 31, 32 are first covered by the hand, and the infrared LED 33 is then covered by the hand. In this case, the reflected light intensity of the infrared LED's 31, 32 first increases, and the reflected light intensity of the infrared LED 33 then increases, as shown in FIG. 22 (*b*). In a case in which the reflected light intensities of the infrared LEDs 31 through 33 change in such a manner as shown in FIG. 22 (*b*), the MCU 36 determines that the user's hand has moved in the longitudinal direction, and the MCU 36 scrolls the image of the touch panel 51 in the longitudinal direction, for example.

As described above, through the present embodiment, since the mobile telephone device 50 can be operated in accordance with the movement of the reflecting object detected in touchless fashion, the size and cost of the device can be reduced, and the configuration of the device can be simplified in comparison with the conventional configuration which uses an acceleration sensor or the like. Since there is also no need to move the mobile telephone device 50 as such, as in the case of a mobile telephone device 50 in which a acceleration sensor is mounted, the mobile telephone device 50 can be prevented from being broken as a result of colliding with an object while being moved.

<Detailed Description of the Movement Detection Algorithm>

The algorithm whereby movement of the reflecting object 34 is detected in the MCU 36 will next be described in further detail.

Figure 23:
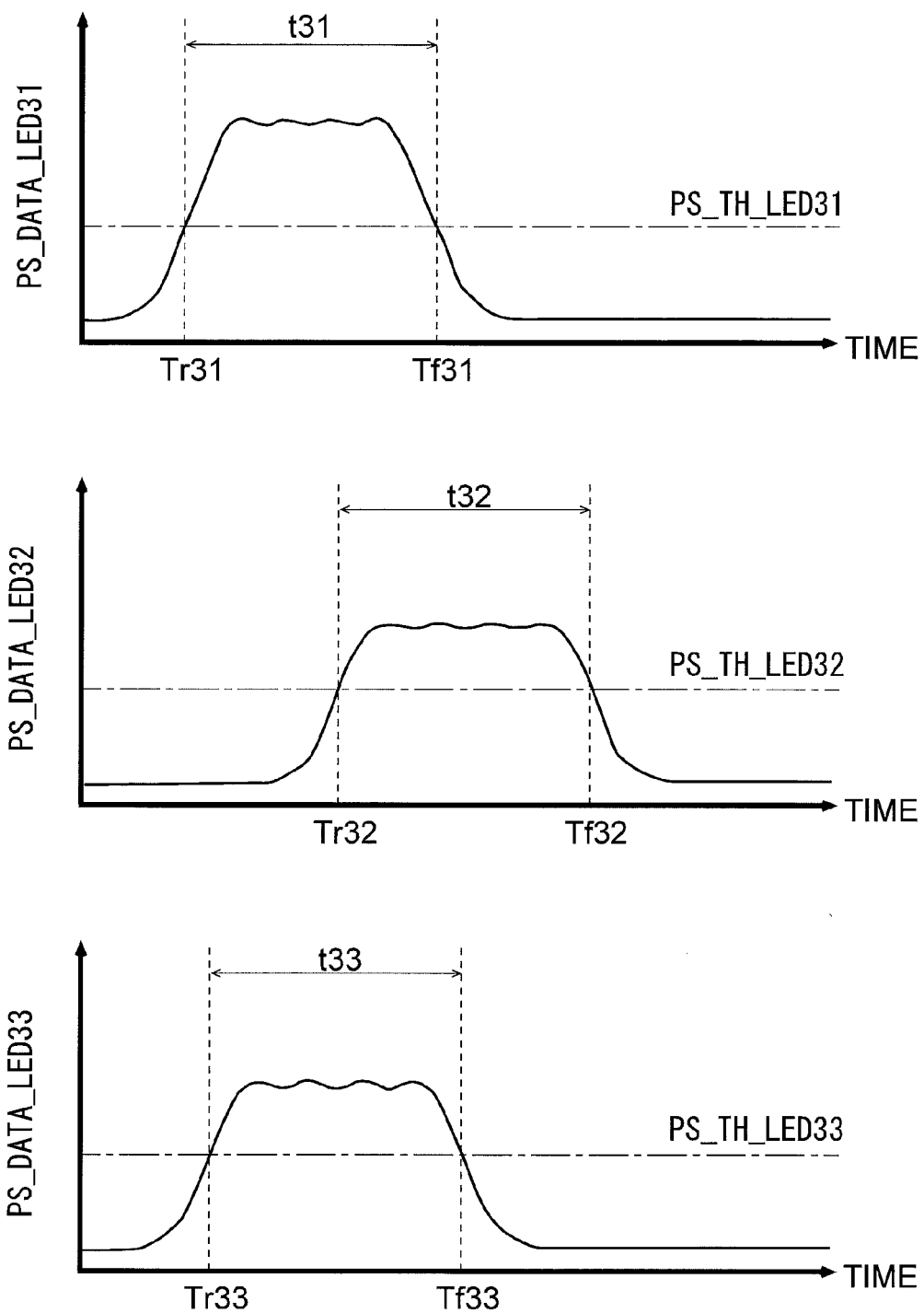
FIG. 23 is a time chart showing the action of determining the threshold value of the PS measurement value.

FIG. 23 is a time chart showing the action of determining the threshold value of the PS measurement value in the MCU 36, and depicts, in sequence from the top, the temporal variation of a first PS measurement value PS_DATA_LED31 (first reflected light intensity information for indicating the intensity of a first reflected light that reaches the infrared sensor 6 from the infrared LED 31 via the reflecting object 34), a second PS measurement value PS_DATA_LED32 (second reflected light intensity information for indicating the intensity of a second reflected light that reaches the infrared sensor 6 from the infrared LED 32 via the reflecting object 34), and a third PS measurement value PS_DATA_LED33 (third reflected light intensity information for indicating the intensity of a third reflected light that reaches the infrared sensor 6 from the infrared LED 33 via the reflecting object 34).

During detection of movement of the reflecting object 34 by a non-contact operation, the MCU 36 compares the first PS measurement value PS_DATA_LED31 and the first threshold value PS_TH_LED31, and acquires a first detection start time Tr31, a first detection end time Tf31, and a first detection duration t31. The MCU 36 also compares the third PS measurement value PS_DATA_LED33 and the third threshold value PS_TH_LED33, compares the third PS measurement value PS_DATA_LED33 and the third threshold value PS_TH_LED33, and acquires a second detection start time Tr32, a second detection end time Tf32, and a second detection duration t32, as well as a third detection start time Tr33, a third detection end time Tf33, and a third detection duration t33.

The first PS measurement value PS_DATA_LED31, second PS measurement value PS_DATA_LED32, and third PS measurement value PS_DATA_LED33 are each inputted from the semiconductor device 1 to the MCU 36. The first threshold value PS_TH_LED31, second threshold value PS_TH_LED32, and third threshold value PS_TH_LED33 are also each set by the MCU 36.

Figure 24A:
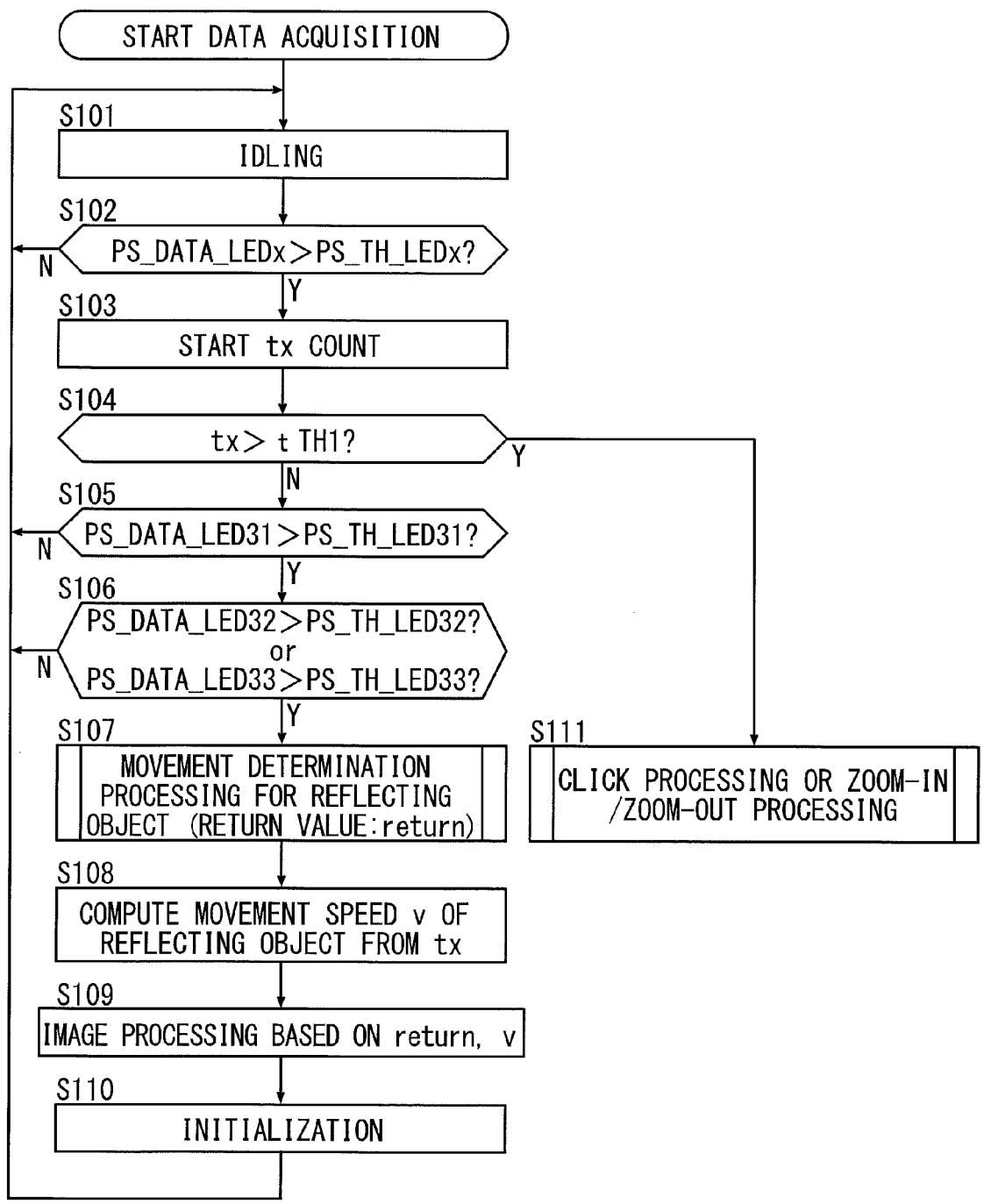
FIG. 24A is a flowchart showing the operation whereby the PS measurement values are monitored.

FIG. 24A is a flowchart showing the operation whereby the PS measurement values are monitored by the MCU 36. When data acquisition of PS measurement values is initiated, after the idling state in step S101, a determination is made in step S102 as to whether any PS measurement value PS_DATA_LEDx (where x is a value from 31 to 33; the same below) is above the corresponding threshold value PS_TH_LEDx thereof. In the case of a "yes" determination, the process proceeds to step S103. In the case of a "no" determination, the process returns to step S101, and steps S101 and S102 are subsequently looped.

In step S103, counting of the detection duration tx is started, and the process proceeds to step S104.

In step S104, a determination is made as to whether the detection duration tx is above a predetermined threshold time tTH1. In the case of a "no" determination, a determination is made that the reflecting object 34 may have traversed the area above the infrared LEDs 31 through 33 or the semiconductor device 1 (a touchless motion operation may have been performed), and the process proceeds to step S105. In the case of a "yes" determination in step S104, a determination is made that the reflecting object 34 may be stationary above the infrared LEDs 31 through 33 or the semiconductor device 1 (a click operation or a zoom-in/zoom-out operation may have been performed), and the process proceeds to step S111 (click processing or zoom-in/zoom-out processing). The specific processing of step S107 will next be described in detail.

In step S105, a determination is made as to whether the first PS measurement value PS_DATA_LED31 is included as the PS measurement value that was determined to be above the threshold value in step S102. In the case of a "yes" determination, the process proceeds to step S106. In the case of a "no" determination, the process returns to step S101, and an idling state takes effect.

In step S106, a determination is made as to whether at least one of the second PS measurement value PS_DATA_LED32 and the third PS measurement value PS_DATA_LED33 is included as the PS measurement value that was determined to be above the threshold value in step S102. In the case of a "yes" determination, the process proceeds to step S107. In the case of a "no" determination, the process returns to step S101, and an idling state takes effect.

In step S107, taking into account the arrangement layout shown in FIG. 19, a phase difference of the intensity variation that occurs between the first reflected light and the second reflected light, and a phase difference of the intensity variation that occurs between the first reflected light and the third reflected light are computed with the assumption that at least one of the second reflected light and the third reflected light is detected together with the first reflected light, and processing for determining the movement of the reflecting object 34 is performed based on the computation results. It is for this reason that steps S105 and S106 described above are provided as preconditions for proceeding to step S107. However, the conditions in steps S105 and S106 may be made more strict so that the process proceeds to step S107 only when all of the PS measurement values PS_DATA_LEDx are included as PS measurement values which are determined to be above the threshold value in step S102.

The specific processing in step S107 will be described in detail hereinafter, and therefore, only a summary thereof will be described in this section. For example, in a case in which the reflecting object 34 moves in the left-right direction in the arrangement layout shown in FIG. 19, a temporal difference occurs between the detection timing (first detection start time Tr31) of the first reflected light that is incident on the infrared light sensor 6 from the infrared LED 31 via the reflecting object 34, and the detection timing (second detection start time Tr32) of the second reflected light that is incident on the infrared light sensor 6 from the infrared LED 32 via the reflecting object 34. Consequently, by determining the absolute value and positive or negative sign of the difference value, it is possible to detect whether the reflecting object 34 has moved from right to left or from left to right. The method for distinguishing the up-down direction is basically the same as the process described above.

When the processing for determining movement of the reflecting object 34 according to step S107 is completed, the movement speed v of the reflecting object 34 is computed based on the detection duration tx in step S108.

In the subsequent step S109, image processing (scrolling processing or page switch processing described hereinafter) is performed based on the return value "return" acquired in step S107 and the movement speed v computed in step S108, and the results of the image processing are outputted to the touch panel 51.

In step S110, the sequence of processing results described above is initialized, and the process returns again to step S101.

Figure 24B:
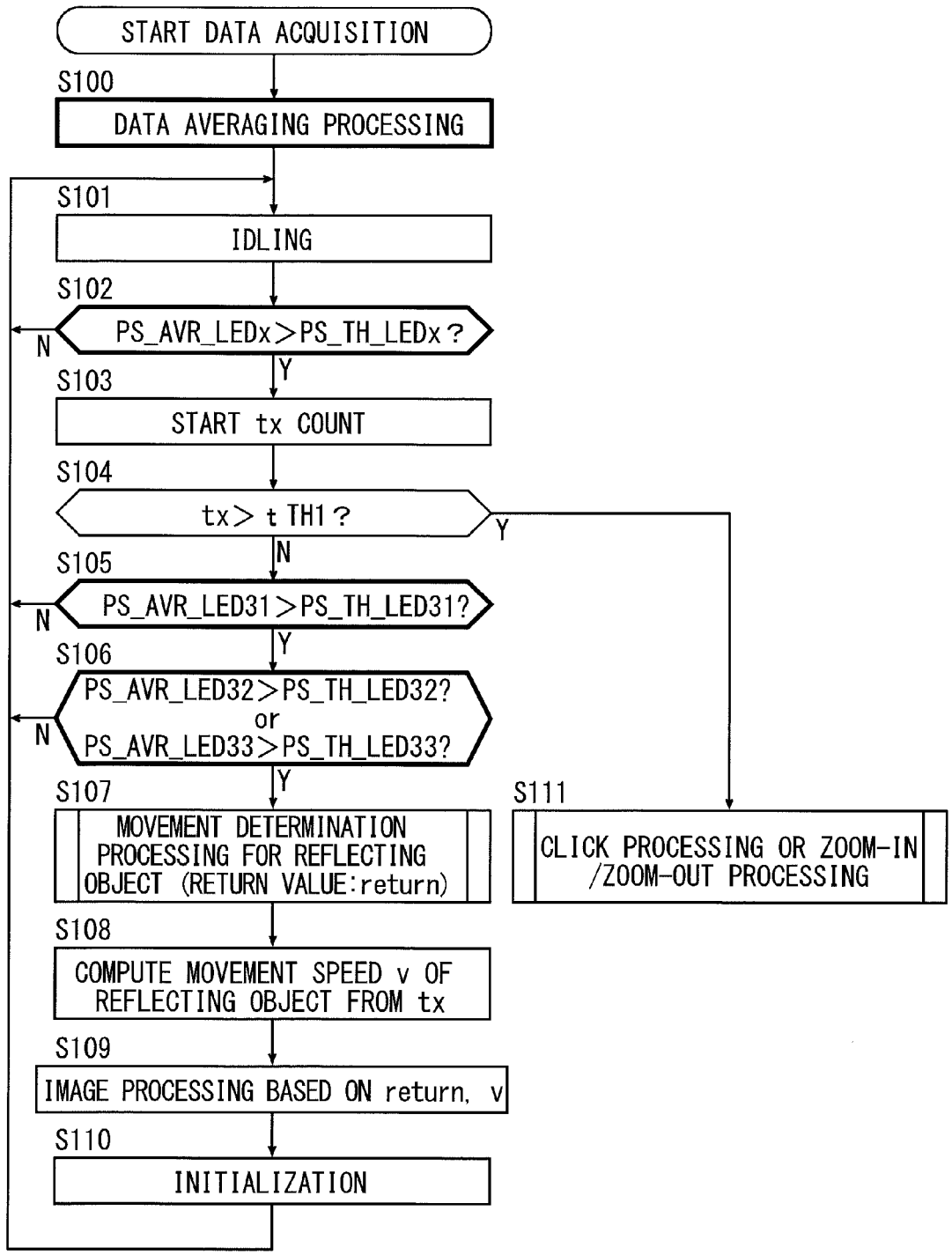
FIG. 24B is a flowchart showing a modification of FIG. 24A.
Figure 24D:
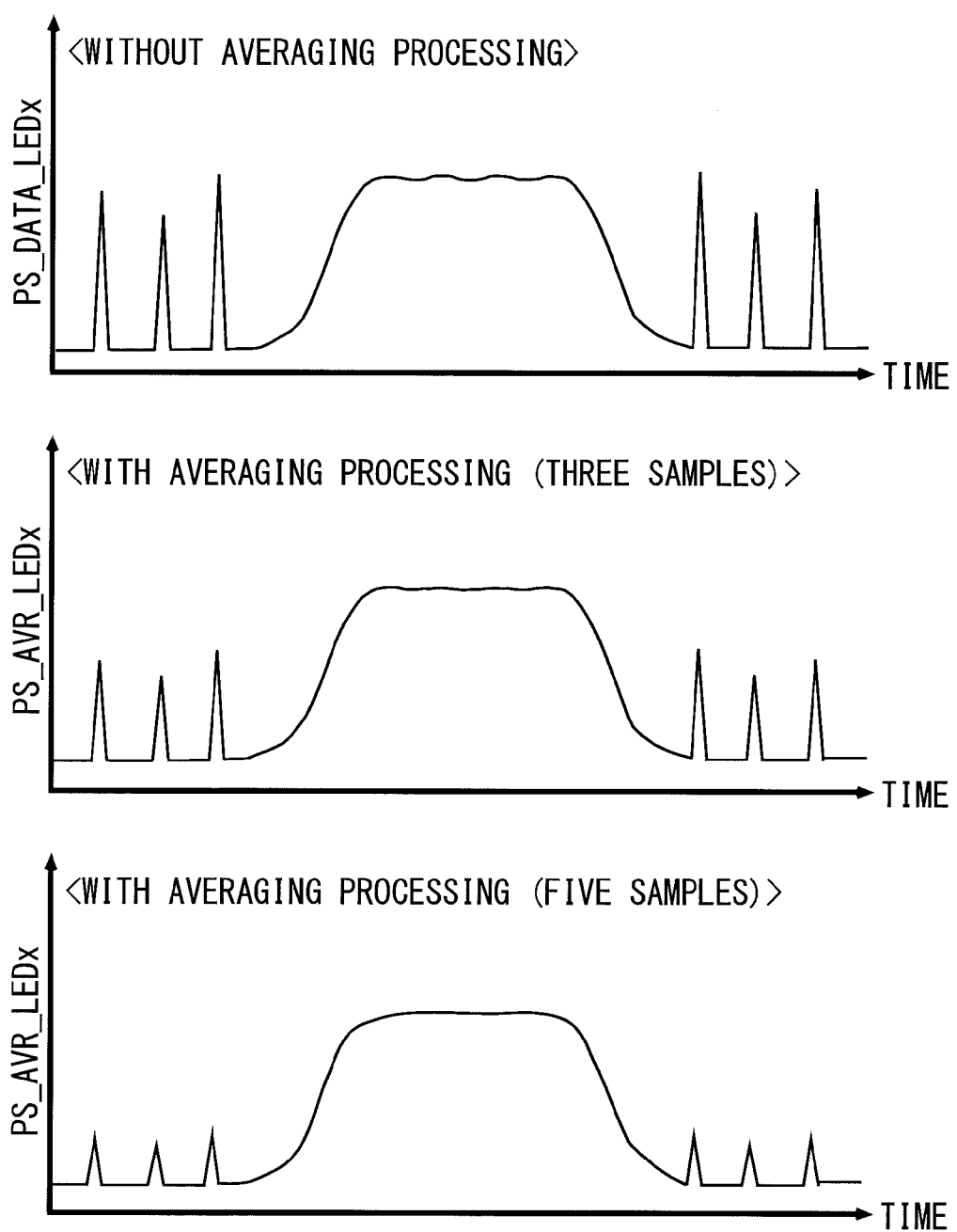
FIG. 24D is a time chart showing the effect of the data averaging processing.

The PS measurement values PS_DATA_LEDx outputted from the semiconductor device 1 are affected by various noise light sources (infrared remote controls, incandescent lamps, bright sunlight, and the like), and there is a risk of overlapping of noise (see top level of FIG. 24D). In a case in which noise is overlapped, it may no longer be possible for the MCU 36 to distinguish whether an intensity variation in the PS measurement values PS_DATA_LEDx is due to a touchless motion operation or to noise, and detection errors or malfunctioning may occur.

Therefore, in order to overcome the abovementioned problems, a configuration is preferably adopted in which data averaging processing (see step S100 enclosed by thick frame lines in FIG. 24B) is performed for the PS measurement values PS_DATA_LEDx on the MCU 36 side prior to step S101 in FIG. 24A, an averaged PS measurement value PS_AVR_LEDx is generated, and this value is used for subsequent calculation processing (see steps S102, S105, and S106 in particular, enclosed by thick frame lines in FIG. 24B). Adopting such a configuration makes it possible to reduce the effect of noise and prevent detection errors or malfunctioning in the touchless motion operation (see the middle level and bottom level of FIG. 24D). Moving-average processing of the most recent L sample, as shown in FIG. 24C, is preferably performed as the data averaging processing of step S100.

Figure 25:
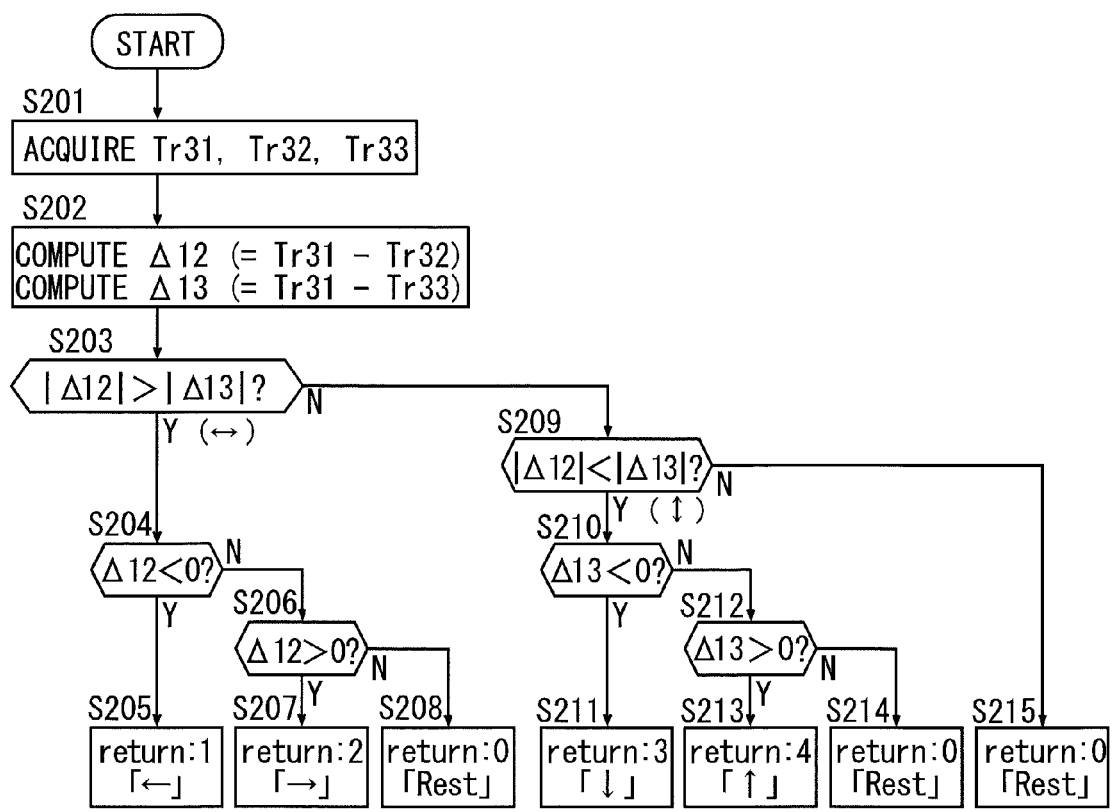
FIG. 25 is a flowchart showing the details of the movement determination processing in step S107.

FIG. 25 is a flowchart showing the details of the movement determination processing in step S107. When the process flow starts, the first detection start time Tr31, the second detection start time Tr32, and the third detection start time Tr33 are acquired in step S201, and in the following step S202, the phase difference $\Delta 12$ (=Tr31-Tr32) of the intensity variation that occurs between the first reflected light and the second reflected light, and the phase difference $\Delta 13$ (=Tr31−Tr33) of the intensity variation that occurs between the first reflected light and the third reflected light are computed.

The example described herein is of a configuration in which the phase differences $\Delta 12$ and $\Delta 13$ are computed based on the first detection start time Tr31, the second detection start time Tr32, and the third detection start time Tr33, but the present invention is not limited to this configuration, and a configuration may also be adopted in which a phase difference $\Delta 12'$ (=Tf31−Tf32) and a phase difference $\Delta 13'$ (=Tf31−

Tf33) are computed based on the first detection end time Tf31, the second detection end time Tf32, and the third detection end time Tf33.

After the phase differences Δ12 and Δ13 are computed, a determination is made in step S203 as to whether the absolute value |Δ12| of the phase difference Δ12 is greater than the absolute value |Δ13| of the phase difference Δ13. In the case of a "yes" determination, the reflecting object 34 is determined to have moved along a first movement axis (the movement axis X extending in the direction (left-right direction in the arrangement layout shown in FIG. 19) from the infrared LED 31 to the infrared LED 32), and the process proceeds to step S204. In the case of a "no" determination, the process proceeds to step S209.

In step S204, a determination is made as to whether the phase difference Δ12 is less than zero, i.e., whether the phase difference Δ12 is a negative value. In the case of a "yes" determination, the reflecting object 34 is determined to have moved in a first direction (direction from the infrared LED 31 to the infrared LED 32 (to the left in the arrangement layout shown in FIG. 19)), and the process proceeds to S205. In the case of a "no" determination, the process proceeds to S206.

In step S205, the value "1" indicating movement of the reflecting object 34 in the first direction is outputted as the return value "return," and the sequence of processing ends.

In step S206, a determination is made as to whether the phase difference Δ12 is greater than zero, i.e., whether the phase difference Δ12 is a positive value. In the case of a "yes" determination, the reflecting object 34 is determined to have moved in a second direction (direction from the infrared LED 32 to the infrared LED 31 (to the right in the arrangement layout shown in FIG. 19)), and the process proceeds to S207. In the case of a "no" determination, the process proceeds to S208.

In step S207, the value "2" indicating movement of the reflecting object 34 in the second direction is outputted as the return value "return," and the sequence of processing ends.

In step S208, the value "0" indicating that movement determination processing was not performed correctly is outputted as the return value "return," and the sequence of processing ends.

In step S209, a determination is made as to whether the absolute value |Δ12| of the phase difference Δ12 is less than the absolute value |Δ13| of the phase difference Δ13. In the case of a "yes" determination, the reflecting object 34 is determined to have moved along a second movement axis (the movement axis Y extending in the direction (up-down direction in the arrangement layout shown in FIG. 19) from the infrared LED 31 to the infrared LED 33), and the process proceeds to step S210. In the case of a "no" determination, the process proceeds to step S215.

In step S210, a determination is made as to whether the phase difference Δ13 is less than zero, i.e., whether the phase difference Δ13 is a negative value. In the case of a "yes" determination, the reflecting object 34 is determined to have moved in a third direction (direction from the infrared LED 31 to the infrared LED 33 (downward in the arrangement layout shown in FIG. 19)), and the process proceeds to S211. In the case of a "no" determination, the process proceeds to S212.

In step S211, the value "3" indicating movement of the reflecting object 34 in the third direction is outputted as the return value "return," and the sequence of processing ends.

In step S212, a determination is made as to whether the phase difference Δ13 is greater than zero, i.e., whether the phase difference Δ13 is a positive value. In the case of a "yes" determination, the reflecting object 34 is determined to have moved in a fourth direction (direction from the infrared LED 33 to the infrared LED 31 (upward in the arrangement layout shown in FIG. 19)), and the process proceeds to S213. In the case of a "no" determination, the process proceeds to S214.

In step S213, the value "4" indicating movement of the reflecting object 34 in the fourth direction is outputted as the return value "return," and the sequence of processing ends.

In step S214, the value "0" indicating that movement determination processing was not performed correctly is outputted as the return value "return," and the sequence of processing ends.

In step S215, the value "0" indicating that movement determination processing was not performed correctly is outputted as the return value "return," and the sequence of processing ends.

FIG. 26 is a schematic view showing an example of the display processing for left-right motion, and FIG. 27 is a schematic view showing an example of the display processing for up-down motion. The touchless motion function thus makes it possible to perform scrolling of a map image or the like or page switching of photo images or the like by a non-contact operation.

Figure 28:
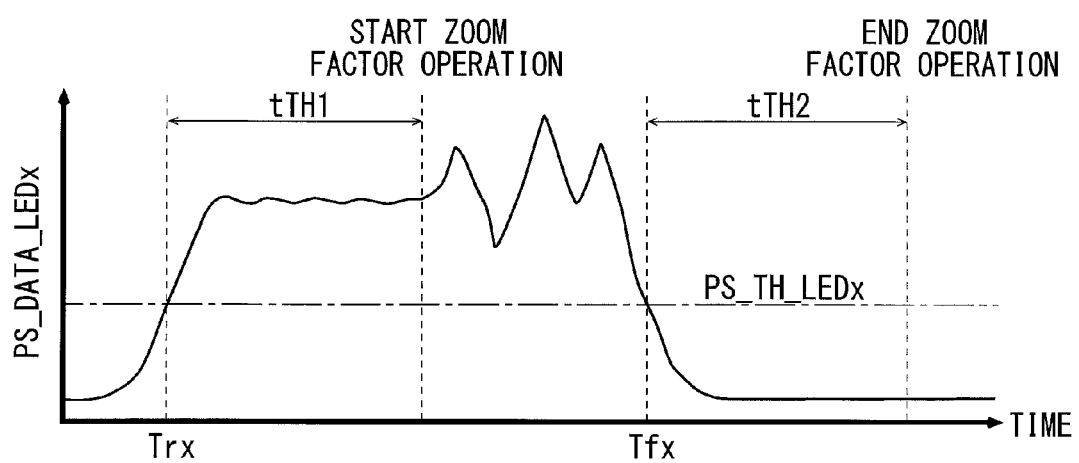
FIG. 28 is a time chart showing the operation of transitioning to zoom processing.

FIG. 28 is a time chart showing the transition to zoom processing. As previously mentioned, during movement detection of the reflecting object 34 by a non-contact operation, in a case in which a detection duration tx of a PS measurement value PS_DATA_LEDx is above the predetermined threshold time tTH1, a transition is made to click processing or zoom-in/zoom-out processing (see steps S104 and S111 of FIG. 24A or 24B). When click processing is executed, an action operation (such as selection of a command button displayed on the screen) is preferably performed when the detection duration tx reaches the threshold time tTH1. On the other hand, when zoom-in/zoom-out processing is executed, after the detection duration tx has reached the threshold time tTH1, the zoom factor Z of the display screen is preferably determined while the PS measurement values PS_DATA_LEDx, which vary according to the movement of the reflecting object 34, and a predetermined conversion table are sequentially compared and referenced, and image processing is performed so as to reflect the determined zoom factor Z.

Figure 29:
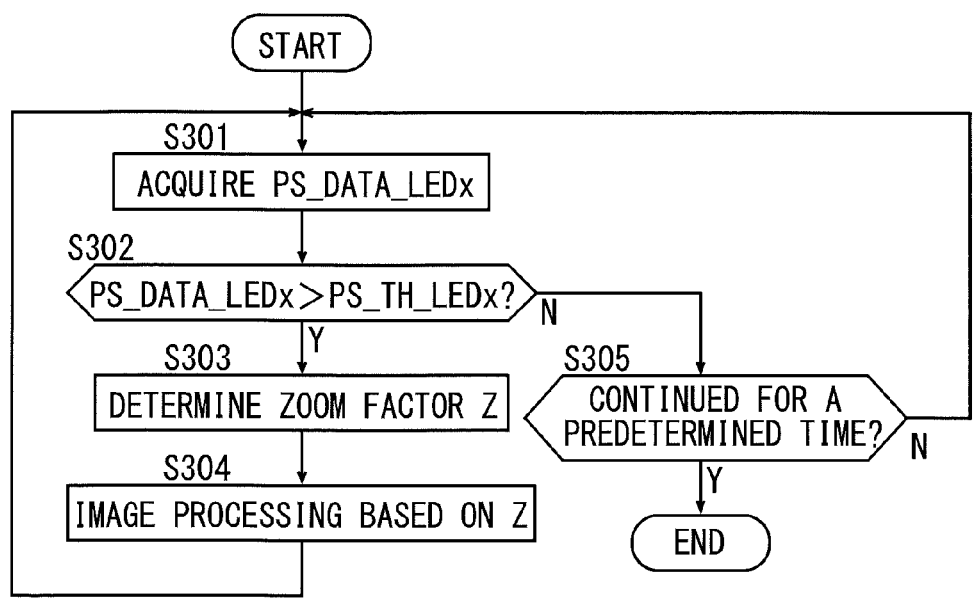
FIG. 29 is a flowchart showing the details of the zoom processing in step S111.

FIG. 29 is a flowchart showing the details of the zoom processing performed in step S111 of FIG. 24A or 24B. When the process flow starts, the PS measurement values PS_DATA_LEDx are acquired in step S301.

In the following step S302, a determination is made as to whether a PS measurement value PS_DATA_LEDx is consistently above the threshold value PS_TH_LEDx thereof. In a case in which a determination is made that a PS measurement value PS_DATA_LEDx is consistently above the threshold value PS_TH_LEDx thereof, the process proceeds to step S303. In a case in which a determination is made that PS measurement value PS_DATA_LEDx is not consistently above the threshold value PS_TH_LEDx thereof, the process proceeds to step S305. In step S305, a determination is made as to whether a state in which a PS measurement value PS_DATA_LEDx is not above the threshold value PS_TH_LEDx thereof has continued for a predetermined time tTH2. In the case of a "no" determination, the process returns to step S301. In the case of a "yes" determination, the sequence of processing described above is ended so as to end reception of zoom factor operations.

In a case in which a plurality of PS measurement values PS_DATA_LEDx exceeds the corresponding threshold values PS_TH_LEDx thereof, the sum or average of the PS measurement values may be compared in step S302 with the sum or average of the threshold values. In other words, it should be noted that a plurality of infrared LEDs need not necessarily be provided when the intent is to execute only zoom-in/zoom-out processing.

In step S303, the zoom factor Z is determined by comparing and referencing the PS measurement values PS_DATA_LEDx and a predetermined conversion table. After image processing based on the zoom factor Z has been performed in the following step S304, the process returns to step S301.

FIG. 30A is a view showing an example of the conversion table that is referenced in step S303. In this conversion table, the PS measurement values PS_DATA_LEDx may range from "0d" to "255d," whereas the threshold value PS_TH_LEDx is assumed to be set to "127d," and the zoom factor Z can be variably set to eight levels (50%, 75%, 100%, 150%, 200%, 300%, 400%, and 800%).

For example, when the value of the PS measurement value PS_DATA_LEDx is "128d" to "143d," the zoom factor Z is set to "50%," and when the value of the PS measurement value PS_DATA_LEDx is "160d" to "175d," the zoom factor Z is set to "100%." When the value of the PS measurement value PS_DATA_LEDx is "240d" to "255d," the zoom factor Z is set to "800%."

A configuration may also be adopted in which the zoom factor Z is sequentially computed by the arithmetic expression shown below, without using the above-mentioned conversion table.

$$Z=(\text{Default magnification})+\{(PS\_DATA\_LEDx)-(\text{Zoom reference value})\}\times k$$

FIG. 30B is a table showing another method for step S303. In this instance, the zoom factor Z is computed using the abovementioned arithmetic expression, where the assumed conditions set for calculation processing are a default magnification of 100%, a zoom reference value of 90, and a coefficient k of 3. Moreover, using the time (elapsed time 0) of transition to the zoom factor operation as a reference, the PS measurement value PS_DATA_LEDx is updated every 10 ms thereafter, for example.

In the example shown in FIG. 30B, the PS measurement value PS_DATA_LEDx at the time (elapsed time 0) of transition to the zoom factor operation is 80. Consequently, the computed zoom factor Z is 70% (=100+(80−90)×3). The PS measurement value PS_DATA_LEDx obtained 10 ms later is 82. Consequently, the computed zoom factor Z is 76% (=100+(82−90)×3). The zoom factor Z is sequentially computed by the same calculation processing thereafter.

FIG. 31 is a schematic view showing an example of the display processing for distance motion. The touchless motion function thus makes it possible to perform a zoom-in/zoom-out operation for a map image, photo image, or other image by a non-contact operation.

The arrangement layout shown in FIG. 19 is formed by combining the infrared LED 31 and the semiconductor device 1 to form the proximity sensor, and then adding the touchless motion function described above by optionally arranging the infrared LED 32 and the infrared LED 33, but ingenuity must be exercised in the arrangement of the semiconductor device 1 and the infrared LEDs 31 through 33 in order to more precisely determine the movement of the reflecting object 34.

Figure 32:
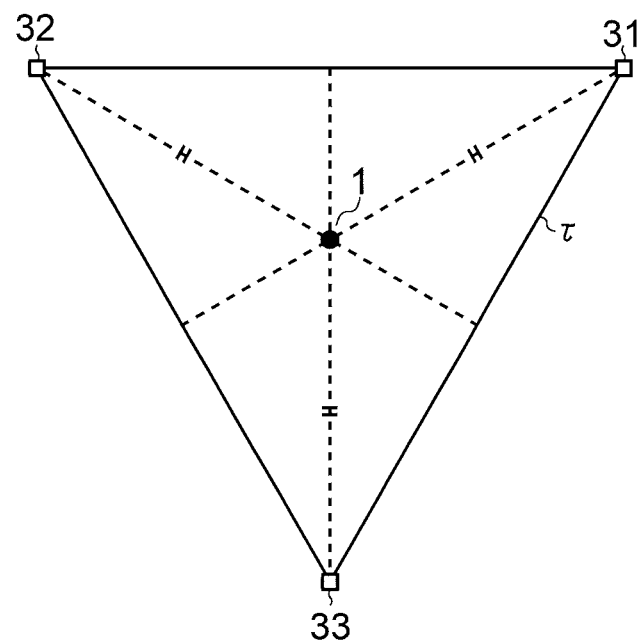
FIG. 32 is a view showing a modification relating to the arrangement of the semiconductor device and the infrared LEDs.

FIG. 32 is a schematic view showing a modification relating to the arrangement of the semiconductor device 1 and the infrared LEDs 31 through 33. In the arrangement layout of the present modification, the infrared LEDs 31 through 33 are provided at the vertex positions of an equilateral triangle τ, and the semiconductor device 1 provided with the infrared sensor 6 is provided at the center of gravity of the equilateral triangle τ. By employing such an arrangement layout, the movement of the reflecting object 34 can be more precisely determined by the movement detection algorithm described hereinafter.

FIG. 32 shows an example of a configuration which uses three infrared LEDs 31 through 33, but the present invention is not limited to this configuration, and a configuration may be adopted in which a light emitter is provided at each vertex of a regular polygon having four or more vertices.

Figure 33:
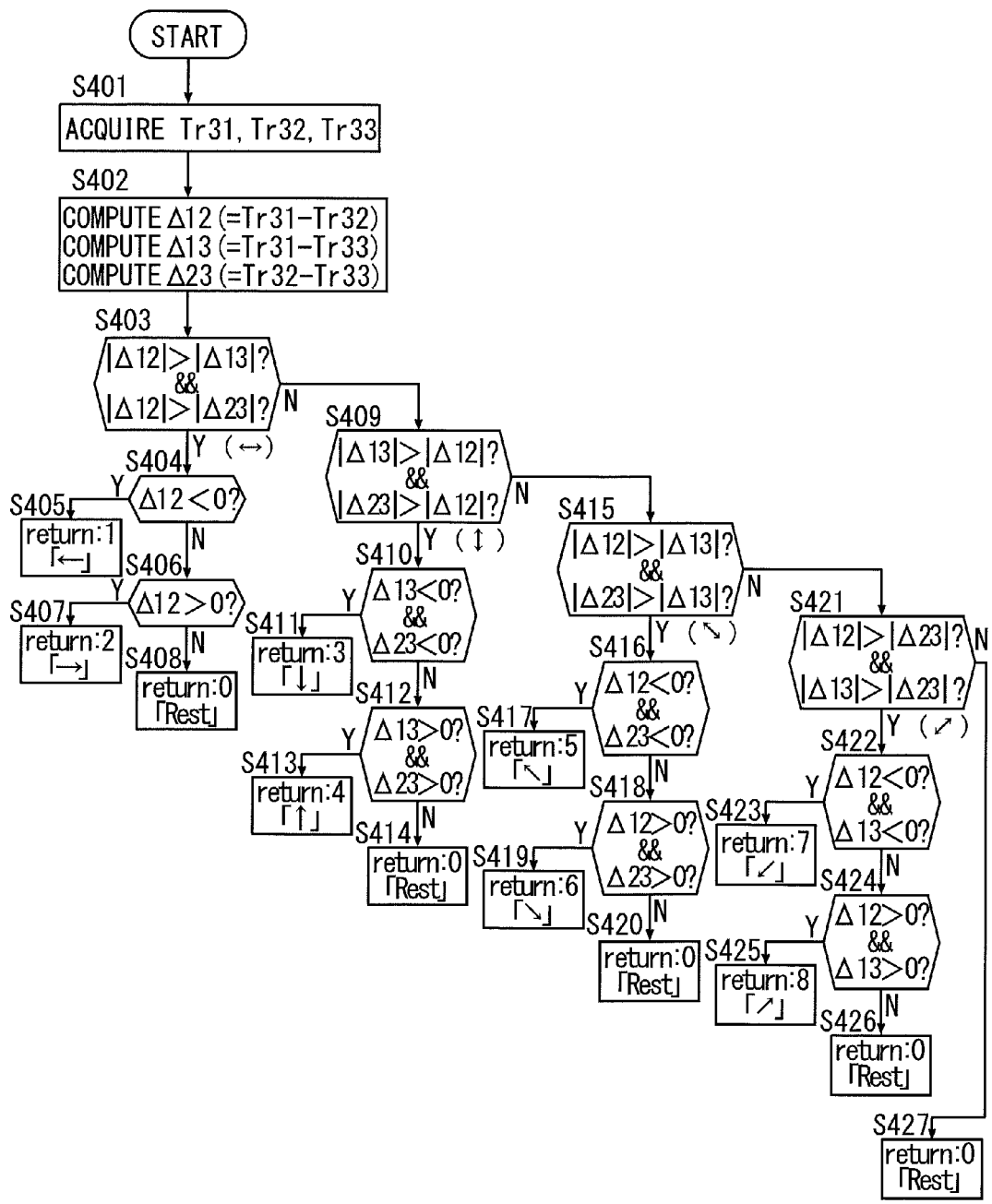
FIG. 33 is a flowchart showing the movement determination processing performed in step S107 in the arrangement shown in FIG. 32.

FIG. 33 is a flowchart showing the movement determination processing performed in step S107 when the arrangement layout shown in FIG. 32 is adopted. When the process flow starts, the first detection start time Tr31, the second detection start time Tr32, and the third detection start time Tr33 are acquired in step S401, and in the following step S402, the phase difference Δ12 (=Tr31−Tr32) of the intensity variation that occurs between the first reflected light and the second reflected light, the phase difference Δ13 (=Tr31−Tr33) of the intensity variation that occurs between the first reflected light and the third reflected light, and a phase difference Δ23 (=Tr32−Tr33) of the intensity variation that occurs between the second reflected light and the third reflected light are computed.

The example described herein is of a configuration in which the phase differences Δ12, Δ13, and Δ23 are computed based on the first detection start time Tr31, the second detection start time Tr32, and the third detection start time Tr33, but this configuration is not limiting, and a configuration may also be adopted in which a phase difference Δ12' (=Tf31−Tf32), a phase difference Δ13' (=Tf31−Tf33), and a phase difference Δ23' (=Tf32−Tf33) are computed based on the first detection end time Tf31, the second detection end time Tf32, and the third detection end time Tf33.

After the phase differences Δ12, Δ13, and Δ23 are computed, a determination is made in step S403 as to whether the absolute value |Δ12| of the phase difference Δ12 is greater than the absolute value |Δ13| of the phase difference Δ13, and whether the absolute value |Δ12| of the phase difference Δ12 is greater than the absolute value |Δ23| of the phase difference Δ23. In the case of a "yes" determination, the reflecting object 34 is determined to have moved along a first movement axis (the movement axis extending in the direction (left-right direction in the arrangement layout shown in FIG. 32) from the infrared LED 31 to the infrared LED 32), and the process proceeds to step S404. In the case of a "no" determination, the process proceeds to step S409.

In step S404, a determination is made as to whether the phase difference Δ12 is less than zero. In the case of a "yes" determination, the reflecting object 34 is determined to have moved in a first direction (direction from the infrared LED 31 to the infrared LED 32 (to the left in the arrangement layout shown in FIG. 32)), and the process proceeds to S405. In the case of a "no" determination, the process proceeds to S406.

In step S405, the value "1" indicating movement of the reflecting object 34 in the first direction is outputted as the return value "return," and the sequence of processing ends.

In step S406, a determination is made as to whether the phase difference Δ12 is greater than zero. In the case of a "yes" determination, the reflecting object 34 is determined to have moved in a second direction (direction from the infrared LED 32 to the infrared LED 31 (to the right in the arrangement layout shown in FIG. 32)), and the process proceeds to S407. In the case of a "no" determination, the process proceeds to S408.

In step S407, the value "2" indicating movement of the reflecting object 34 in the second direction is outputted as the return value "return," and the sequence of processing ends.

In step S408, the value "0" indicating that movement determination processing was not performed correctly is outputted as the return value "return," and the sequence of processing ends.

In step S409, a determination is made as to whether the absolute value |Δ13| of the phase difference Δ13 is greater than the absolute value |Δ12| of the phase difference Δ12, and whether the absolute value |Δ23| of the phase difference Δ23 is greater than the absolute value |Δ12| of the phase difference Δ12. In the case of a "yes" determination, the reflecting object 34 is determined to have moved along a second movement axis (the movement axis extending in the direction (up-down direction in the arrangement layout shown in FIG. 32) between the infrared LED 33 and the midpoint of a line segment connecting the infrared LED 31 and the infrared LED 32), and the process proceeds to step S410. In the case of a "no" determination, the process proceeds to step S415.

In step S410, a determination is made as to whether the phase difference Δ13 is less than zero, and whether the phase difference Δ23 is less than zero. In the case of a "yes" determination, the reflecting object 34 is determined to have moved in a third direction (direction to the infrared LED 33 from the midpoint of a line segment connecting the infrared LED 31 and the infrared LED 32 (downward in the arrangement layout shown in FIG. 32)), and the process proceeds to S411. In the case of a "no" determination, the process proceeds to S412.

In step S411, the value "3" indicating movement of the reflecting object 34 in the third direction is outputted as the return value "return," and the sequence of processing ends.

In step S412, a determination is made as to whether the phase difference Δ13 is greater than zero, and whether the phase difference Δ23 is greater than zero. In the case of a "yes" determination, the reflecting object 34 is determined to have moved in a fourth direction (direction from the infrared LED 33 to the midpoint of a line segment connecting the infrared LED 31 and the infrared LED 32 (upward in the arrangement layout shown in FIG. 32)), and the process proceeds to S413. In the case of a "no" determination, the process proceeds to S414.

In step S413, the value "4" indicating movement of the reflecting object 34 in the fourth direction is outputted as the return value "return," and the sequence of processing ends.

In step S414, the value "0" indicating that movement determination processing was not performed correctly is outputted as the return value "return," and the sequence of processing ends.

In step S415, a determination is made as to whether the absolute value |Δ12| of the phase difference Δ12 is greater than the absolute value |Δ13| of the phase difference Δ13, and whether the absolute value |Δ23| of the phase difference Δ23 is greater than the absolute value |Δ13| of the phase difference Δ13. In the case of a "yes" determination, the reflecting object 34 is determined to have moved in a third direction (the movement axis extending in the direction to the infrared LED 32 from the midpoint of a line segment connecting the infrared LED 31 and the infrared LED 33 (inclined direction downward and to the right (upward and to the left) in the arrangement layout shown in FIG. 32)), and the process proceeds to S416. In the case of a "no" determination, the process proceeds to S421.

In step S416, a determination is made as to whether the phase difference Δ12 is less than zero, and whether the phase difference Δ23 is less than zero. In the case of a "yes" determination, the reflecting object 34 is determined to have moved in a fifth direction (direction to the infrared LED 32 from the midpoint of a line segment connecting the infrared LED 31 and the infrared LED 33 (upward and to the left in the arrangement layout shown in FIG. 32)), and the process proceeds to S417. In the case of a "no" determination, the process proceeds to S418.

In step S417, the value "5" indicating movement of the reflecting object 34 in the fifth direction is outputted as the return value "return," and the sequence of processing ends.

In step S418, a determination is made as to whether the phase difference Δ12 is greater than zero, and whether the phase difference Δ23 is greater than zero. In the case of a "yes" determination, the reflecting object 34 is determined to have moved in a sixth direction (direction from the infrared LED 32 to the midpoint of a line segment connecting the infrared LED 31 and the infrared LED 33 (downward and to the right in the arrangement layout shown in FIG. 32)), and the process proceeds to S419. In the case of a "no" determination, the process proceeds to S420.

In step S419, the value "6" indicating movement of the reflecting object 34 in the sixth direction is outputted as the return value "return," and the sequence of processing ends.

In step S420, the value "0" indicating that movement determination processing was not performed correctly is outputted as the return value "return," and the sequence of processing ends.

In step S421, a determination is made as to whether the absolute value |Δ12| of the phase difference Δ12 is greater than the absolute value |Δ23| of the phase difference Δ23, and whether the absolute value |Δ13| of the phase difference Δ13 is greater than the absolute value |Δ23| of the phase difference Δ23. In the case of a "yes" determination, the reflecting object 34 is determined to have moved in a fourth direction (the movement axis extending in the direction to the infrared LED 31 from the midpoint of a line segment connecting the infrared LED 32 and the infrared LED 33 (inclined direction upward and to the right (downward and to the left) in the arrangement layout shown in FIG. 32)), and the process proceeds to S422. In the case of a "no" determination, the process proceeds to S427.

In step S422, a determination is made as to whether the phase difference Δ12 is less than zero, and whether the phase difference Δ13 is less than zero. In the case of a "yes" determination, the reflecting object 34 is determined to have moved in a seventh direction (direction from the infrared LED 31 to the midpoint of a line segment connecting the infrared LED 32 and the infrared LED 33 (downward and to the left in the arrangement layout shown in FIG. 32)), and the process proceeds to S423. In the case of a "no" determination, the process proceeds to S424.

In step S423, the value "7" indicating movement of the reflecting object 34 in the seventh direction is outputted as the return value "return," and the sequence of processing ends.

In step S424, a determination is made as to whether the phase difference Δ12 is greater than zero, and whether the phase difference Δ13 is greater than zero. In the case of a "yes" determination, the reflecting object 34 is determined to have moved in an eighth direction (direction to the infrared LED 31 from the midpoint of a line segment connecting the infrared LED 32 and the infrared LED 33 (upward and to the right in the arrangement layout shown in FIG. 32)), and the process proceeds to S425. In the case of a "no" determination, the process proceeds to S426.

In step S425, the value "8" indicating movement of the reflecting object 34 in the eighth direction is outputted as the return value "return," and the sequence of processing ends.

In step S426, the value "0" indicating that movement determination processing was not performed correctly is outputted as the return value "return," and the sequence of processing ends.

In step S427, the value "0" indicating that movement determination processing was not performed correctly is outputted as the return value "return," and the sequence of processing ends.

Figure 34:
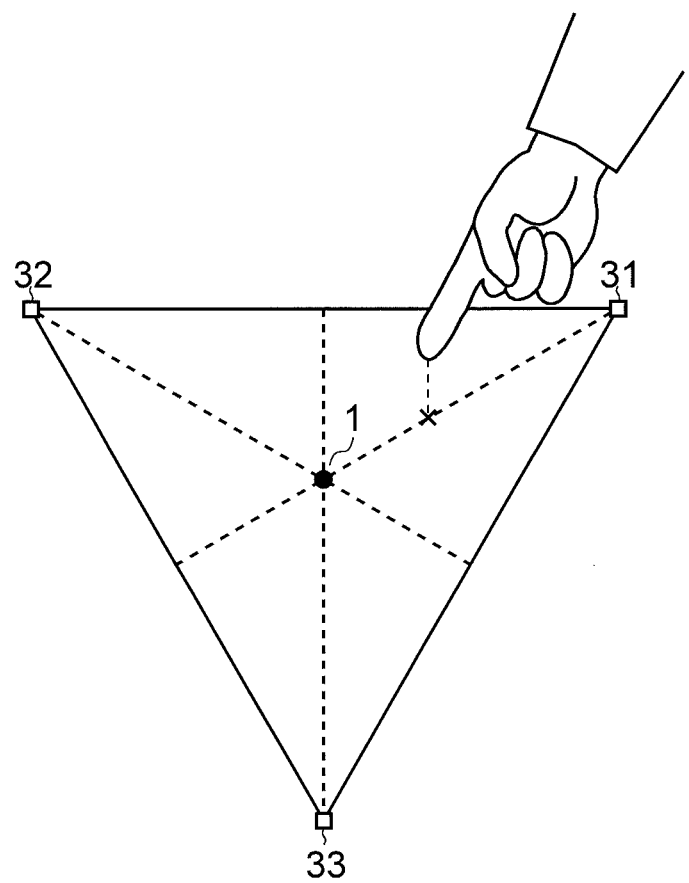
FIG. 34 is a view showing the cursor operation that can be performed in the arrangement shown in FIG. 32.
Figure 35:
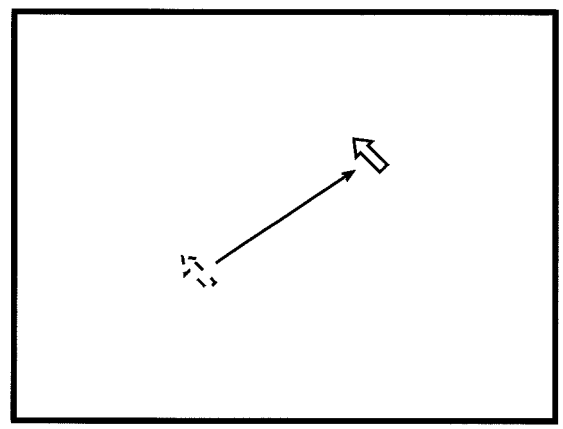
FIG. 35 is a schematic view showing the manner in which cursor movement occurs on the display screen.

When the arrangement layout shown in FIG. 32 is used, a cursor operation is also made possible by computing the ratio of the first PS measurement value PS_DATA_LED31 and the second PS measurement value PS_DATA_LED32 (=PS_DATA_LED32/PS_DATA_LED31), and the ratio of the first PS measurement value PS_DATA_LED31 and the third PS measurement value PS_DATA_LED33 (=PS_DATA_LED33/PS_DATA_LED31), separately from the algorithm described above (see FIGS. 34 and 35).

Figure 36:
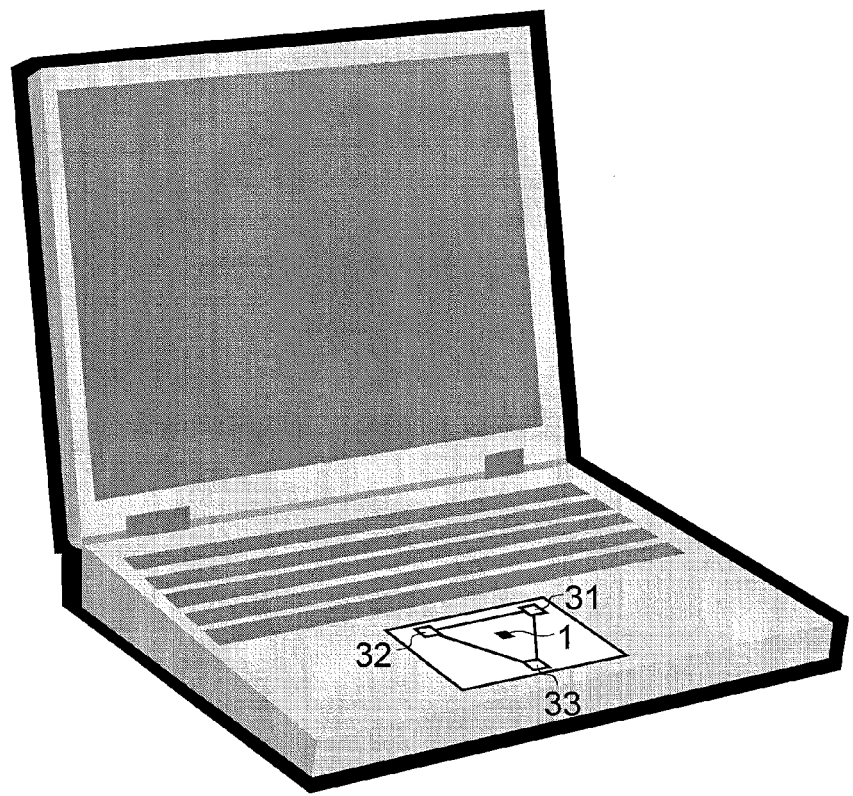
FIG. 36 is a schematic view showing an example of an application of the movement detection device which utilizes the arrangement shown in FIG. 32.

FIG. 36 is a schematic view showing an example of an application of the movement detection device which utilizes the arrangement layout shown in FIG. 32. The movement detection device can thus be utilized as a non-contact user interface in various electronic instruments such as personal computers.

As described above, a configuration is adopted in which the MCU 36 receives a first PS measurement value PS_DATA_LED31, a second PS measurement value PS_DATA_LED32, and a third PS measurement value PS_DATA_LED33 for indicating the intensity of each reflected light that reaches the single infrared light sensor 6 via the reflecting object 34, the reflected light having been emitted in sequence from the infrared LEDs 31 through 33 provided in mutually difference positions, and the MCU 36 computes each phase difference ($\Delta12, \Delta13,$ and $\Delta23$) of intensity variations that occur between each reflected light, and determines the movement of the reflecting object 34 on the basis of the computation results (see FIGS. 25 and 33, for example).

In particular, a configuration is adopted in which the MCU 36 acquires the absolute values of at least two phase differences among the phase difference $\Delta12$ of the intensity variation that occurs between the first reflected light and the second reflected light, the phase difference $\Delta13$ of the intensity variation that occurs between the first reflected light and the third reflected light, and the phase difference $\Delta23$ of the intensity variation that occurs between the second reflected light and the third reflected light, and the MCU 36 determines the movement axis of the reflecting object 34 on the basis of the size relationship between the acquired absolute values (see steps S203 and S209 of FIG. 25, and steps S403, S409, S415, and S421 of FIG. 33, for example).

A configuration is also adopted in which the MCU 36 determines the movement direction of the reflecting object 34 on the abovementioned movement axis on the basis of the positive or negative sign of the phase difference whose absolute value is determined to be the larger among two phase differences whose absolute values are compared (see steps S204, S206, S210, and S212 of FIG. 25, and steps S404, S406, S410, S412, S416, S418, S422, and S424 of FIG. 33, for example).

Through the MCU 36 configured such as described above, and a movement detection device and electronic instrument which use the MCU 36, it is possible to determine not only the proximity of a reflecting object, but also the direction of transit of the reflecting object, merely by the simple system modification of arranging a plurality of infrared LEDs.

Consequently, by performing image processing on the basis of the movement determination result described above, for example, an image operation function (touchless motion function) can be realized by a non-contact operation. This technique can be utilized as a novel UI (User Interface) in mobile telephone devices, digital cameras, and the like, and can also demonstrate significant effects in situations in which touch operation is undesirable, e.g., when operating hospital examination devices, turning the pages of an electronic book during cooking or in other states in which the hands are contaminated, and in other situations. The technique described above may also be helpful in preventing infectious diseases in communal facilities and the like, since devices (automatic vending machines and the like) accessed by the general public can be operated without contact.

The computation algorithm for realizing the movement detection processing described above may be implemented using dedicated hardware, or by a software-based configuration by reading a predetermined program into a general-purpose microcomputer.

<Application to a Task Light>

Figure 37:
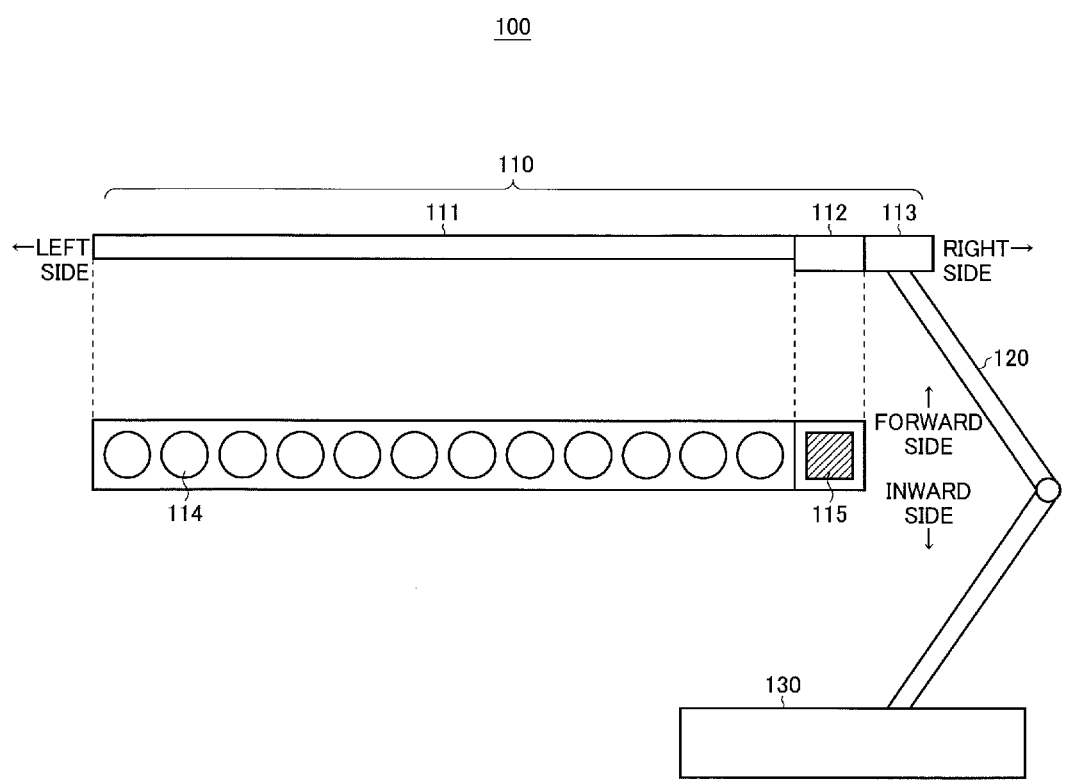
FIG. 37 is a view showing an outline of the illumination device.

FIG. 37 is a view showing an outline of an example of the configuration of an illumination device. As shown in FIG. 37, the illumination device 100 of the present configuration example is a task light having a housing 110, an arm 120, and a pedestal 130.

In structural terms, the housing 110 has a light source support part 111, an operating part 112, and an arm attachment part 113, and one end of the arm attachment part 113 is supported by the arm 120. A plurality of light sources 114 is retained in a row on the bottom side of the light source support part 111, and LEDs are suitable for use as the light sources 114. A touchless sensor 115 is retained on the bottom side of the operating part 112. The touchless sensor 115 is a constituent element for detecting proximity and movement of an object (a hand, finger, or other part of the user) without contact. Since the semiconductor device 1 (including the externally attached infrared sensors 31 through 33 described above) is suitable for use as the touchless sensor 115, no redundant description will be given of the configuration or operation thereof. Through a configuration in which LEDs are used as the light sources 114, and the touchless sensor 115 is used as the means for detecting a user operation, the housing 110 can be molded so as to have an extremely thin profile (having a thickness of about 10 to 15 mm). The arm attachment part 113 is provided to an end part of the housing 110, and one end of the arm 120 is attached to the arm attachment part 113.

The arm 120 is a support member for forming a connection between the housing 110 and the pedestal 130, and has an arbitrarily bendable structure. The pedestal 130 is set on a desk or table, and supports the housing 110 and the arm 120.

In the illumination device 100 structured as described above, the touchless sensor 115 is preferably installed in the vicinity of the arm attachment part 113 to which the arm 120 is attached. Through this configuration, since the housing 110 is unlikely to be subjected to excessive force in the event that a hand or finger comes in contact with the touchless sensor 115 during operation, damage or deformation of the housing 110 can be prevented.

Figure 38:
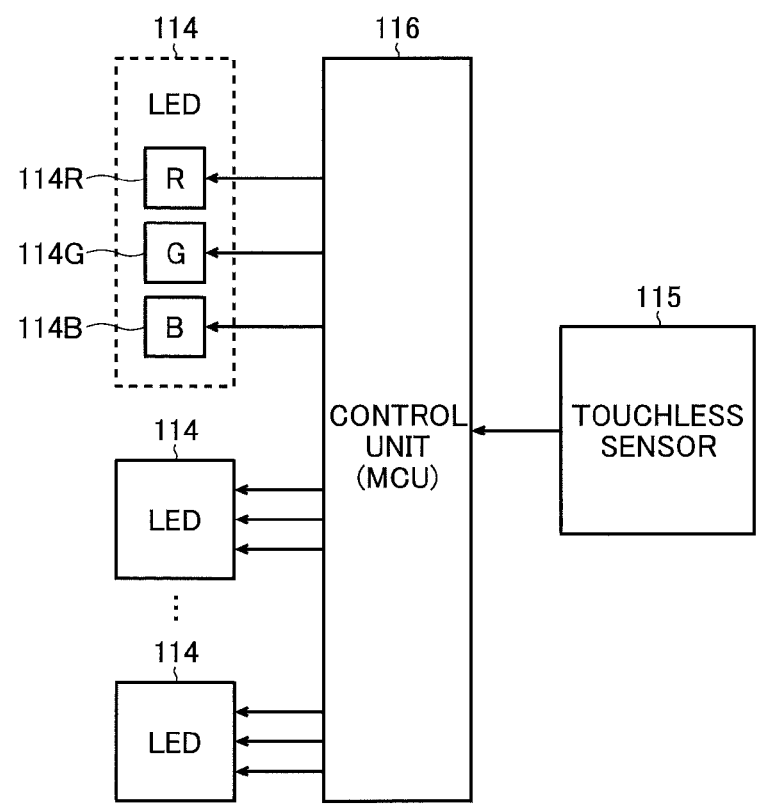
FIG. 38 is a block diagram showing the illumination device.

FIG. 38 is a block diagram showing an example of the configuration of the illumination device 100 (particularly the configuration of the periphery of the touchless sensor 115). As shown in FIG. 38, the illumination device 100 of the present configuration example has light sources 114, a touchless sensor touchless sensor 115 for detecting proximity and movement of an object without contact, and a control unit 116 (corresponding to the previously described MCU 36) for controlling the driving of the light sources 114 on the basis of the output of the touchless sensor 115.

Each of the plurality of provided light sources 114 is provided with a plurality of LED elements (three types in FIG. 38, including a red LED 114R, a green LED 114G, and a blue LED 114B) having different emission colors, and the 116 controls the driving of the LED elements individually for each color. Through such a configuration, the control unit 116 can perform not only on/off control or dimming control (light intensity control) of the light sources 114, but also toning control (color temperature control) of the light sources 114.

Figure 39:
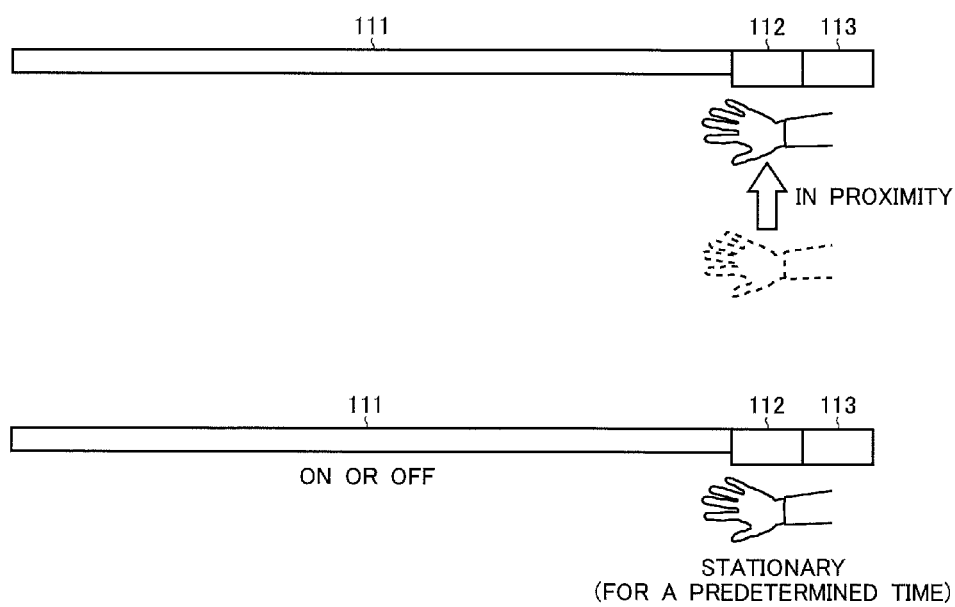
FIG. 39 is a schematic view showing an example of the touchless on/off control.

FIG. 39 is a schematic view showing an example of the touchless on/off control. As shown in FIG. 39, the control unit 116 performs on/off control of the light sources 114 when a hand or finger of the user is stationary for a predetermined time while in proximity to the operating part 112 (touchless sensor 115). For example, when the light sources 114 are already off, the light sources 114 are turned on when the hand or finger of the user is stationary for a predetermined time while in proximity to the operating part 112 (touchless sensor 115), and when the light sources 114 are already on, the light sources 114 are turned off when the hand or finger of the user is stationary for a predetermined time while in proximity to the operating part 112 (touchless sensor 115).

Figure 40:
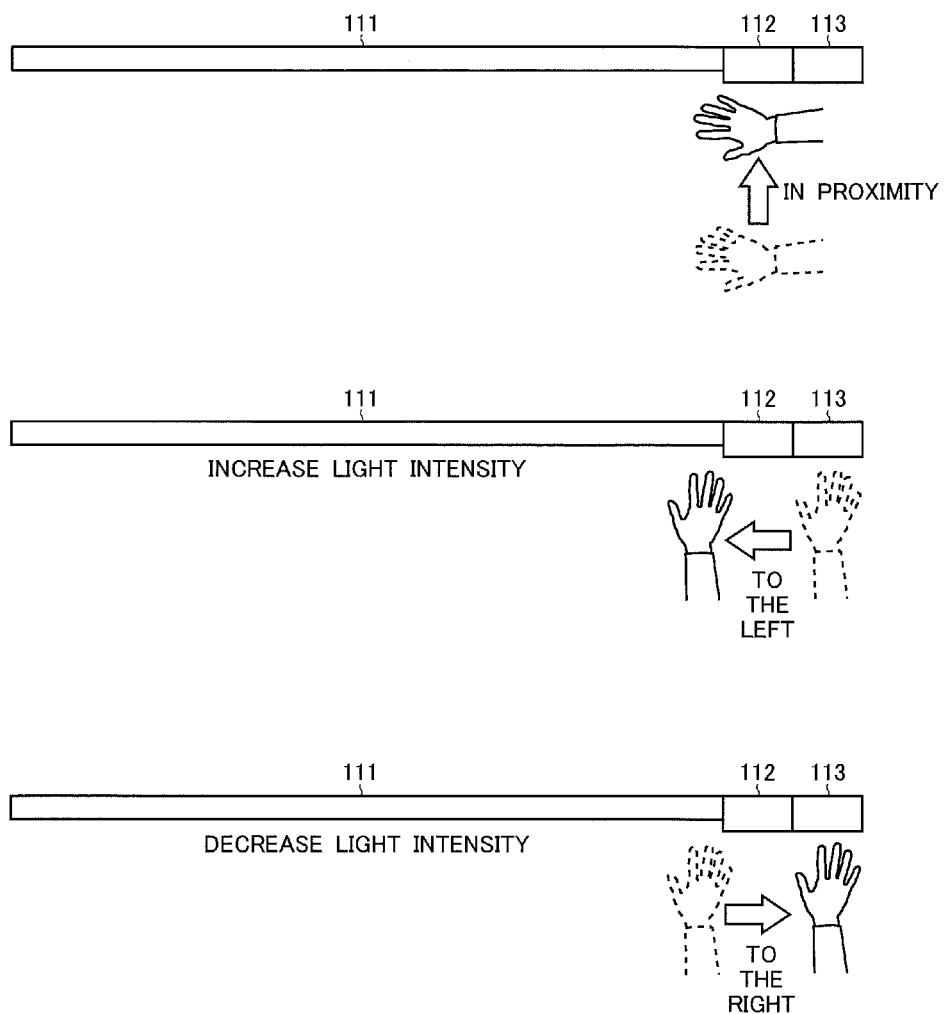
FIG. 40 is a schematic view showing an example of the touchless dimmer control.

FIG. 40 is a schematic view showing an example of the touchless dimmer control. As shown in FIG. 40, the control unit 116 performs dimmer control of the light sources 114 in accordance with the direction when the hand or finger of the user is moved in a predetermined direction (left-right direction in FIG. 40) while in proximity to the operating part 112 (touchless sensor 115). For example, the light intensity of the light sources 114 is increased when the hand or finger of the user is moved in a first direction (right to left in FIG. 40) while in proximity to the operating part 112 (touchless sensor 115), and the light intensity of the light sources 114 is decreased when the hand or finger of the user is moved in a second direction (left to right in FIG. 40).

The first direction for instructing an increase in light intensity, and the second direction for instructing a decrease in light intensity are preferably set so as to be mutually opposite directions. Through this configuration, the user can intuitively comprehend the proper direction to move a hand or finger in order to increase or decrease the light intensity.

The abovementioned dimmer control may also be configured so that the light intensity of the light sources 114 is varied one step at a time each time that movement of the hand or finger is detected, or the dimmer control may be configured so that a continuous increased or decrease in the light intensity of the light sources 114 is triggered by detection of hand or finger movement, and once the hand or finger is moved away from the operating part 112 (touchless sensor 115), light intensity variation of the light sources 114 is stopped when the hand or finger is again brought into proximity to the operating part 112 (touchless sensor 115). In a case in which the latter configuration is adopted, the determination as to whether to continuously increase or decrease the light intensity of the light sources 114 is made according to the direction in which the hand or finger is moved.

Figure 41:
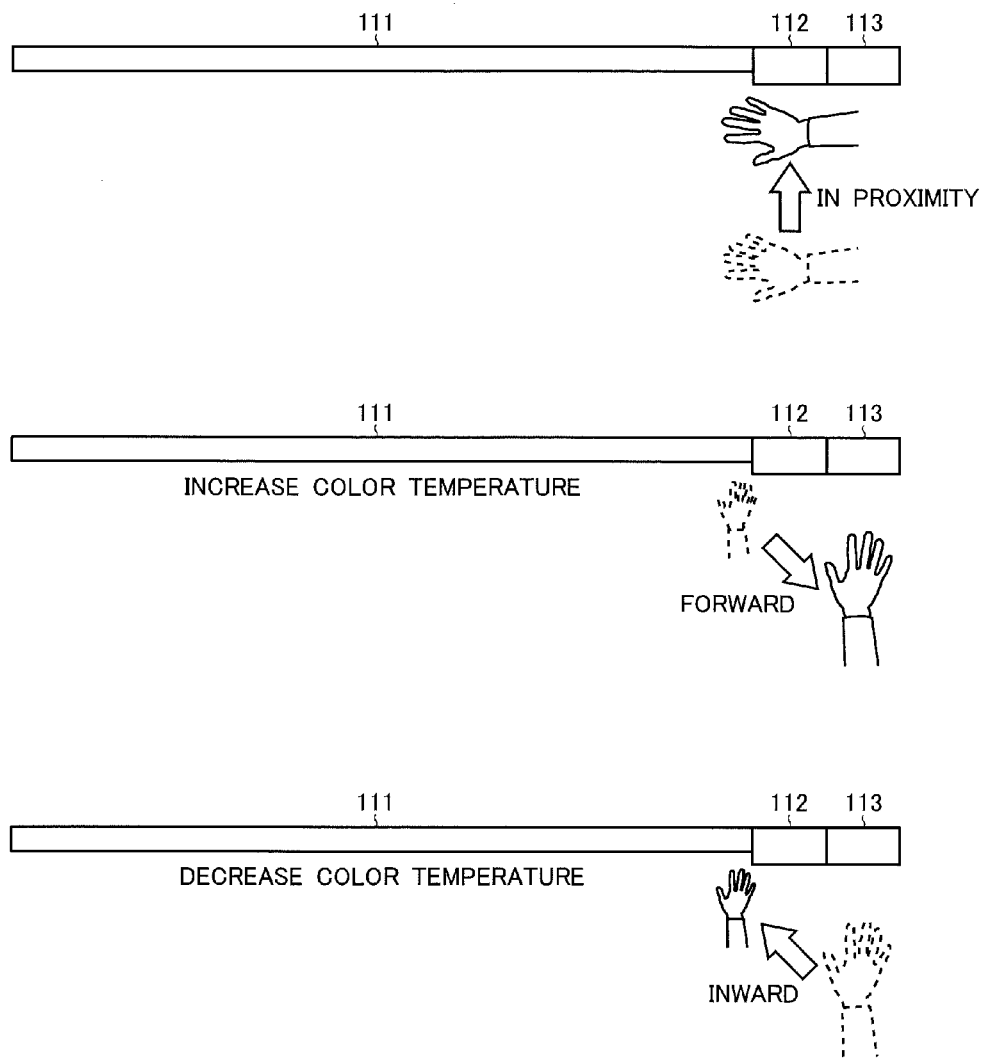
FIG. 41 is a schematic view showing an example of the touchless toning control.

FIG. 41 is a schematic view showing an example of the touchless toning control. As shown in FIG. 41, the control unit 116 performs toning control of the light sources 114 in accordance with the direction when the hand or finger of the user is moved in a predetermined direction (front-rear direction in FIG. 41) while in proximity to the operating part 112 (touchless sensor 115). For example, when the hand or finger of the user is moved in a third direction (inward toward the user in FIG. 41) while in proximity to the operating part 112 (touchless sensor 115), the color temperature of the light sources 114 is increased, and when the hand or finger of the user is moved in a fourth direction (outward away from the user in FIG. 41), the color temperature of the light sources 114 is decreased.

The third direction for instructing an increase in color temperature, and the fourth direction for instructing a decrease in color temperature are preferably set so as to be mutually opposite directions. Through this configuration, the user can intuitively comprehend the proper direction to move a hand or finger in order to increase or decrease the color temperature.

The first direction and second direction for instructing the dimmer control (increase or decrease in light intensity), and the third and fourth directions for instructing the toning control (increase or decrease in color temperature) are preferably set so as to be orthogonal to each other. Through this configuration, the user can clearly distinguish between performing dimmer control and toning control.

As in the case of dimmer control described above, the abovementioned toning control may also be configured so that the color temperature of the light sources 114 is varied one step at a time each time that movement of the hand or finger is detected, or the toning control may be configured so that a continuous increased or decrease in the color temperature of the light sources 114 is triggered by detection of hand or finger movement, and once the hand or finger is moved away from the operating part 112 (touchless sensor 115), color temperature variation of the light sources 114 is stopped when the hand or finger is again brought into proximity to the operating part 112 (touchless sensor 115). In a case in which the latter configuration is adopted, the determination as to whether to continuously increase or decrease the color temperature of the light sources 114 is made according to the direction in which the hand or finger is moved.

<Application to Office Illumination>

Figure 42:
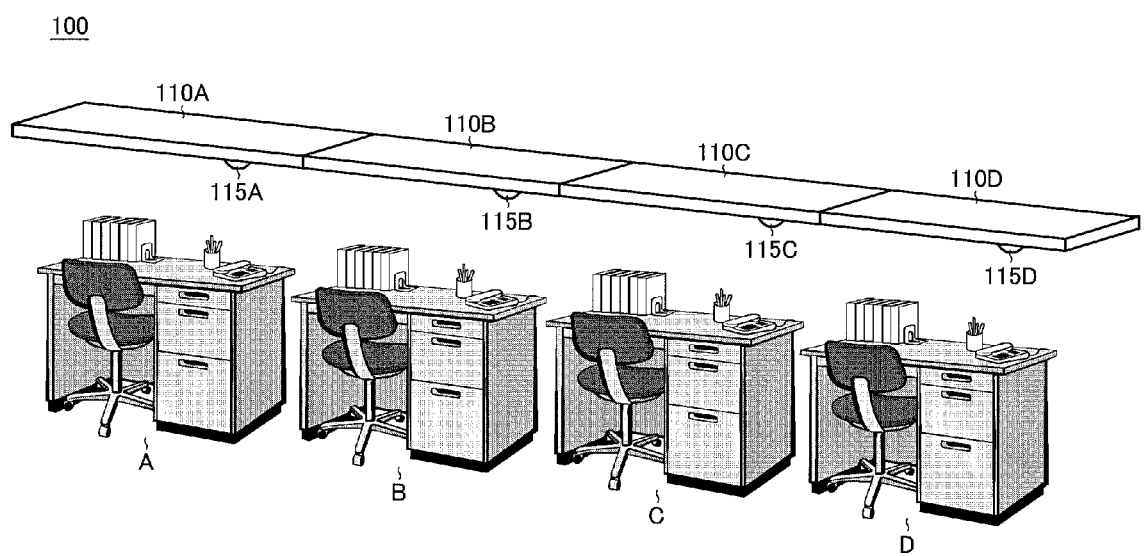
FIG. 42 is a schematic view showing an example of application to office illumination.

FIG. 42 is a schematic view showing an example of application to office illumination. As shown in FIG. 42, in a case in which a linear illumination device 100 is provided over desks A through D disposed in a row, an office illumination system is preferably constructed in which the housing 110 of the illumination device 100 is divided into four sections 110A through 110D so as to correspond to the desks A through D, and touchless sensors 115A through 115D are provided in corresponding fashion, whereby on/off control, dimmer control, and toning control can be performed individually for each section. Through such a configuration, driving of the illumination device 100 can be controlled at will for each desk A through D according to user preference or according to whether a user is present.

Figure 43:
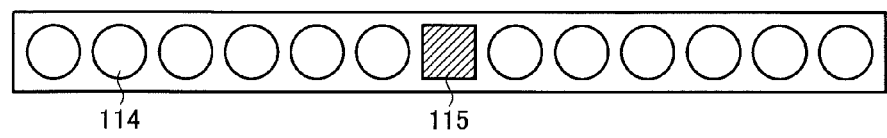
FIG. 43 is a schematic view showing a modification of the sensor arrangement layout.

In an illumination device 100 in which the housing 110 is installed on a ceiling or on the lower surface of a hanging cabinet, unlike the task light provided with an arm as shown in FIG. 37, since there is no need for the touchless sensor 115 to be mounted in the vicinity of the arm attachment part 113, a configuration may be adopted in which a plurality of light sources 114 arranged in a row is divided into two blocks, and the touchless sensor 115 is provided in the middle position, as shown in FIG. 43.

<Application to Ceiling Illumination>

Figure 44:
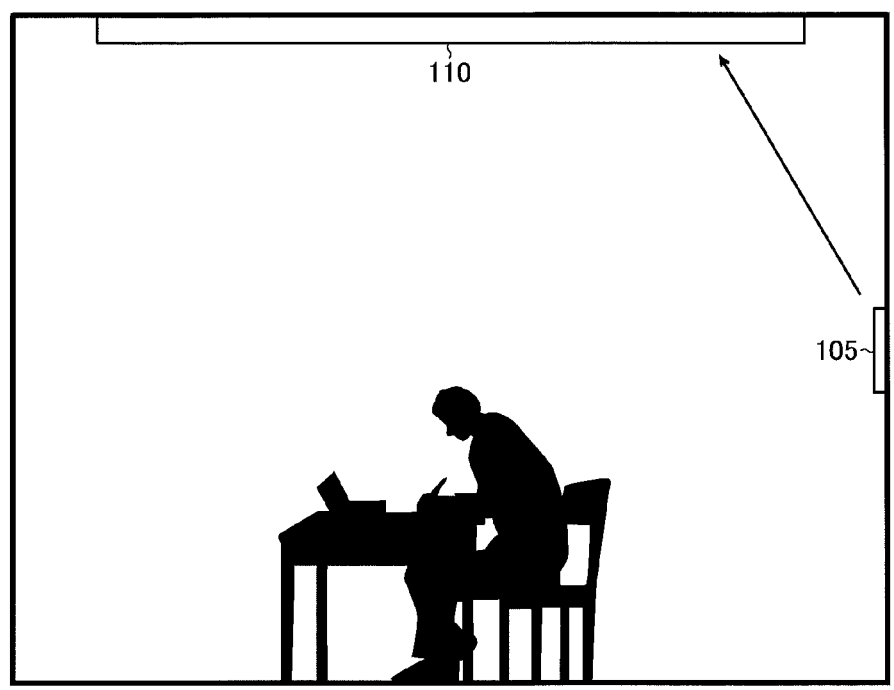
FIG. 44 is a schematic view showing an example of application to ceiling illumination.

FIG. 44 is a schematic view showing an example of application to ceiling illumination. As shown in FIG. 44, in a case in which the illumination device 100 is used as ceiling illumination, the touchless sensor 115 is preferably attached separate from the housing 110 and within reach (on a wall surface or elsewhere) of the user. Through such a configuration, touchless drive control can also be performed for an illumination device 100 that is installed on a ceiling. The signal transmission path from the touchless sensor 115 provided on the wall surface to the control unit 116 (not shown in FIG. 44) provided to the housing 110 may be wired or wireless.

<Touchless Sensing Method>

A configuration in which the previously described semiconductor device 1 (including the externally attached infrared sensors 31 through 33 described above) is used as the touchless sensor 115 is described above as an example, but the method of touchless sensing is not limited to this configuration, and a configuration may be adopted in which image recognition processing is performed by using an image sensor, for example.

<LED Illumination System>

Figure 45:
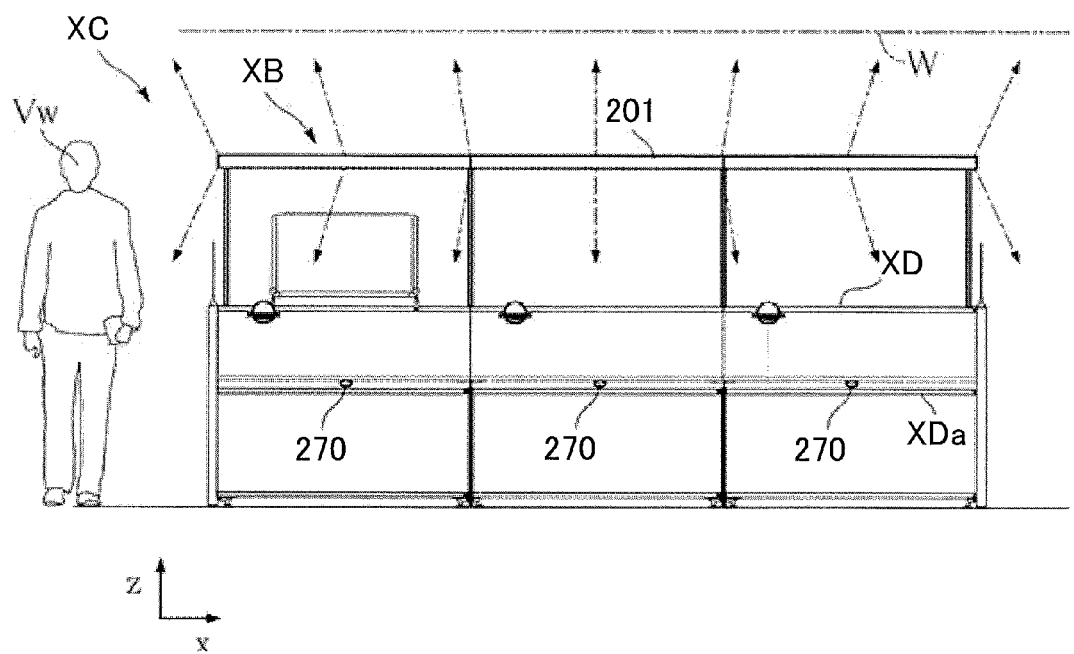
FIG. 45 is a front view showing an example of the LED illumination system.
Figure 46:
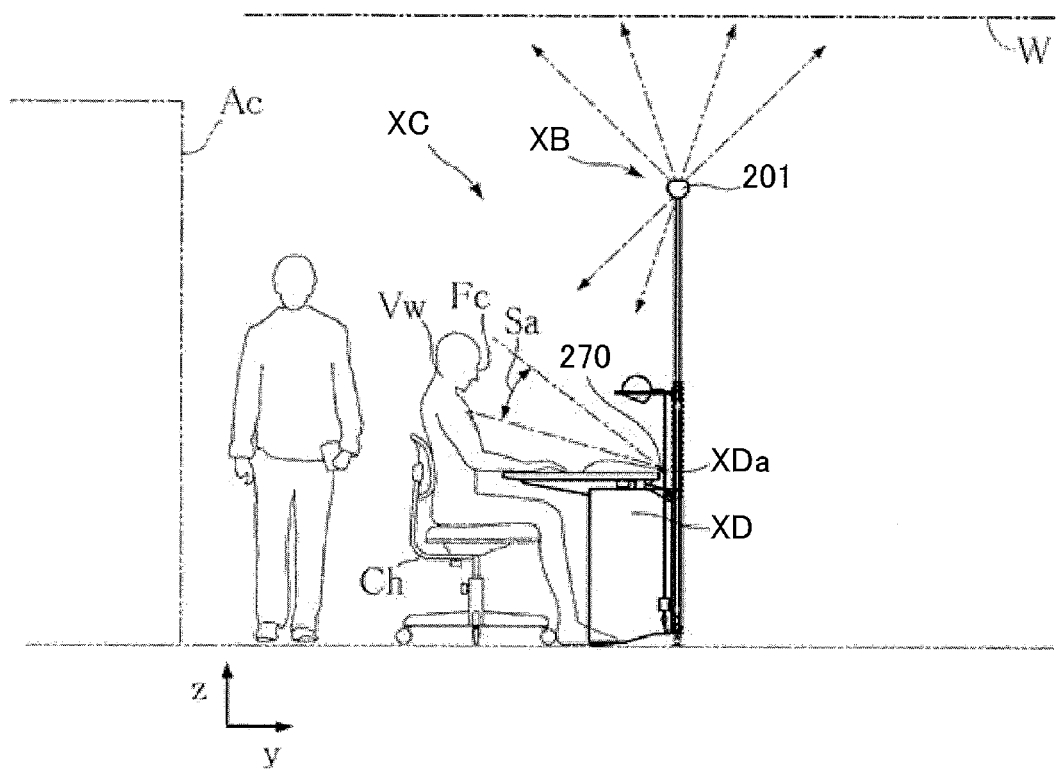
FIG. 46 is a side view showing an example of the LED illumination system.
Figure 53:
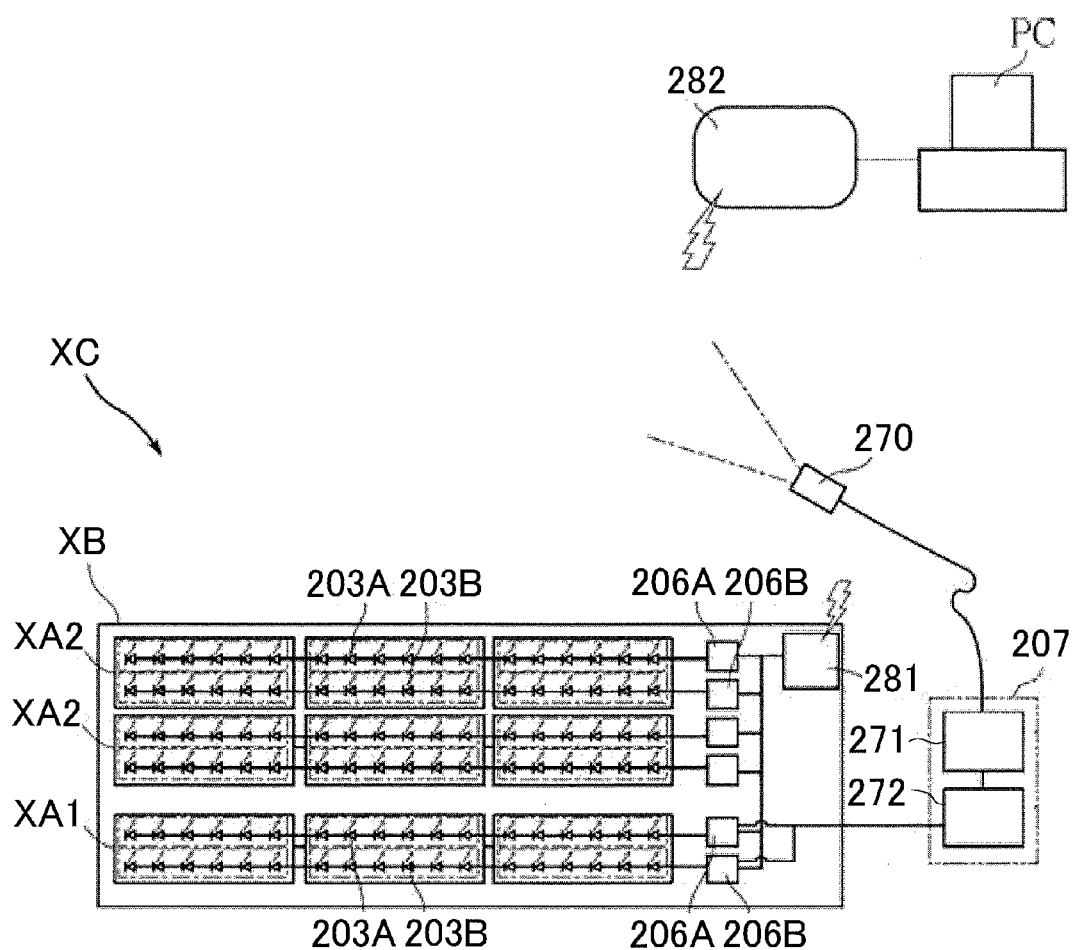
FIG. 53 is a system configuration view showing the LED illumination system shown in FIG. 1.

FIGS. 45, 46, and 53 show an example of an LED illumination system. The LED illumination system XC of the present embodiment is provided with a plurality of LED illumination devices XB, a camera unit 270, and a face recognition control means 207. The face recognition control means 207 is omitted in FIGS. 45 and 46 to facilitate understanding. The LED illumination system XC provides a brightness suitable for a reader Vw to read a book at a reading table XD in a library in which a plurality of archives Ac or reading tables XD is disposed, as shown in FIGS. 45 and 46, for example. In the present embodiment, the LED illumination system XC is provided with a function for illuminating a tabletop XDa of a reading table XD, and a function for illuminating a ceiling W directly above the reading table XD. As shown in FIG. 45, three LED illumination devices XB and three camera units 270 are provided to the LED illumination system XC. The LED illumination devices XB and the camera units 270 are paired with each other.

Figure 47:
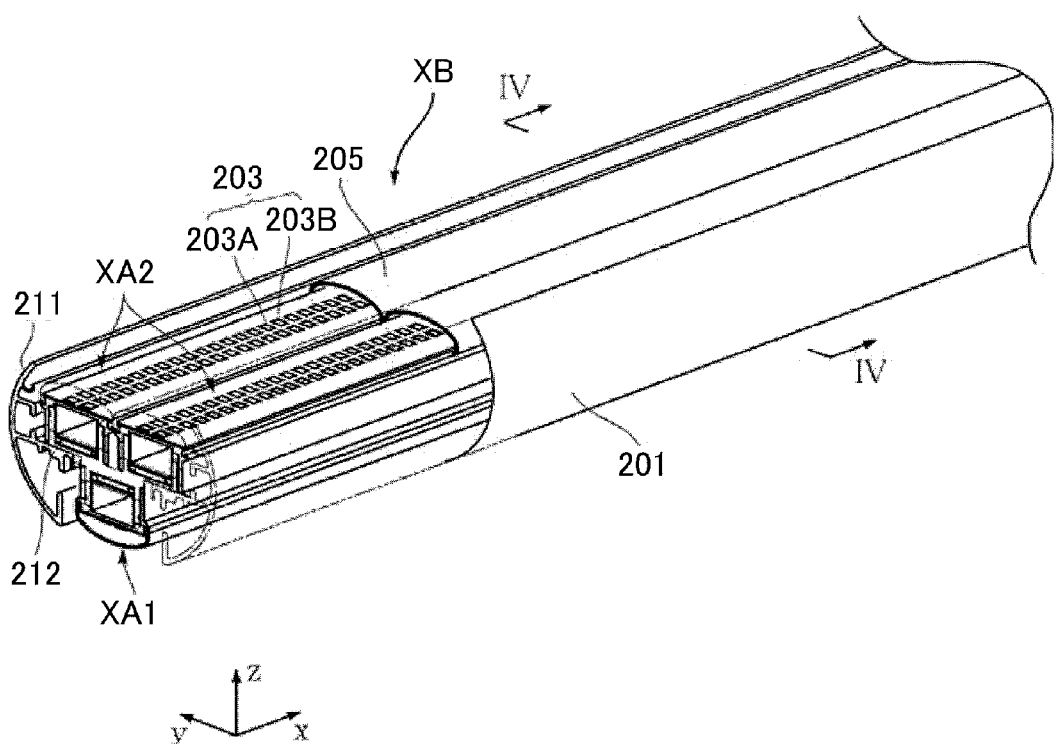
FIG. 47 is a perspective view showing the relevant parts in an example of the LED illumination device used in the LED illumination system shown in FIG. 1.

As shown in FIG. 47, the LED illumination device XB is provided with a plurality of LED units XA1, XA2 and a support cover 201. The LED illumination device XB is disposed in a top part of the reading table XD, and is configured so as to illuminate the ceiling W and the tabletop XDa of the reading table XD, as shown in FIGS. 45 and 46, for example.

Figure 48:
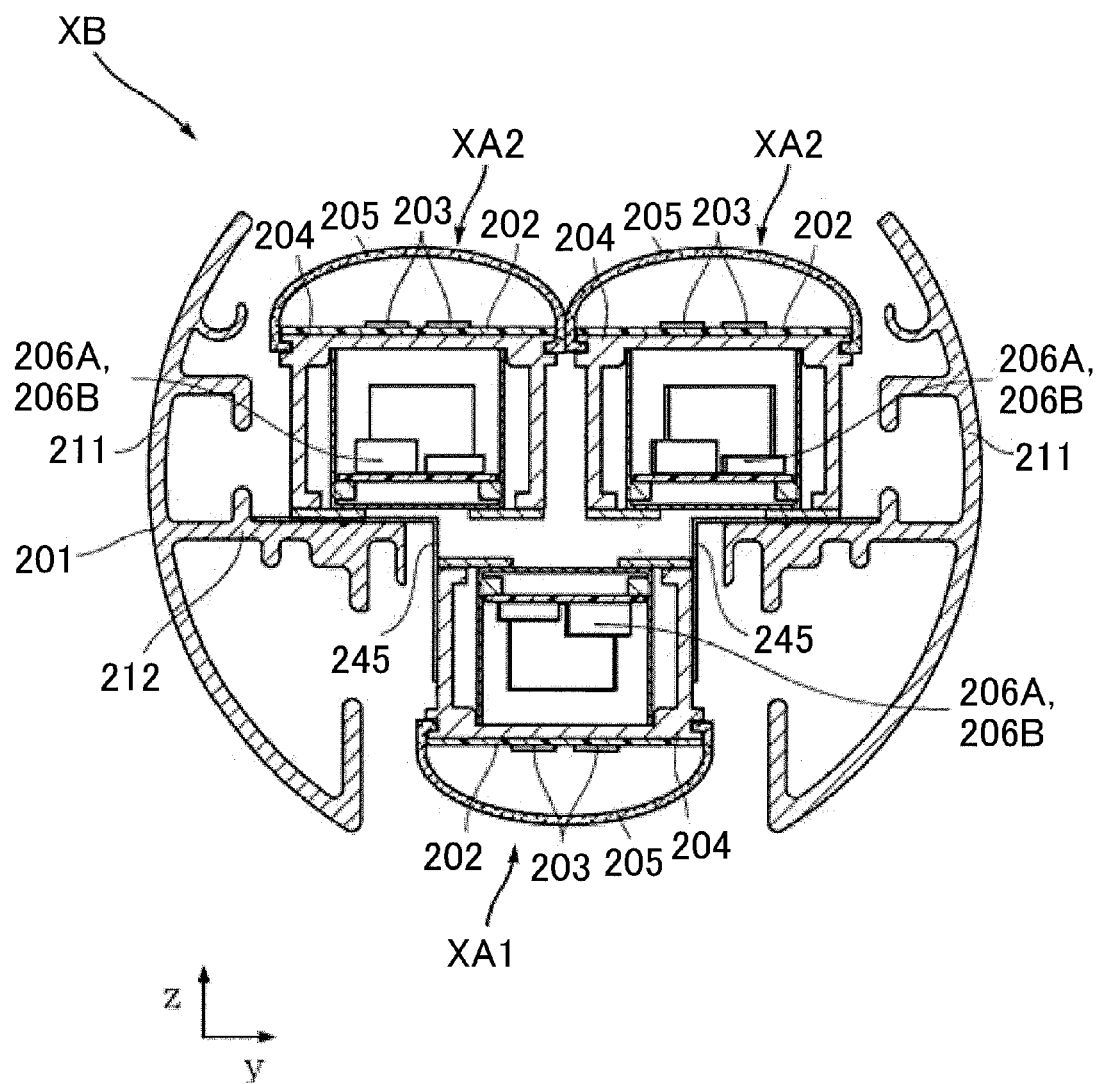
FIG. 48 is a sectional view along line IV-IV in FIG. 3.

The support cover 201 has an elongated cylindrical shape overall, and is attached to the top part of the reading table XD in an orientation in which the x direction is the longitudinal direction, as shown in FIGS. 45 and 46. As shown in FIGS. 47 and 48, the support cover 201 is provided with a pair of arcuate parts 211 and a pair of middle plate parts 212. The pair of arcuate parts 211 each correspond to a portion of the same circle, and are separated from each other in the y direction. The arcuate parts 211 prevent the light from the LED units XA1 from leaking in unintended directions, and are intended to give the LED illumination device XB a stylish appearance. The middle plate parts 212 extend in the y direction from the arcuate parts 211 toward the center of the same circle described above. The middle plate parts 212 are portions for supporting the LED units XA1, XA2.

Figure 49:
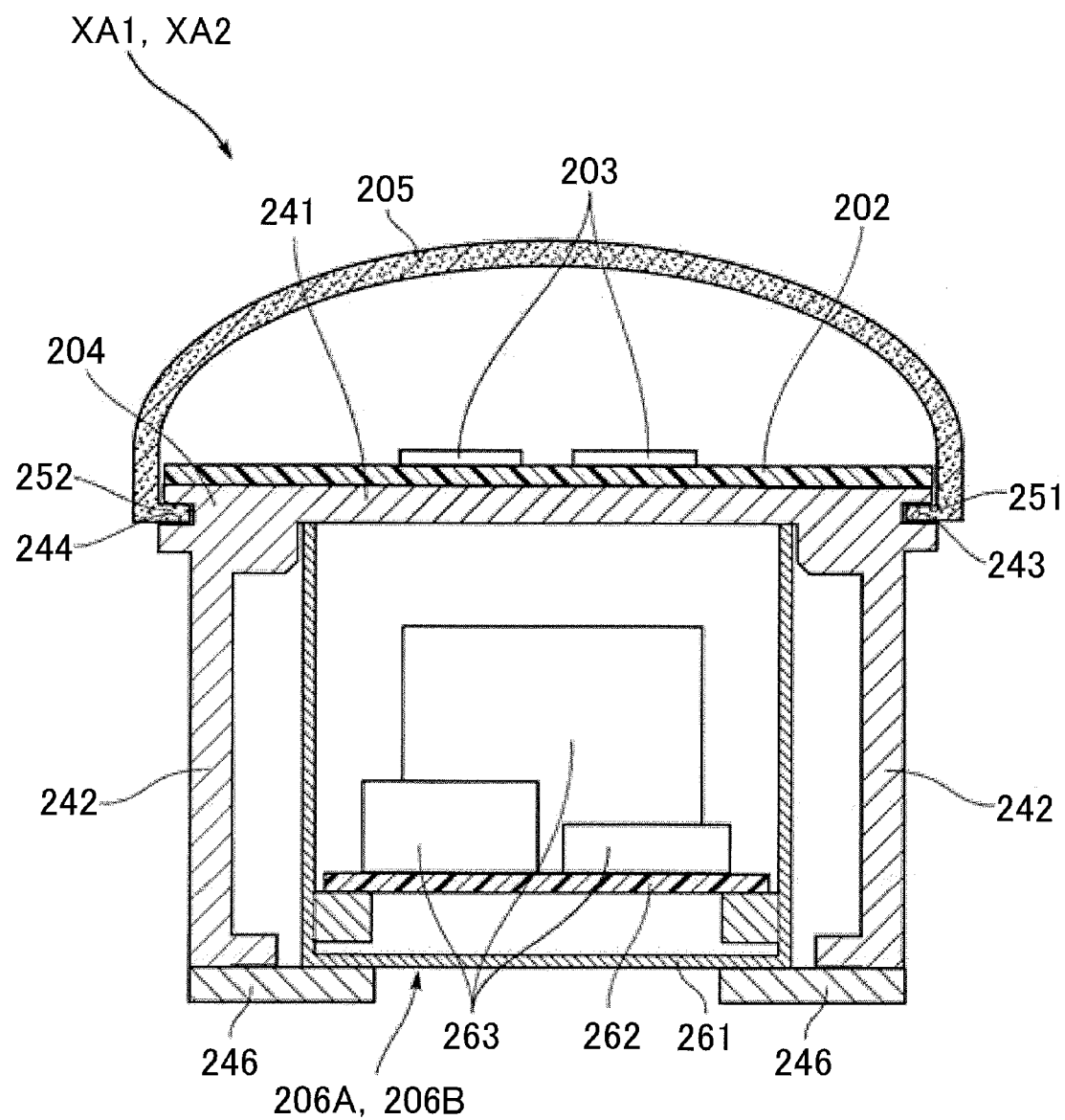
FIG. 49 is a sectional view showing an example of the LED unit used in the LED illumination device shown in FIG. 3.

The LED units XA1, XA2 both have the same configuration, and as shown in FIG. 49, the LED units XA1, XA2 are provided with a substrate 202, a plurality of LED modules 203, a support member 204, a cover 205, and first and second power supply units 206A, 206B. Furthermore, one of the plurality of LED units XA1, XA2 provided to the LED illumination device XB is further provided with a wireless handset unit 281 (see FIG. 53). The LED units XA1, XA2 have an elongated shape extending in the x direction, and are units for performing the emission function of the LED illumination device XB. In the present embodiment, the dimensions of the LED units XA1, XA2 are 1,227 mm in the x direction, 33 mm in the y direction, and 30 mm in the z direction. In the LED illumination device XB, a plurality of LED units XA2 is disposed in two rows parallel to each other on the upper side in the z direction, and a plurality of LED units XA1 is disposed in one row on the lower side in the z direction, as shown in FIGS. 47 and 48. The two rows of LED units XA2 on the upper side illuminate the ceiling W in FIGS. 45 and 46, and the one row of LED units XA1 on the lower side illuminates the tabletop XDa of the reading table XD.

Figure 50:
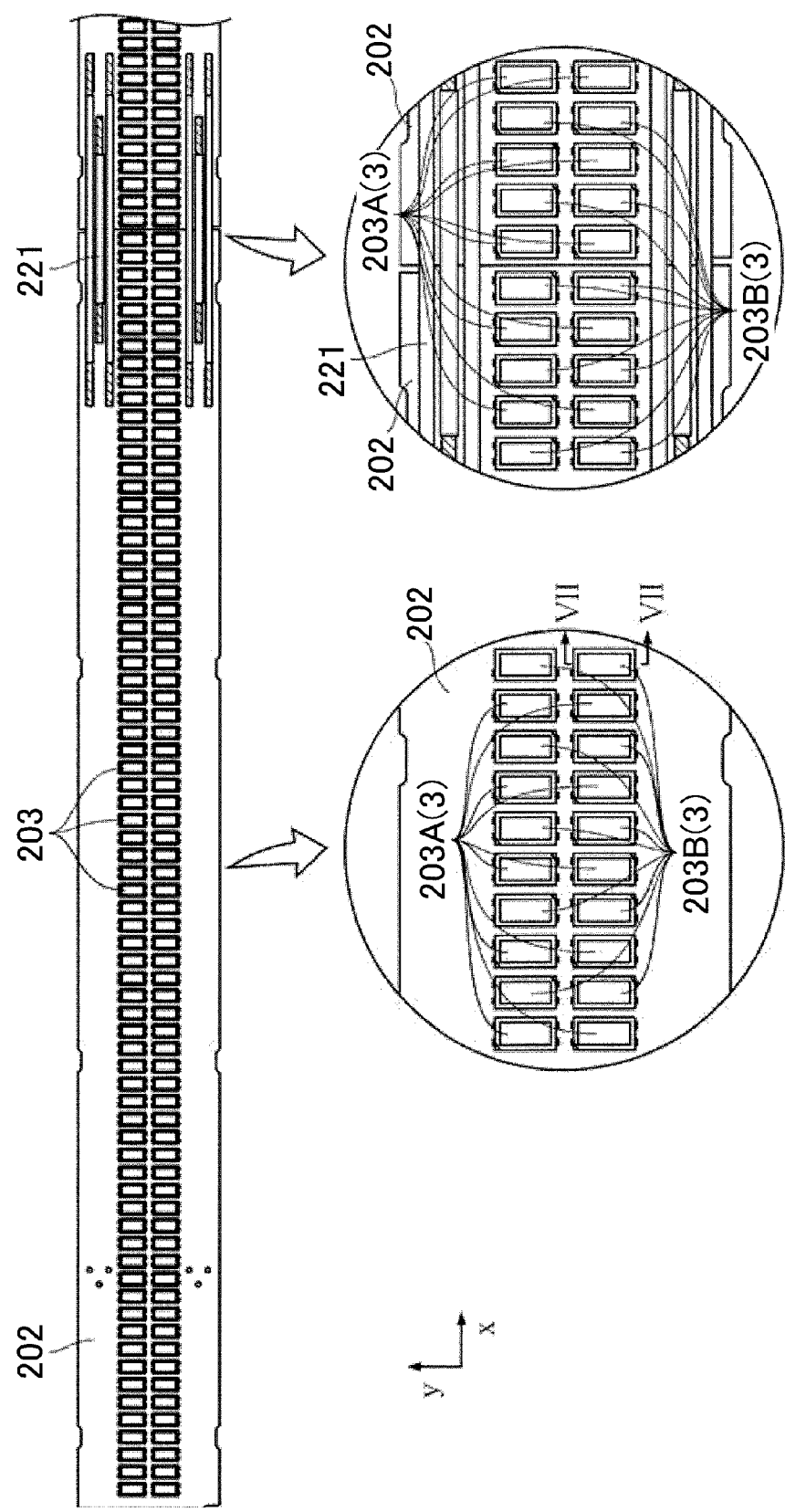
FIG. 50 is a plan view showing the substrate and LED module of the LED unit shown in FIG. 5.

As shown in FIGS. 49 and 50, the substrate 202 is strip shaped such that the x direction is the longitudinal direction and the y direction is the width direction thereof, and the substrate 202 is composed of glass epoxy resin, for example. In the present embodiment, the dimensions of the substrate 202 are 204 mm in the x direction and 30 mm in the y direction, six substrates 202 are provided to a single LED unit XA1, XA2, and 288 LED modules 203 are mounted on a single substrate 202. The substrate 202 is configured as a laminate substrate in order to supply power as described hereinafter to the LED modules 203. As shown in FIG. 50, adjacent substrates 202 are disposed close enough together that almost no gap is formed between the end surfaces thereof in the x direction. The wiring patterns (not shown) foamed on adjacent substrates 202 are connected to each other by wiring 221.

The plurality of LED modules 203 are modules which serve as power supplies for the LED units XA1, XA2, and are disposed in two rows on the substrate 202 as shown in FIG. 50. In the present embodiment, the plurality of LED modules 203 is composed of LED modules 203A and LED modules 203B. The LED modules 203A, 203B each emit light of different wavelengths; e.g., the LED modules 203A emit so-called daylight white having a color temperature of about 5,000 K, and the LED modules 203B emit so-called warm white having a color temperature of about 3,000 K. As shown in the partial enlarged view on the left side of FIG. 50, the LED modules 203A and the LED modules 203B are disposed so as to alternate in the x direction. Furthermore, in the portion shown in the partial enlarged view on the right side of FIG. 50, for example, LED modules 203B are mounted at the right end of the substrate 202 in the left-side view, and LED modules 203A are mounted at the left end of the substrate 202 in the right-side view. The LED modules 203A, 203B are thereby disposed so as to alternate in the x direction in the entire LED unit XA1. In the LED unit XA1, 432 LED modules 203A and 432 LED modules 203B are mounted, and a total of 864 LED modules 203 are used. The dimensions of the LED modules 203A, 203B in plan view are about 4.0 mm×2.0 mm. In contrast, a configuration may also be adopted in which LED modules 203 are provided which emit light of a single wavelength.

Figure 51:
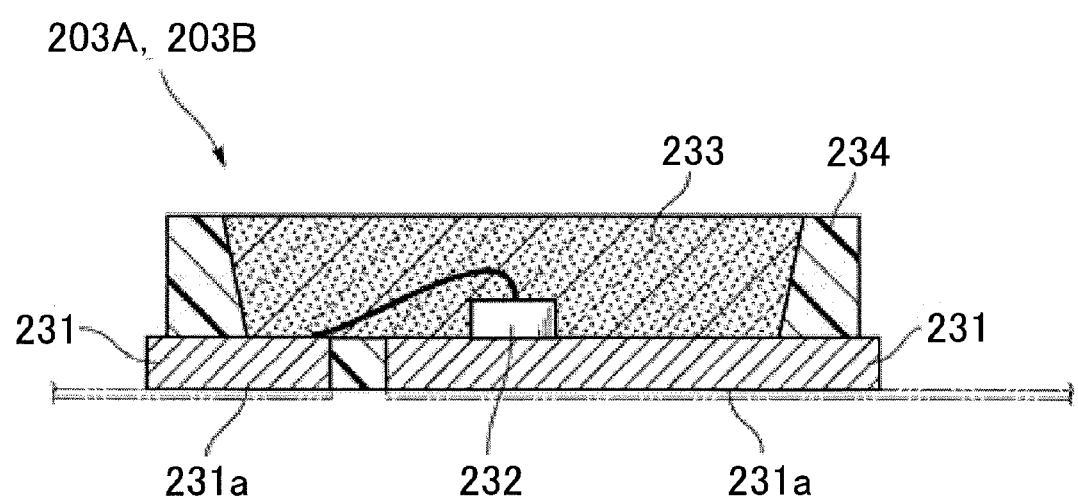
FIG. 51 is a sectional view along line VII-VII in FIG. 6.

As shown in FIG. 51, the LED modules 203A, 203B are provided with a pair of leads 231, an LED chip 232, a sealing resin 233, and a reflector 234. The pair of leads 231 are composed of Cu metal, for example, and the LED chip 232 is mounted on one of the leads 231. The surface of the leads 231 on the opposite side from the surface on which the LED chip 232 is mounted is used as a mounting terminal 231a used for surface-mounting the LED module 203. The LED chip 232 is the light source of the LED module 203, and is capable of emitting blue light, for example. The sealing resin 233 protects the LED chip 232. The sealing resin 233 is formed by using a transparent resin which includes a fluorescent substance for emitting yellow light through excitation by the light from the LED chip 232. The sealing resin 233 has a different composition in the LED module 203A and in the LED module 203B. Due to this difference in composition, daylight white is emitted from the LED module 203A, and warm white is emitted from the LED module 203B. As the fluorescent substance described above, a fluorescent substance which emits red light and a fluorescent substance which emits green light may be mixed together and used instead of a fluorescent substance which emits yellow light. The reflector 234 is composed of a white resin, for example, and reflects the light emitted laterally from the LED chip 232 upward.

As shown in FIG. 49, the support member 204 is made of aluminum, for example, and has an U-shaped cross-section having a bottom part 241, two side panels 242, and two presser panels 246. The substrate 202 is attached to the outside of the bottom part 241. In the present embodiment, the bottom part 241 and the substrate 202 have substantially the same dimensions in the y direction. Retaining grooves 243, 244 are formed in the two side panels 242. The retaining grooves 243, 244 extend in the x direction, and are recessed inward in the y direction. The two presser panels 246 are attached to the lower ends of the side panels 242.

The cover 205 is strip shaped and arcuate in cross-section, extends in the x direction as shown in FIG. 47, and is composed of a milky white resin, for example, which diffuses and transmits the light from the LED modules 203. As shown in FIG. 49, retaining tabs 251, 252 are formed at the edges of both ends of the cover 205. The retaining tabs 251, 252 both extend in the x direction and protrude inward in the y direction. The retaining tab 251 engages with the retaining groove 243, and the retaining tab 252 engages with the retaining groove 244.

Figure 52:
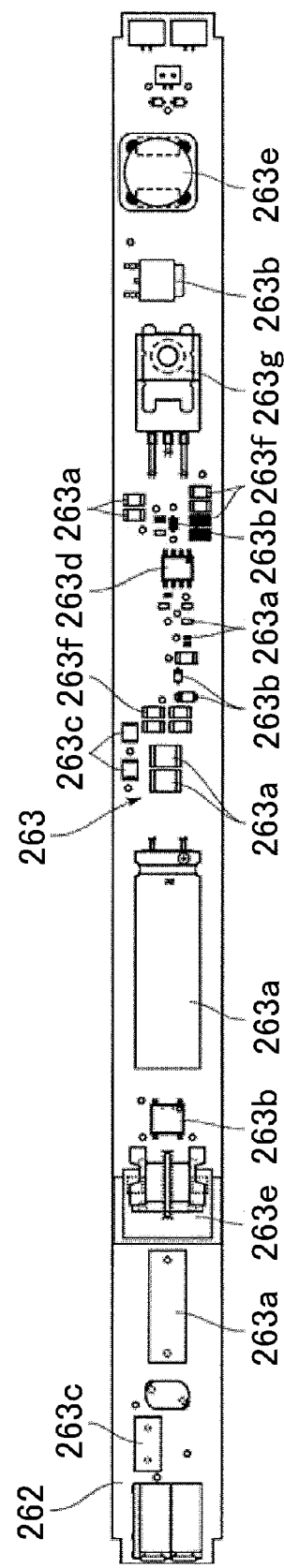
FIG. 52 is a plan view showing the power supply substrate and electronic components of the LED unit shown in FIG. 5.

The power supply units 206A, 206B are composed of a case 261, a power supply substrate 262, and a plurality of electronic components 263, and are accommodated in the support member 204. The case 261 is U-shaped in cross-section, and is made of metal, for example. The power supply substrate 262 is attached to the case 261. As shown in FIG. 52, the power supply substrate 262 has an elongated rectangular shape, and a plurality of electronic components 263 is mounted thereon. The plurality of electronic components 263 is a capacitor 263a, a diode 263b, a circuit protection element 263c, a driver IC 263d, a coil 263e, a resistor 263f, a transistor 263g composed of a power MOSFET, for example, and other components, for example. A connector not shown in the drawing extends from the power supply units 206A, 206B. In the power supply units 206A, 206B as shown in FIG. 49, each case 261 thereof is pressed by the presser panels 246 and fixed to the support member 204. The presser panels 246 and the case 261 are joined by bolts, for example, not shown in the drawing.

In the present embodiment, two power supply units 206A, 206B are provided to each of the LED units XA1, XA2. Each power supply unit 206A supplies power to 216 LED modules 203A, and each power supply unit 206B supplies power to 216 LED modules 203B. Each LED module 203 is supplied with direct-current power having a maximum voltage of about 3 V and a current of about 20 mA, for example.

The wireless handset unit 281 is a wireless communication device having a physical layer which is in accordance with the IEEE 802.15.4 standard, for example. In the present embodiment, the wireless handset unit 281 is in a form in which electronic components, a substrate, and other constituent elements (not shown in the drawings) are housed in a rectangular case, and the wireless handset unit 281 is disposed in a position adjacent in the x direction to the support member 204 and cover 205 of the LED units XA1, XA2, for example.

As shown in FIG. 53, the LED illumination system XC is further provided with a wireless base unit 282. The wireless base unit 282 is a wireless communication device having a physical layer which is in accordance with the IEEE 802.15.5 standard, for example, and is configured so as to be capable of wireless communication with the wireless handset unit 281. The wireless base unit 282 can be connected to a personal computer PC as a data input means. The brightness and tone of the LED illumination device XB for one year, for example, is inputted from the personal computer PC distinctly for each time of day. The wireless base unit 282 stores the data in an internally housed memory (not shown in the drawing).

An emission amount instruction wireless signal is transmitted to each LED illumination device XB from the wireless base unit 282 on the basis of the brightness and tone for each time of day. When the emission amount instruction wireless signal is received, the wireless handset unit 281 of each LED illumination device XB sends an emission amount instruction signal to the power supply units 206A, 206B. The emission amount instruction signal is a pulse-wave signal having a voltage of 5 V, for example, which instructs an emission time ratio of each of the LED modules 203A, 203B which are caused to emit light by the power supply units 206A, 206B. So-called PWM control is thereby performed for the LED modules 203A, 203B in accordance with the emission amount instruction wireless signal.

For example, when daylight white is to be emitted by a certain LED illumination device XB, an emission amount instruction signal which sets the emission time ratio of the LED modules 203A to 100% is transmitted to the power supply units 206A, and an emission amount instruction signal which sets the emission time ratio of the LED modules 203B to 0% is transmitted to the power supply units 206B. On the other hand, when warm white is to be emitted from a certain LED illumination device XB, an emission amount instruction signal which sets the emission time ratio of the LED modules 203A to 0% is transmitted to the power supply units 206A, and an emission amount instruction signal which sets the emission time of the LED modules 203B to 100% is transmitted to the power supply units 206B. Through such PWM control, the tone of the light emitted by the LED illumination device XB (LED units XA1, XA2) can be freely adjusted between daylight white and warm white. In the present embodiment, adjustment of illuminance and on/off control by the emission amount instruction wireless signal described above is performed only for the LED units XA2. As described hereinafter, control by the face recognition control means 207 has priority over on/off control for the LED unit XA1.

In the present embodiment, a single wireless handset unit 281 is provided to a single LED illumination device XB. This means that the plurality of LED units XA1, XA2 provided to a single LED illumination device XB are lit at the same tone and the same illuminance. In contrast, toning can be varied between the LED unit XA1 and the LED units XA2 by providing a plurality of wireless handset units 281 to a single LED illumination device XB. A configuration may also be adopted in which the toning of the LED illumination device XB is adjusted by wired communication instead of wireless communication by the wireless handset unit 281 and wireless base unit 282. A configuration may also be adopted in which no toning adjustment function is provided.

As shown in FIGS. 45 and 46, the camera unit 270 is attached to the reading table XD, and captures an image of a specific imaging region Sa. In the present embodiment, the camera unit 270 is installed at an inner part in the y direction of the tabletop XDa, and the specific imaging region Sa is directed at an upward angle so that the face Fc of a reader Vw seated at the reading table XD can be appropriately captured. As shown in FIG. 53, the camera unit 270 is connected to the face recognition control means 207, and image data obtained by imaging is sent to the face recognition control means 207.

The face recognition control means 207 is provided with an image processing unit 271 and a control unit 272. The image processing unit 271 performs face recognition processing of image data received from the camera unit 270. As a general example of face recognition processing, image data having color or black and white gradations is subjected to binarization processing. The binarized data are then subjected to outline extraction processing. The eyes included in the face Fc are then extracted by checking against a stored shape database. A determination is made as to whether a face Fc is included in the image, and whether the face Fc is directly facing the camera unit 270, from such factors as the shape and size of the obtained eyes and the alignment of the eyes. However, the face recognition processing described above is merely an example, and various forms of face recognition processing may be employed.

The control unit 272 performs the function of controlling the on state of the LED unit XA1 of the LED illumination device XB on the basis of the processing results of the image processing unit 271, and is provided with a CPU, a memory, and an interface, for example. For the sake of convenience, FIG. 53 shows the configuration whereby a single LED unit XA1 is controlled by a single camera unit 270 and face recognition control means 207. The configuration shown in FIGS. 45 and 46 includes three LED units XA1, and the on state of each LED unit XA1 is controlled by an individual face recognition control means 207 on the basis of the image of an individual camera unit 270 in the same manner as in the configuration shown in FIG. 53. An example of the on state control of the LED unit XA1 performed by the control unit 272 is be described hereinafter with reference to FIGS. 54 through 61. The control unit 272 controls the on state of the LED unit XA1 according to whether the face Fc of the reader Vw in the image Img is photographed in a direct facing state. Specifically, the LED unit XA1 is turned on in a case in which the face Fc of the reader Vw is directly facing, and the LED unit XA1 is turned off in a case in which the face Fc of the reader Vw is not directly facing.

FIG. 54 shows a state in which the reader Vw is walking between an archive Ac and the reading table XD. In this case, the reader Vw in the image Img of the camera unit 270 is viewed from the side. When this image Img is subjected to image processing by the image processing unit 271, the determination is made that the face Fc of the reader Vw is not directly facing the camera unit 270. The LED unit XA1 is therefore turned off.

FIG. 55 shows a state in which the reader Vw is standing so as to face the reading table XD. In this case, the top half of the body of the reader Vw appears in the image Img. When this image Img is subjected to image processing by the image processing unit 271, the determination is made that the face Fc of the reader Vw is directly facing. The LED unit XA1 is therefore turned on.

FIG. 56 shows a state in which the reader Vw is standing so as to face the archive Ac. In this case, the reader Vw in the image Img of the camera unit 270 is viewed from behind. When this image Img is subjected to image processing by the image processing unit 271, the determination is made that the face Fc of the reader Vw is not directly facing the camera unit 270. The LED unit XA1 is therefore turned off. In a case in which the state shown in FIG. 55 changes to the state shown in FIG. 56, the LED unit XA1 is changed from the on state to the off state. The control unit 272 may be provided with an off timer function for waiting a certain time before turning off the LED unit XA1 after the determination is made by the image processing unit 271 that the face Fc is not directly facing.

FIG. 57 shows a state in which the reader Vw is seated at the reading table XD and reading a book. In this case, the face Fc of the reader Vw appears relatively large in the image Img. When this image Img is subjected to image processing by the image processing unit 271, the determination is made that the face Fc of the reader Vw is directly facing. The LED unit XA1 is therefore turned on.

FIG. 58 shows a state in which the reader Vw is seated at a position somewhat distant from the reading table XD. A case in which the reader Vw is reading a book in a relatively relaxed posture corresponds to this state. In this case, the face Fc of the reader Vw appears relatively small in the image Img. When this image Img is subjected to image processing by the image processing unit 271, the determination is made that the face Fc of the reader Vw is directly facing. The LED unit XA1 is therefore turned on.

FIG. 59 shows a state in which the reader Vw is seated so as to face the archive Ac. In this case, the back of the head of the reader Vw appears in the image Img of the camera unit 270. When this image Img is subjected to image processing by the image processing unit 271, the determination is made that the face of the reader Vw is not directly facing the camera unit 270. The LED unit XA1 is therefore turned off. As described above, by providing an off timer function to the control unit 272, it is possible to wait a certain time before turning off the LED unit XA1.

Figure 60:
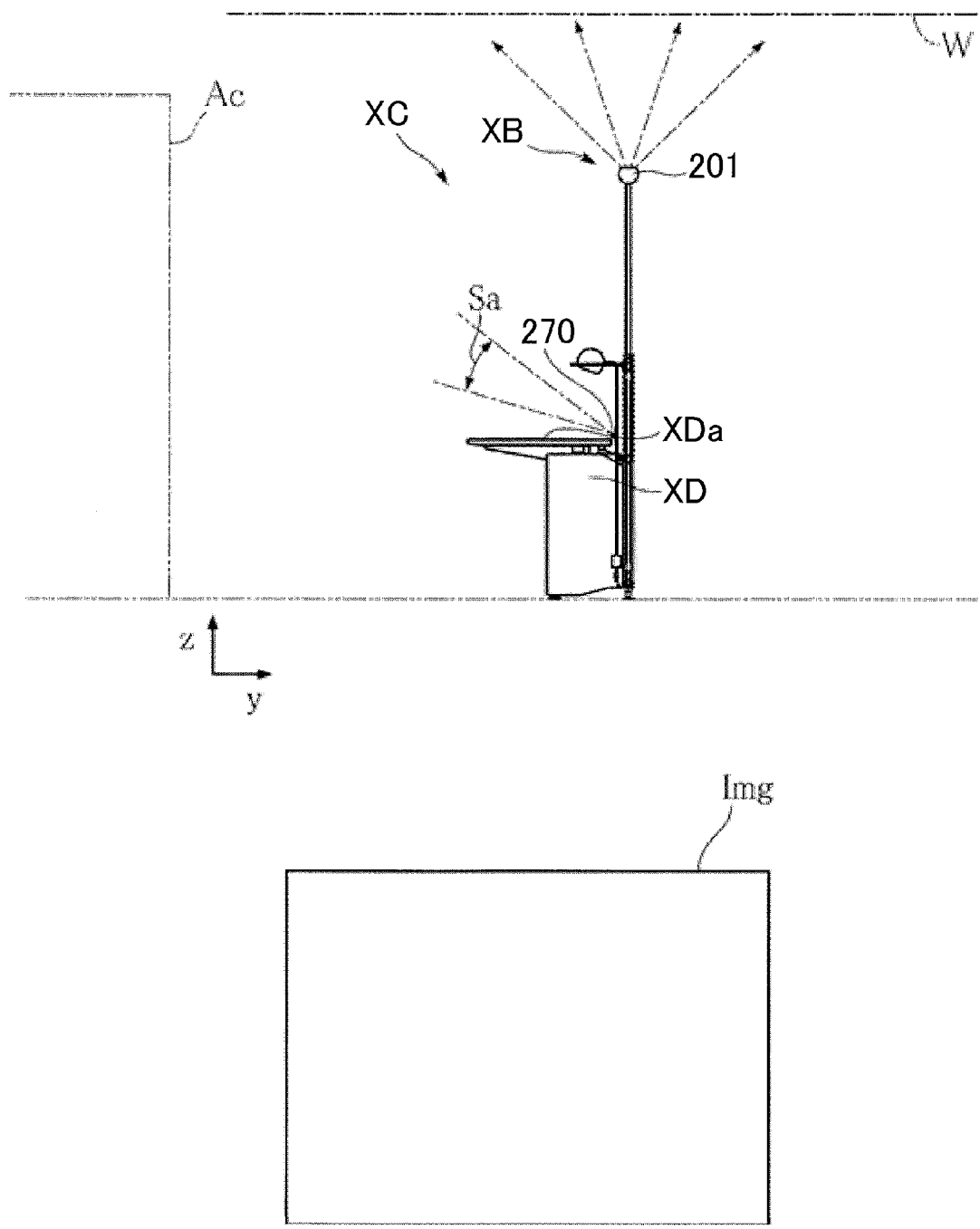
FIG. 60 is a side view and image thereof, showing a state in which no reader is present in the area of the LED illumination system shown in FIG. 1.

FIG. 60 shows a state in which the reader Vw is not present. In this case, the reader Vw does not appear in the image Img of the camera unit 270. When this image Img is subjected to image processing by the image processing unit 271, the determination is made that the face Fc of the reader Vw is not directly facing the camera unit 270. The LED unit XA1 is therefore turned off.

FIG. 61 shows a state in which a parcel Lg is placed on the tabletop XDa of the reading table XD. In this case, only the parcel Lg appears in the image Img of the camera unit 270, and the reader Vw does not appear. When this image Img is subjected to image processing by the image processing unit 271, the determination is made that the face Fc of the reader Vw is not directly facing the camera unit 270. The LED unit XA1 is therefore turned off.

The effect of the LED illumination system XC will next be described.

Through the present embodiment, the LED unit XA1 for illuminating the tabletop XDa of the reading table XD can be appropriately turned on when the reader Vw requires brightness, and can be turned off when the reader Vw does not require brightness. It is therefore possible to promote low power consumption by not consuming power unnecessarily, while providing an environment in which the reader Vw can comfortably read. Particularly in a case in which a plurality of reading tables XD is arranged side by side, it is possible to appropriately prevent turning on of the LED unit XA1 for illuminating the reading table XD adjacent to the reading table XD that the reader Vw is directly facing.

An LED illumination system is cited as a comparative example, which is provided with an on and off control function which uses a pyroelectric sensor for detecting a body temperature or the like, a reflection-type infrared sensor, an interruption-type infrared sensor, and an ultrasonic distance sensor. In a case in which these sensors are used, the LED unit XA1 is unnecessarily turned on even when a reader Vw is not facing toward the reading table XD, such as in the situations shown in FIGS. 54, 56, and 59. There is also a risk of unnecessarily illuminating the reading table XD that is adjacent to the reading table XD which the reader Vw is directly facing, or of illuminating the tabletop XDa of a reading table XD which a reader Vw is not directly facing. A configuration provided with on and off control through the use of a reflection-type infrared sensor, an interruption-type infrared sensor, and an ultrasonic distance sensor has further drawbacks in that the LED unit XA1 is turned on even when simple object such as a parcel Lg is present in the specific imaging region Sa, as shown in FIG. 61. The drawbacks which can occur in these configurations can be overcome by the LED illumination system XC of the present embodiment.

By using an emission time ratio to control the LED modules 203A, 203B, the tone of the light emitted from the LED units XA1, XA2 can be set to any value from daylight white to warm white. The luminance of the LED units XA2 can also be set to any value from zero to the maximum light intensity in the same manner. The ceiling W can thereby be illuminated by the desired tone and luminance of light according to the installation location or time of day.

By disposing the daylight white LED modules 203A and the warm white LED modules 203B so as to alternate in the x direction, it is possible to promote mixture of the light emitted from each of the LED modules 203A, 203B. A person viewing the LED units XA1, XA2 (LED illumination device XB) can thereby be prevented from recognizing the portions lit in a warm white tone and the portions lit in a daylight white tone as separate, and the appearance of uniform emission through the cover 205 can be achieved.

By attaching the substrate 202 to the support member 204 composed of aluminum, which has relatively high thermal conductivity, heat from the LED modules 203A, 203B can be satisfactorily transmitted to the support member 204 via the substrate 202. The support member 204 is U-shaped in cross-section, and therefore has a relatively large surface area. This large surface area is advantageous for increasing radiation efficiency. Degradation of the LED modules 203A, 203B can be suppressed by enhancing radiation efficiency.

Although the LED units XA1, XA2 have a simple elongated shape overall, the LED modules 203A, 203B as light sources, the power supply units 206A, 206B as power supplying means, and other components are housed therein. The LED units XA1, XA2 can therefore be mounted in a relatively wide variety of orientations, such as in two rows or one row, or upward or downward-facing with respect to the support cover 201. The LED illumination device XB can thereby illuminate the ceiling W and the tabletop XDa of the work table XD, and has an overall streamlined appearance rather than a complex shape.

Through the configuration provided with a wireless handset unit 281 and a wireless base unit 282, there is no inconvenience of wires, few limitations are placed on the installation location of the LED illumination device XB, and other advantages are gained in comparison with an illumination system which uses wires, for example.

However, the LED illumination system is not limited to the embodiment described above. Various design modifications are possible in the specific configuration of each part of the LED illumination system.

<Combination of Movement Detection and Face Detection>

Figure 62:
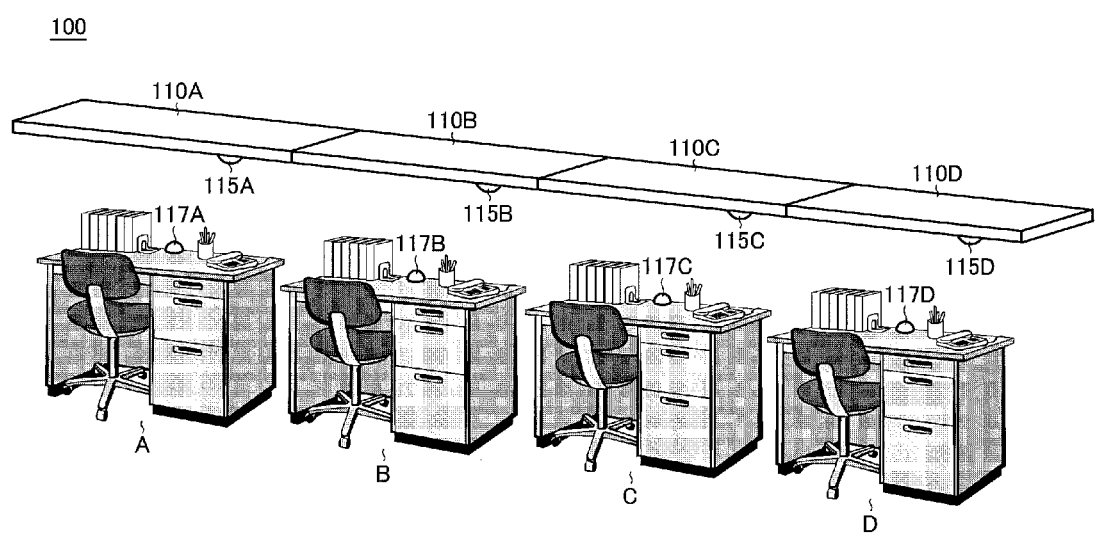
FIG. 62 is a schematic view showing an example of the combination of movement detection and face detection.
Figure 63:
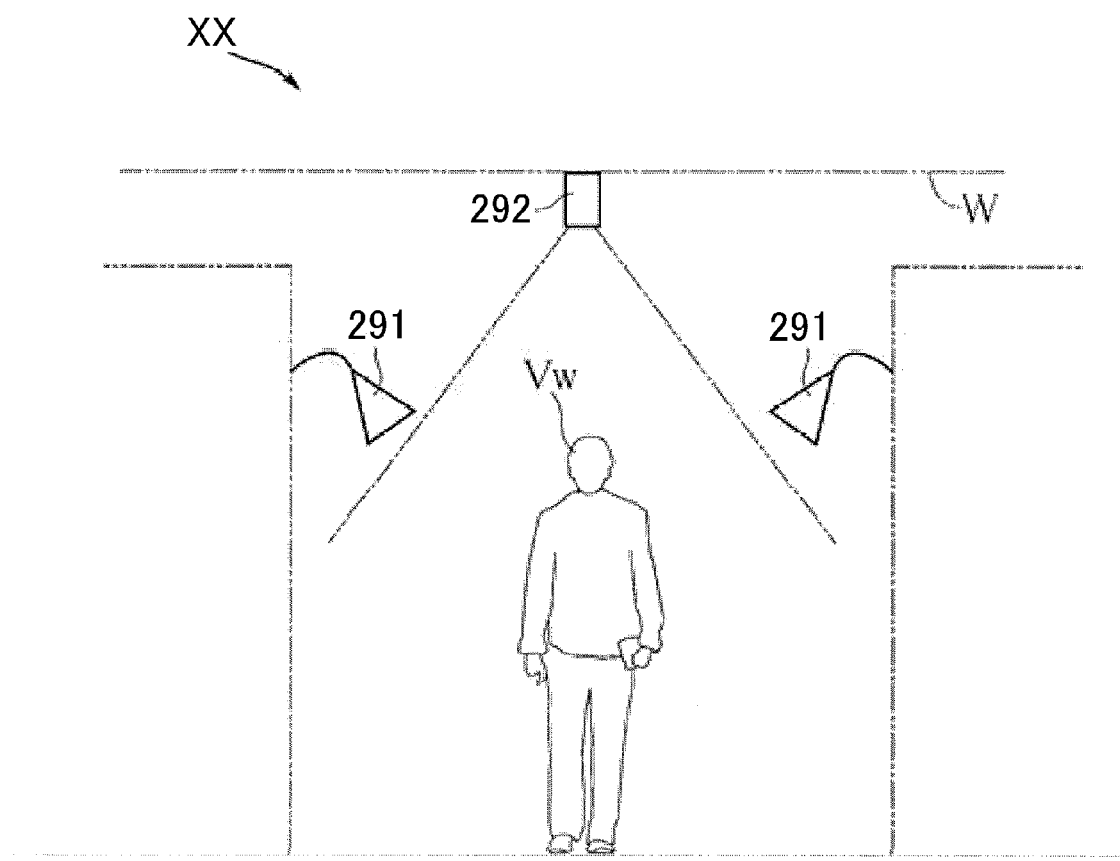
FIG. 63 is a side view showing an example of a conventional LED illumination system.

FIG. 62 is a schematic view showing an example of the combination of movement detection and face detection, and shows a configuration in which a camera unit 117 for performing a face detection function is added to a base office illumination system (see FIG. 42) provided with a touchless sensor 115 for performing a movement detection function. FIG. 62 depicts a configuration in which a touchless sensor 115 and a camera unit 117 are provided in different positions, but the camera unit 117 and touchless sensor 115 may also be provided in the same position.

As shown in FIG. 62, in a case in which a linear illumination device 100 is provided over desks A through D disposed in a row, an office illumination system is preferably constructed in which the housing 110 of the illumination device 100 is divided into four sections 110A through 110D so as to correspond to the desks A through D, and touchless sensors 115A through 115D and camera units 117A through 117D are provided in corresponding fashion, whereby on/off control, dimmer control, and toning control can be performed individually for each section. Through such a configuration, driving of the illumination device 100 can be controlled at will for each desk A through D according to user preference or according to whether a user is present.

In one possible utilization, on/off control for each section 110A through 110D is executed in accordance with face detection (of whether the user is directly facing) using the camera units 117A through 117D, whereas dimmer control or toning control for each section 110A through 110D is executed in accordance with movement detection (of whether the user has performed a predetermined action) using the touchless sensors 115A through 115D, for example.

Cases also may occur in which a parcel is placed on a desk A through D, or the face of a user cannot be photographed by a camera unit 117A through 117D even when a user is directly facing a desk A through D. In such cases, on/off control for each section 110A through 110D can also be performed in accordance with movement detection using the touchless sensors 115A through 115D.

INDUSTRIAL APPLICABILITY

The various technical features disclosed in the present specification are suitable for use as a technique for realizing a non-contact user interface in mobile telephones, digital cameras, portable gaming devices, digital audio players, digital video cameras, car navigation systems, PDAs (Personal Digital/Data Assistance), liquid crystal displays, medical instruments (e.g., guidance instruments in a hospital, for which it is necessary to prevent indirect transmission of viruses and the like), electronic instruments (e.g., automatic vending machines) which are accessed by the general public, illumination devices, and other devices.

<Other Modifications>

Various modifications may be added to the configuration of the present invention within the intended scope of the invention, besides the embodiments described above. In other words, the embodiments described above are, in every respect, merely examples, and are not to be considered as limiting. The technical scope of the present invention is defined by the claims, and not by the description of embodiments above, and it shall be apparent that all modifications having equivalent meanings and falling within the scope of the claims are included in the technical scope of the present invention.

LIST OF REFERENCE NUMERALS 1 semiconductor device
1a, 54 printed wiring board
1b transparent resin
2 proximity sensor
3, 15 control circuit
4 pulse generator
5 driver
6 infrared light sensor 7, 12 amplifier
8, A/D converter
9 linear-log converter
10 illuminance sensor
11 visible light sensor
13, 40 capacitor
20 data register
21 oscillator
22 timing controller
23 signal output circuit
24 signal input/output circuit
25 power-on reset circuit
34 reflecting object
35 visible-light source
37 through 39 resistor elements
50 mobile telephone device
51 touch panel
52 speaker
53 microphone
55 spacer
56 transparent plate
57 backlight
T1 through T3 drive terminals
T4 signal output terminal
T5 clock input terminal
T6 serial data input/output terminal
T7 power supply terminal
T8, T9 ground terminals
T10 test terminal
α infrared light
β visible light
100 illumination device
110 housing
111 light source support part
112 operating part
113 arm attachment part
114 light sources (LED)
115 touchless sensor
116 control unit (MCU)
117 camera unit
120 arm
130 pedestal
XA1, XA2 LED units
XB LED illumination device
XC LED illumination system
XD table
XDa tabletop
Ac archive
W ceiling
Sa specific imaging region
Vw reader
Fc face
x (first) direction
y (third) direction
z (second) direction
201 support cover
211 arcuate parts
212 middle plate parts
202 substrate
203 LED modules
203A (first) LED module
203B (second) LED module
231 leads
231a mounting terminal
232 LED chip
233 sealing resin
234 reflector
204 support member
241 bottom part
242 side panels
243, 244 retaining grooves
246 presser panels
205 cover
251, 252 retaining tabs
206A (first) power supply unit
206B (second) power supply unit
261 case
262 power supply substrate
263 electronic components
263a capacitor
263b diode
263c circuit protection element
263d driver IC
263e coil
263f resistor
263g transistor
207 face recognition control means
271 image processing unit
272 control unit
270 camera unit (imaging means)
281 wireless handset unit
282 wireless base unit

What is claimed is:

1. An illumination device comprising:
a light source;
a touchless sensor for detecting proximity and movement of an object without contact and
a control unit for controlling the driving of said light source on the basis of an output of said touchless sensor,
wherein said control unit performs dimmer control or toning control of said light source in accordance with a predetermined direction when said object is moved in the predetermined direction while in proximity to said touchless sensor, said control unit increasing the light intensity of said light source when said object is moved in a first direction, said control unit decreasing the light intensity of said light source when said object is moved in a second direction.

2. The illumination device according to claim 1, wherein said control unit:
increases the color temperature of said light source when said object is moved in a third direction; and
decreases the color temperature of said light source when said object is moved in a fourth direction.

3. The illumination device according to claim 2, wherein said first direction and said second direction are mutually opposite directions;
said third direction and said fourth direction are mutually opposite directions; and
said first direction and said second direction, and said third direction and said fourth direction are mutually orthogonal.

4. The illumination device according to claim 1, further comprising:
a housing to which said light source and said touchless sensor are provided; and
an arm attached to said housing.

5. The illumination device according to claim 4, wherein said touchless sensor is installed in the vicinity of an arm attachment part to which said arm is attached.

6. The illumination device according to claim 1, wherein said light source is attached to a ceiling, and said touchless sensor is attached to a wall surface.

7. The illumination device according to claim 1, wherein said light source has at least one LED.

8. The illumination device according to claim 7, wherein
said LED comprises a plurality of LED elements having different emission colors; and
said control unit controls driving of the LED elements individually for each color.

9. The illumination device according to claim 1, further comprising:
an image-capturing unit for capturing an image of a specific imaging region; wherein
said control unit performs movement detection using said touchless sensor and face detection using said image-capturing unit, and controls the driving of said light source on the basis of the results of both types of detection.

10. An illumination device comprising:
a light source;
a touchless sensor for detecting proximity and movement of an object without contact and
a control unit for controlling the driving of said light source on the basis of an output of said touchless sensor,
wherein said touchless sensor comprises:
a plurality of light emitters from which light is emitted in sequence, the light emitters being provided in mutually different positions;
a single light receiver for detecting each reflected light incident in sequence, the reflected light having been emitted in sequence from said plurality of light emitters and reflected by said object; and
a reflected light intensity information generator for generating a plurality of reflected light intensity information indicating the intensity of each reflected light detected by said light receiver; wherein
said control unit receives said plurality of reflected light intensity information generated by said reflected light intensity information generator and determines the proximity and movement of said object.

11. The illumination device according to claim 10, wherein said control unit computes a phase difference of an intensity variation between each reflected light and determines the movement of said object on the basis of the computed result.

12. The illumination device according to claim 11, wherein said plurality of reflected light intensity information includes first reflected light intensity information for indicating the intensity of a first reflected light that reaches said light receiver from a first light emitter via said object; second reflected light intensity information for indicating the intensity of a second reflected light that reaches said light receiver from a second light emitter via said object; and third reflected light intensity information for indicating the intensity of a third reflected light that reaches said light receiver from a third light emitter via said object; and
said control unit acquires the absolute values of each of at least two phase differences among the phase difference of an intensity variation between said first reflected light and said second reflected light, the phase difference of an intensity variation between said first reflected light and said third reflected light, and the phase difference of an intensity variation between said second reflected light and said third reflected light, and determines the movement axis of said object on the basis of a size relationship between the acquired absolute values.

13. The illumination device according to claim 12, wherein said control unit determines the movement direction of said object on said movement axis on the basis of the positive or negative sign of the phase difference whose absolute value is determined to be the larger among two phase differences whose absolute values are compared.

14. The illumination device according to claim 10, wherein each of said plurality of light emitters is an infrared LED for emitting infrared light.

15. The illumination device according to claim 10, wherein said plurality of light emitters is provided at vertex positions of a regular polygon; and
said light receiver is provided at the center of gravity of said regular polygon.

16. The illumination device according to claim 15, wherein said regular polygon is an equilateral triangle.

17. The illumination device according to claim 10, further comprising:
an image-capturing unit for capturing an image of a specific imaging region,
wherein said control unit performs movement detection using said touchless sensor and face detection using said image-capturing unit, and controls the driving of said light source on the basis of the results of both types of detection.

* * * * *